(12) United States Patent
Lin

(10) Patent No.: US 10,684,860 B2
(45) Date of Patent: Jun. 16, 2020

(54) HIGH PERFORMANCE PROCESSOR SYSTEM AND METHOD BASED ON GENERAL PURPOSE UNITS

(71) Applicant: SHANGHAI XINHAO MICROELECTRONICS CO. LTD., Shanghai (CN)

(72) Inventor: Kenneth Chenghao Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 26 days.

(21) Appl. No.: 16/029,323

(22) Filed: Jul. 6, 2018

(65) Prior Publication Data
US 2019/0138313 A1 May 9, 2019

Related U.S. Application Data

(63) Continuation of application No. 14/912,726, filed as application No. PCT/CN2014/084606 on Aug. 18, 2014, now Pat. No. 10,055,228.

(30) Foreign Application Priority Data

Aug. 19, 2013 (CN) .......................... 2013 1 0362565

(51) Int. Cl.
*G06F 9/38* (2018.01)
*G06F 12/0862* (2016.01)
*G06F 12/0875* (2016.01)

(52) U.S. Cl.
CPC .............. *G06F 9/3836* (2013.01); *G06F 9/38* (2013.01); *G06F 9/382* (2013.01); *G06F 9/3804* (2013.01); *G06F 9/3838* (2013.01); *G06F 9/3885* (2013.01); *G06F 9/3887* (2013.01); *G06F 9/3889* (2013.01); *G06F 12/0862* (2013.01); *G06F 12/0875* (2013.01); *G06F 2212/452* (2013.01); *G06F 2212/6028* (2013.01)

(58) Field of Classification Search
None
See application file for complete search history.

(56) References Cited

U.S. PATENT DOCUMENTS 5,423,051 A * 6/1995 Fuller ................. G06F 9/30043
712/7
5,475,856 A * 12/1995 Kogge ................ G06F 9/30189
712/20

(Continued)

FOREIGN PATENT DOCUMENTS

| CN | 1690952 A | 11/2005 |
| CN | 102110058 A | 6/2011 |
| CN | 102855121 A | 1/2013 |

*Primary Examiner* — Eric Coleman
(74) *Attorney, Agent, or Firm* — Anova Law Group, PLLC

(57) ABSTRACT

This invention provides a high performance processor system and a method based on a common general purpose unit, it may be configured into a variety of different processor architectures; before the processor executes instructions, the instruction is filled into the instruction read buffer, which is directly accessed by the processor core, then instruction read buffer actively provides instructions to processor core to execute, achieving a high cache hit rate.

18 Claims, 21 Drawing Sheets

(56) References Cited

U.S. PATENT DOCUMENTS

| | | | |
|---|---|---|---|
| 5,740,401 A * | 4/1998 | Hanawa | G06F 9/52 |
| | | | 711/152 |
| 6,021,511 A | 2/2000 | Nakano | |
| 6,026,479 A * | 2/2000 | Fisher | G06F 9/30076 |
| | | | 712/215 |
| 6,643,763 B1 * | 11/2003 | Starke | G06F 9/30043 |
| | | | 709/216 |
| 6,766,437 B1 * | 7/2004 | Coscarella | G06F 9/30087 |
| | | | 712/20 |
| 7,395,416 B1 * | 7/2008 | Sathaye | G06F 9/3806 |
| | | | 712/218 |
| 8,180,998 B1 * | 5/2012 | Maher | G06F 9/52 |
| | | | 712/20 |
| 2002/0082714 A1 | 6/2002 | Kumamoto et al. | |
| 2002/0129227 A1 | 9/2002 | Arakawa | |
| 2005/0120275 A1 | 6/2005 | Fletcher et al. | |
| 2005/0198467 A1 | 9/2005 | Fenney | |
| 2005/0232218 A1 * | 10/2005 | Edwards | G06F 1/3203 |
| | | | 370/347 |
| 2008/0140994 A1 | 6/2008 | Khailany et al. | |
| 2011/0072242 A1 * | 3/2011 | Lee | G06F 9/3824 |
| | | | 712/205 |
| 2012/0036342 A1 | 2/2012 | King | |
| 2012/0311305 A1 * | 12/2012 | Kobayashi | G06F 9/3891 |
| | | | 712/221 |
| 2014/0143513 A1 | 5/2014 | Reid et al. | |

* cited by examiner

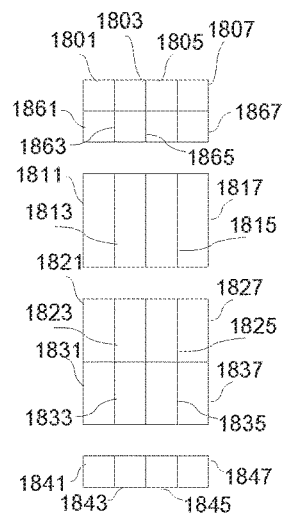
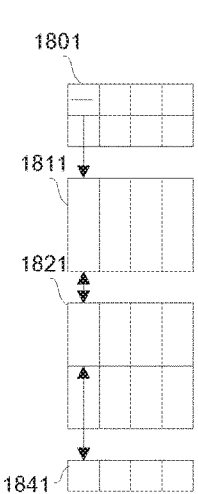
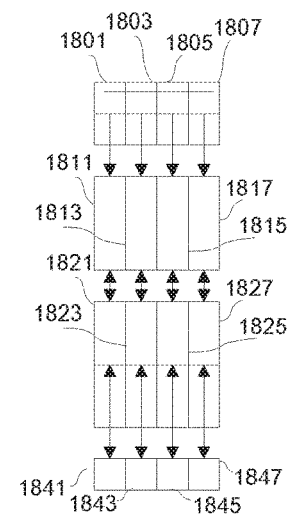
FIG. 13A    FIG. 13B    FIG. 13C
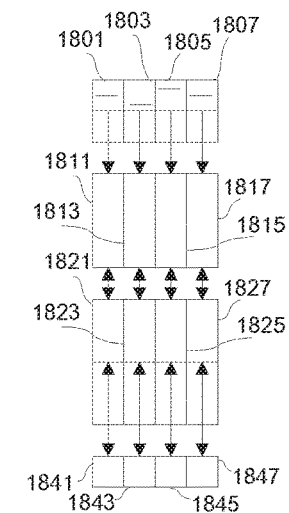
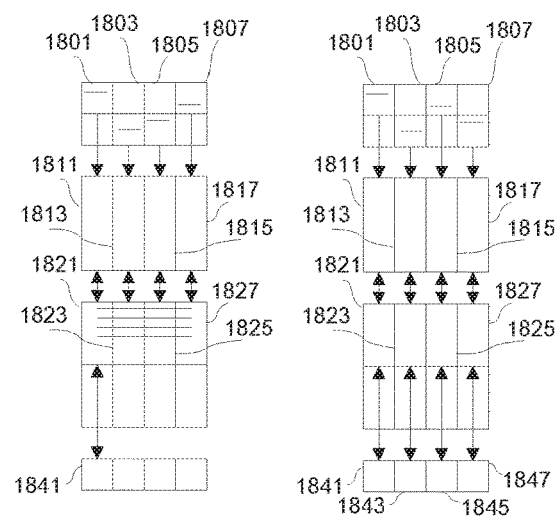
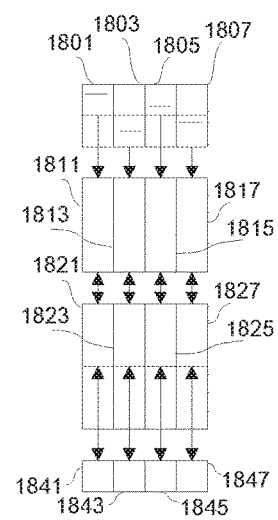
FIG. 13D    FIG. 13E    FIG. 13F
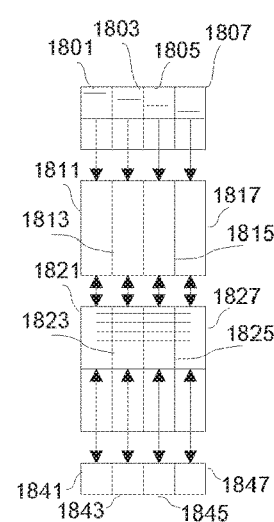
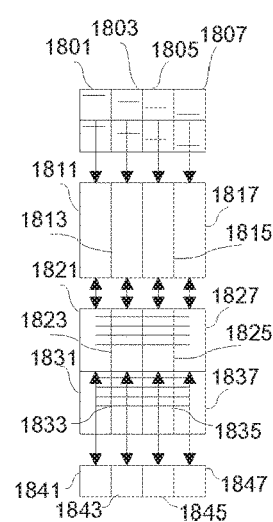
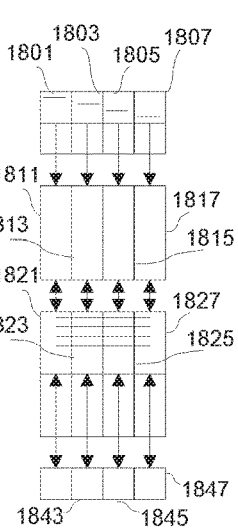
FIG. 13G    FIG. 13H    FIG. 13I

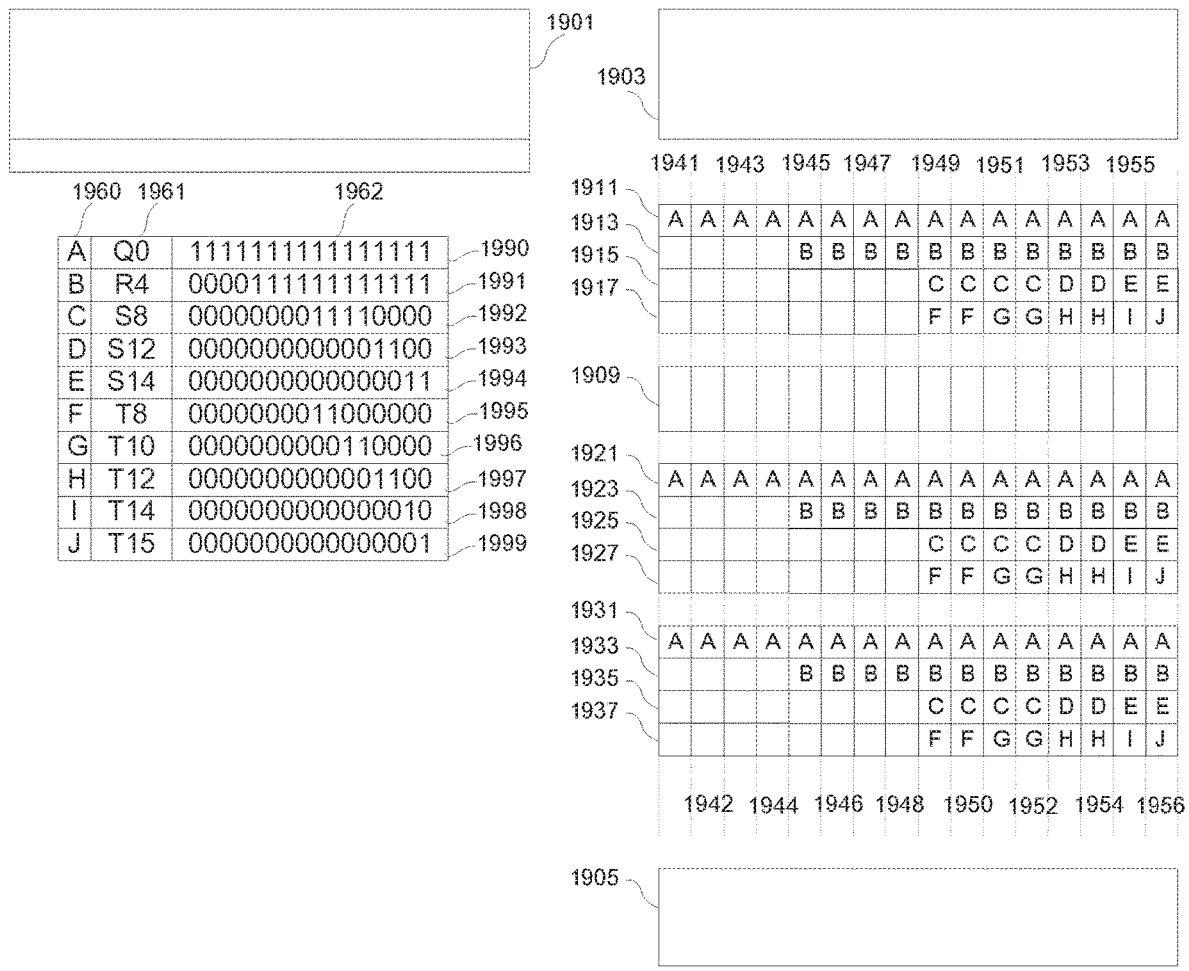

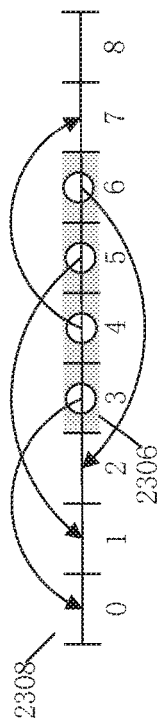
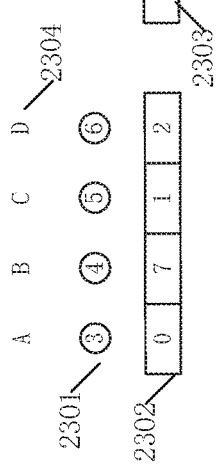
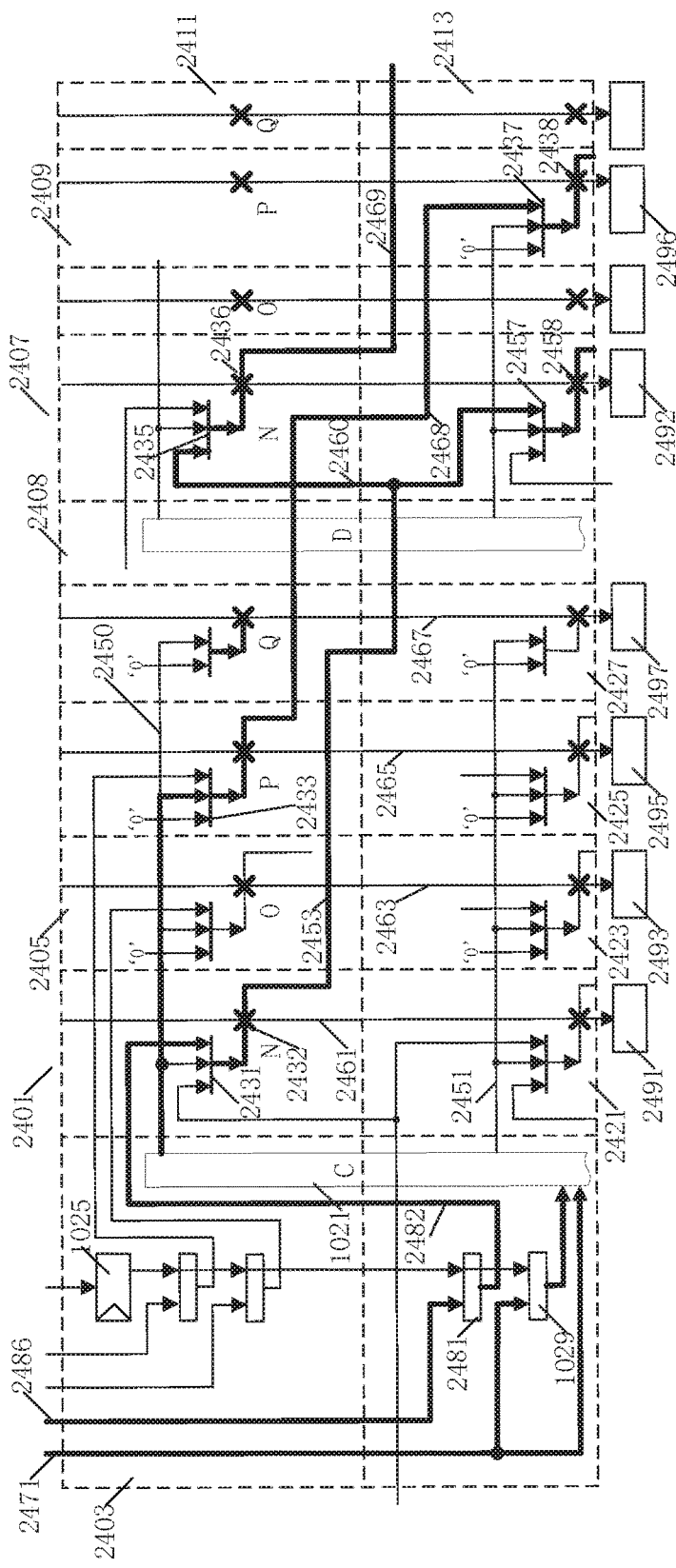
FIG.19B
FIG.19A
FIG.20

HIGH PERFORMANCE PROCESSOR SYSTEM AND METHOD BASED ON GENERAL PURPOSE UNITS

FIELD OF THE INVENTION

This invention involves the fields of computers, communication, and integrated circuits.

BACKGROUND

The conventional general-purpose processor (CPU) and the Digital Signal Processor (DSP) are both flexible; they handle different applications by running different programs. However, due to the limited resources, the processing power and throughput rate of general-purpose processor are insufficient. Conventional multi-core processor integrates multiple processor cores, which may execute programs in parallel to improve chip performance. However, a parallelism programming mindset is needed to use a conventional multi-core processor to its full capacity. In reality, the allocation and management of resources by the OS is usually evenly partitioned rather than partitioned based on need. Compared with general CPUs, the Digital Signal Processor has more computational units but more often than not, the computational resources are still insufficient. Therefore, to improve parallelism, in particular dynamically scheduling the computing resources based on program execution, to better allocate the resources, is one of the keys to enhance a CPU's efficiency.

In today's processor architecture, cache is usually used to store part of the lower level memory content, so said content may be quickly fetched by higher level memory or the processor core to keep the pipeline flowing. Basic caches usually replenish themselves with content from lower level memory after a cache miss, which causes the pipeline to wait until the cache is refilled with the missing content. Although there are a few new cache structures, such as: victim cache, trace cache, and pre-fetch are all improvements on top of the basic cache. Nevertheless, the processor/memory speed gap is ever widening. The current architecture, particularly cache misses, has become the most serious bottleneck limiting the improvement of modern processors.

BRIEF SUMMARY OF THE DISCLOSURE

Technical Problem

The existing processor architecture usually reads data using Load instructions. It loads operands from memory into the register, and then sends it to the operation unit to perform the corresponding operation; after implementing the results, the execution results are written back into the register, and then use Store instructions to move the result from register to the memory. According to statistics, in the traditional processor, data Load/Store instructions take up about 30% of the total instructions in the program. Because data load instructions and data store instructions themselves do not involve arithmetic logic operations, these types of instructions have a greater proportion, the utilization rate of the processor is lower, and the processor's operation ability can't be fully utilized. Additionally, the branch instruction itself does not involve arithmetic logic operations; this type of instruction occupies about 16% of the total number of instructions in the program. If it is possible to hide Data load/store instructions, and branch instructions so they don't occupy separate instruction cycles, we will be able to improve the processor's instruction efficiency.

The current graphic processor unit (GPU) has multiple lanes. Every lane may perform the same instructions for the same type of data or different types of data. However, due to the inability to execute different instructions at the same time, the GPU is limited in efficiency; while the cores in the multi core processor may perform different commands at the same time, the number of processor cores is limited and difficult to scale.

Solution of the Problem

This invention discloses a new processor system architecture, which solves all the problems listed above.

This disclosure discloses a high performance processor system based on a common general purpose unit, wherein: the system is comprised of instruction memory and multiple lanes; the said instruction memory stores instructions; and each said lane is further comprised of: Execution unit, the said execution unit executes instructions; Register file, the said register file stores operands; Instruction read buffer, the said instruction read buffer autonomously outputs instructions to execution unit for execution.

Optionally, multiple said instruction read buffers output a plural number of instructions to the corresponding execution unit at the same time; or a said instruction read buffer outputs multiple instruction to the corresponding execution units at the same time; or the said instruction read buffer and instruction memory output a plural number of instructions to the said instruction read buffer's corresponding execution unit at the same time.

Optionally, at least one tracker; the said tracker moves forward to the first branch instruction after the instructions currently being executed by the execution unit, then output the next instruction's address and target instruction's address of the said branch instruction; when the said next instruction or target instruction has not been stored into instruction read buffer, control instruction memory fills the said next instruction or target instruction into the instruction read buffer.

Optionally, every instruction in every instruction read buffer corresponds to a token passer, the said token passer is used to pass tokens; the said instruction read buffer autonomously outputs the instruction corresponding to the token passer with the active Token for the execution unit.

Optionally, a preprocessor, the said preprocessor processes instructions that have not yet been sent to execution unit; the said instruction read buffer provides at least one instruction after the instruction corresponds to the token passer with the active Token.

Optionally, the said high performance processor system may be configured as column correlated, so each instruction read buffer outputs instruction based on the result of instruction execution of the execution unit corresponding to the instruction read buffer.

Optionally, he said high performance processor system may be configured as row correlated or diagonally correlated, so part or all of the instruction read buffers output instruction based on the position of Token in a certain instruction read buffer.

Optionally, the token passer synchronously passes tokens to different instruction read buffers.

Optionally, Configurable intra-lane buses, the said intra-lane buses may transmit data or execute results between lanes according to configuration.

Optionally, through configuring at least one lane, implement at least one of the following: single instruction flow single data flow mode, single instruction flow multiple data flow mode, super single instruction flow multiple data flow mode, multiple instruction flow single data flow operation mode, multiple instruction flow multiple data flow mode, instruction level parallel mode, soft wire logic mode, loop instruction mode, single lane multiple thread operation mode, multiple lane multiple thread operation mode, and simultaneous multi-threading mode.

Optionally, the maximum parallel instruction issue rate in a single cycle in the said instruction level parallel mode may be altered through configuration, to enable self-adapting issue rate configuration.

Optionally, configurable dependency checker; the said dependency checker determines the position and the number of the parallel executable instructions in the instructions issued at the same time, and determines the distance of Token pass.

Optionally, isolate the lanes through configuration of the dependency check of the said configurable dependency checker.

Optionally, load multiple register files with the same data simultaneously through configuration.

Optionally, on chip allocation module; the said on chip allocation module is capable of allocating the number of lanes and the operation mode to a program in real time through configuration.

Optionally, converter, the said converter converts instructions of different sets into instructions of one instruction set.

This disclosure puts forward a high performance processor system based on a common general purpose unit, each execution unit has its corresponding instruction read buffer; multiple said instruction read buffers output a plural number of instructions to the corresponding execution unit at the same time; or a said instruction read buffer outputs multiple instruction to the corresponding execution units at the same time; or the said instruction read buffer and instruction memory output a plural number of instructions to the said instruction read buffer's corresponding execution unit at the same time.

Optionally, prior to execution unit executes a branch instruction, fill the next instruction and target instruction of the branch instruction to the instruction read buffer beforehand.

Optionally, instruction read buffer passes tokens according to the execution result of instructions by the processor core, and then outputs the said token's corresponding instruction to processor core to execute.

Optionally, at least one instruction after the instruction that corresponds to the token passer that the token resides in is preprocessed.

Optionally, the said high performance processor system may be configured as column correlated, so each instruction read buffer outputs instruction based on the result of instruction execution of the execution unit corresponding to the instruction read buffer; the said high performance processor system may be configured as row correlated or diagonally correlated, so part or all of the instruction read buffers output instruction based on the position of Token in a certain instruction read buffer.

Optionally, through configuring at least one lane, implement at least one of the following: single instruction flow single data flow mode, single instruction flow multiple data flow mode, super single instruction flow multiple data flow mode, multiple instruction flow single data flow operation mode, multiple instruction flow multiple data flow mode, instruction level parallel mode, soft-wired logic mode, loop instruction mode, single lane multiple thread operation mode, multiple lane multiple thread operation mode, and simultaneous multi-threading mode.

Optionally, the single cycle maximum instruction issue number of the said instruction level parallel mode may be changed through configuration, implement self-adapting issue number configuration.

Optionally, through dependency check, determine the location and number of instructions may be executed in parallel from the instructions issued at the same time, and determines the distance of the token passing; and Isolate the lanes through the configuration of dependency checker Optionally, allocate a plural number of lanes to unroll an instruction loop to execute the loop in parallel to reduce the number of loop cycles.

Optionally, the different threads in different lanes or different threads in the same lanes are configured to operate under different modes.

Optionally, dynamically allocate thread resources to each program based on the thread resources allocation table, which records the preset priority of each program and the program's resource requirement and readiness status.

Optionally, convert the instructions of different instruction sets into an instruction set that may be executed by the execution unit in lanes, and then the execution unit executes the converted instructions.

Optionally, in super single instruction flow multiple data flow mode, multiple lanes execute the same program, each lane has its own independent branch decision mechanism and instruction addressing mechanism, which may independently execute the same program's different segments or different branches.

Optionally, it further includes a plural number of lanes correspond to one tracker pointer; in the said plural number of lanes, one lane is the Lead Lane, the other lanes are Following Lanes; the content of the instruction read buffers of the said plural number of lanes have the same content; the said tracker pointer moves forward to the first instruction of the instruction that is currently being executed by the execution unit of at least one lane of the said plural lanes, and output the addresses of the target instructions of the branch instructions of the plural instructions starting from the said first instruction; when the said first instruction or said target instructions are not yet stored into the instruction read buffer of the said plural number of lanes, control instruction memory to fill the said first instruction or the said target instruction into the instruction read buffers of the said plural number of lanes; and control the instruction read buffers of the said plural number of lanes each to output instruction of a plural number of instructions starting from the said first instruction.

Optionally, perform dependency check on the said plural number of instructions in the said plural number of lanes, and according to the dependency check result determine the increment amount of the said tracker pointer to update the tracker pointer, and according to dependency check result have processor core execute a portion or all of the said plural number of instructions.

Optionally, the said tracker outputs the said first instruction address and the Next block instruction address to the IRBs of the said plural number of lanes, to control the IRBs of each corresponding lane in the said plural number of lanes to output the contiguous plural number of addresses starting from the said first instruction to the corresponding lanes for execution; the said tracker also outputs the said branch target instructions and their Next block instruction addresses of all the branches in the said contiguous instructions starting from the said first instruction address to the IRBs of the said plural number of lanes, to control the IRBs of each corresponding lane in the said plural number of lanes to output the contiguous plural number of addresses starting from the said first instruction to the corresponding lanes for execution.

Optionally, the instruction read buffer of the said Lead Lane activates the corresponding zigzag word line based on the said first instruction address received, so it enables the read ports of the IRBs in the Following Lanes that zigzag word line passes, to output instructions from the said first instruction to the first branch instruction, and the enable signal is passed to the target bus when it reaches the said first instruction, which is received by the zigzag word line in the Following Lanes in an instruction block determined by branch target address, enables the read ports in the IRBs of the said Following Lanes it passes to output corresponding instruction; and in the above process, the enable signal on the said zigzag word line is passed to bus when it reaches the boundary of the instruction block, which is received by the zigzag word line in the Following Lanes in an instruction block determined by the Next block address, enables the read ports in the IRBs of the said Following Lanes it passes to output corresponding instruction.

Optionally, the instructions in a branch of a branch point is defined as a Way, the lane executes instructions of the same issued sequence in each Way is defined as a slot; dependency checker performs dependency check on each Way starting from the first lane, based on the dependency check result of each Way to produce the read pointer increment for each Way and to control the execution unit of the corresponding Way to execute part or all of the corresponding instruction, based on the dependency check result of each Way; Based on the execution result of branch instruction in each Way, select execution units in one Way of the Ways to complete execution, but terminate the execution in execution unit of other Ways; and Select the instruction address and read adder increment of one of the Ways to update the tracker read pointer based on the execution result of branch instructions in each Way.

Optionally, the number of instruction issued in parallel may be changed through the c configuration of dependency checker.

Optionally, every lane in the said system also includes data read buffer and data engine; the said data engine fills to the data read buffer in advance the data that may be acquired by data fetch instruction in the instruction read buffer.

Optionally, the said data read buffer's table entry and instruction read buffer's table entry are one-to-one correspondence, the data corresponds to a data fetch instruction may be directly found from data read buffer through the position of the said data fetcher instruction in the instruction read buffer; or The said data read buffer's table entry is less than instruction read buffer's table entry and each of the instruction read buffer items contains a pointer, the data corresponds to a data fetch instruction may be found through decoding the said pointer of the data fetch instruction entry in the instruction read buffer.

Optionally, it further includes a plural number of lanes correspond to one tracker pointer; in the said plural number of lanes, one lane is the Lead Lane, the other lanes are Following Lanes; the content of the instruction read buffers of the said plural number of lanes have the same content; the said tracker pointer moves forward to the first instruction of the instruction that is currently being executed by the execution unit of at least one lane of the said plural lanes, and output the addresses of the target instructions of the branch instructions of the plural instructions starting from the said first instruction; when the said first instruction or said target instructions are not yet stored into the instruction read buffer of the said plural number of lanes, control instruction memory to fill the said first instruction or the said target instruction into the instruction read buffers of the said plural number of lanes; and control the instruction read buffers of the said plural number of lanes each to output instruction of a plural number of instructions starting from the said first instruction Optionally, perform dependency check on the said plural number of instructions in the said plural number of lanes, and according to the dependency check result determine the increment amount of the said tracker pointer to update the tracker pointer, and according to dependency check result have processor core execute a portion or all of the said plural number of instructions.

Optionally, the said tracker outputs the said first instruction address and the Next block instruction address to the IRBs of the said plural number of lanes, to control the IRBs of each corresponding lane in the said plural number of lanes to output the contiguous plural number of addresses starting from the said first instruction to the corresponding lanes for execution; the said tracker also outputs the said branch target instructions and their Next block instruction addresses of all the branches in the said contiguous instructions starting from the said first instruction address to the IRBs of the said plural number of lanes, to control the IRBs of each corresponding lane in the said plural number of lanes to output the contiguous plural number of addresses starting from the said first instruction to the corresponding lanes for execution.

Optionally, the instruction read buffer of the said Lead Lane activates the corresponding zigzag word line based on the said first instruction address received, so it enables the read ports of the IRBs in the Following Lanes that zigzag word line passes, to output instructions from the said first instruction to the first branch instruction, and the enable signal is passed to the target bus when it reaches the said first instruction, which is received by the zigzag word line in the Following Lanes in an instruction block determined by branch target address, enables the read ports in the IRBs of the said Following Lanes it passes to output corresponding instruction; and in the above process, the enable signal on the said zigzag word line is passed to bus when it reaches the boundary of the instruction block, which is received by the zigzag word line in the Following Lanes in an instruction block determined by the Next block address, enables the read ports in the IRBs of the said Following Lanes it passes to output corresponding instruction.

Optionally, the instructions in a branch of a branch point is defined as a Way, the lane executes instructions of the same issued sequence in each Way is defined as a slot; dependency checker performs dependency check on each Way starting from the first lane, based on the dependency check result of each Way to produce the read pointer increment for each Way and to control the execution unit of the corresponding Way to execute part or all of the corresponding instruction, based on the dependency check result of each Way; Based on the execution result of branch instruction in each Way, select execution units in one Way of the Ways to complete execution, but terminate the execution in execution unit of other Ways; and Select the instruction address and read adder increment of one of the Ways to update the tracker read pointer based on the execution result of branch instructions in each Way.

Optionally, the number of instruction issued in parallel may be changed through the configuration of dependency checker Optionally, the data that may be acquired by data fetch instruction in instruction read buffer is filled into data read buffer beforehand.

Optionally, the said data read buffer's table entry and instruction read buffer's table entry correspond one-to-one, the data corresponds to a data fetch instruction may be directly found from data read buffer through the position of the said data fetcher instruction in the instruction read buffer; or The said data read buffer's table entry is less than instruction read buffer's table entry and each of the instruction read buffer items contains a pointer, the data corresponds to a data fetch instruction may be found through decoding the said pointer of the data fetch instruction entry in the instruction read buffer.

Other aspects of the present disclosure may be understood by those skilled in the art in light of the description, the claims, and the drawings of the present disclosure.

BENEFITS OF THE INVENTION

This invention's processor system is composed of common general purpose units. The common general purpose units may be configured as single instruction single data (SISD), Single instruction multi data (SIMD), multi instruction single data (MISD), and multi instruction multi data (MIMD), instruction level parallelism processor (ILP), vector processor, and thread level parallel processor (TLP). Portions of this processor system may be configured as one or more of the aforementioned processor structures at the same time. In addition, the processor system disclosed by this invention may be dynamically configured based on preset configurations or based on the execution of the program to utilize the computation resources and improved processor performance.

The cache system of the processor system disclosed by this invention differs from the traditional cache system, which is filled after cache misses, in that instructions are filled into the instruction read buffer (IRB) before they are executed by the processor. Thus, this hides or eliminates the execution unit wait cycles caused by cache miss. The cache system in the said processor system is able to output instruction to the processor core for execution before the processor core requests them. It avoids address tag matching in the cache fetching critical path, and therefore may operate at a higher clock frequency with lower power consumption as compared to conventional cache systems.

According to statistics, in programs of traditional processor units, data load instruction, data store instruction and branch instruction take up 46% of the total program instructions. This invention's processor system at the same time executes the above instructions along with other types of instructions. By doing so, it hides the time this type of instruction takes so it doesn't take up additional time by itself, therefore increasing efficiency.

For people skilled in the art, the other advantages and applications of this disclosure are obvious.

BRIEF DESCRIPTION OF THE DRAWINGS

FIG. 13A illustrates an exemplary processor system consistent with this disclosure;

FIG. 13B illustrates an SISD processor example of this disclosure;

FIG. 13C illustrates an SIMD example of this disclosure;

FIG. 13D illustrates a super SIMD example of this disclosure;

FIG. 13E illustrates a MISD example of this disclosure;

FIG. 13F illustrates an MIMD example of this disclosure;

FIG. 13G illustrates an ILP example of this disclosure;

FIG. 13H illustrates a TLP example of this disclosure

FIG. 13I illustrates a "soft wired" example of this disclosure;

FIG. 15A shows an exemplary dynamically configuration of lanes in processor system consistent with the disclosed embodiments;

FIG. 15B illustrates an exemplary thread resource allocation table in the Allocation Unit that allocates programs to each lane;

FIG. 15C illustrates an exemplary processing system for dynamic lane allocation consistent with the disclosed embodiments;

FIG. 19A illustrates an instruction segment being executed;

FIG. 19B illustrates the instruction segment in the axe of instruction address;

FIG. 20 illustrates an exemplary IRB that supports issuing a plural number of possible instructions at the same time consistent with the embodiments;

BEST MODE

Figure 11:
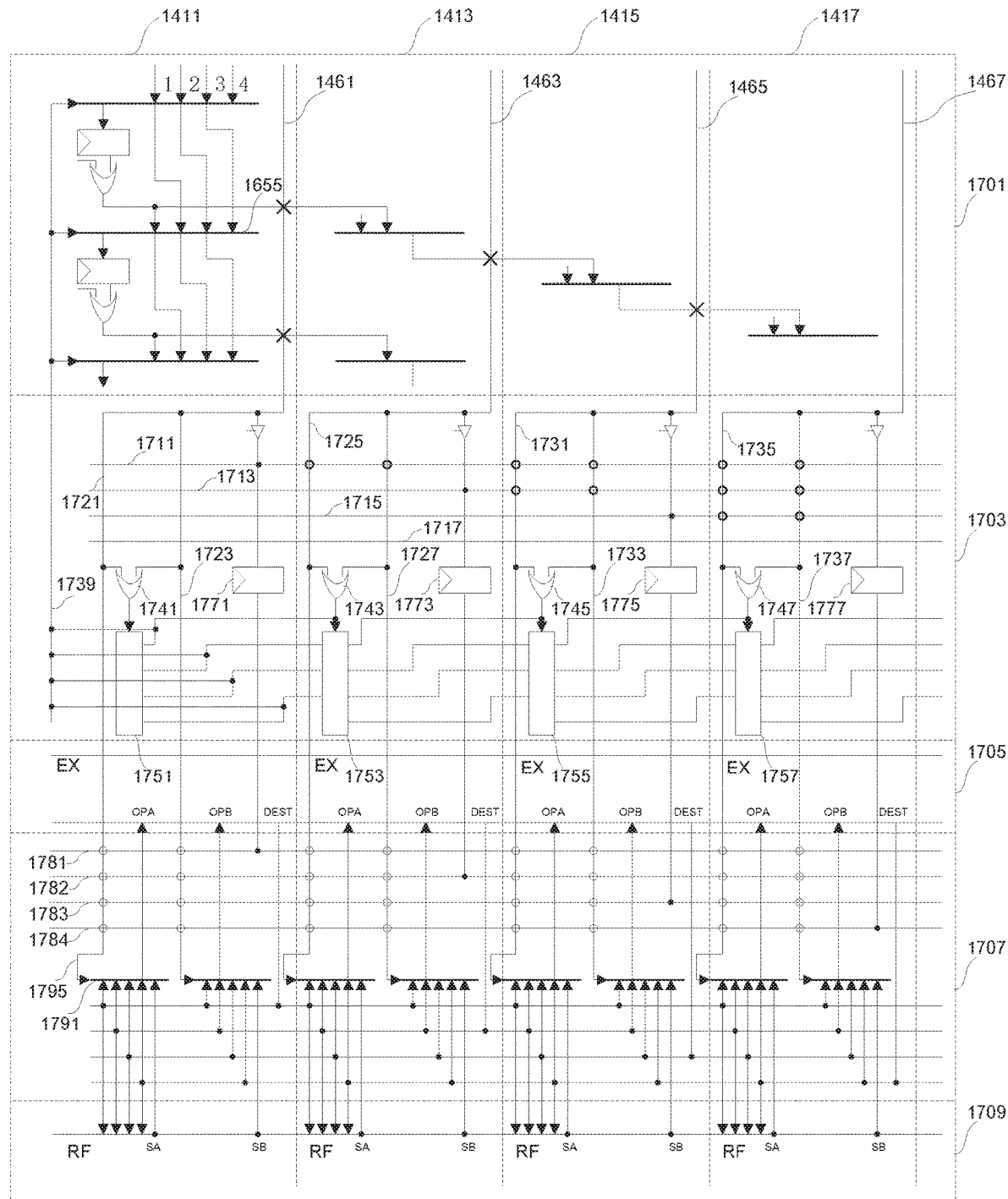
FIG. 11 illustrates an exemplary configurable multiple lane processor system with token passer matrix consistent with disclosed embodiments.

FIG. 11 illustrates one of the exemplary embodiments related to the best mode of the disclosed invention.

DETAILED DESCRIPTION

Reference will now be made in detail to exemplary embodiments of the invention, which are illustrated in the accompanying drawings in connection with the exemplary embodiments. By referring to the description and claims, features and merits of the present invention will be clearer to understand. It should be noted that all the accompanying drawings use very simplified forms and use non-precise proportions, only for the purpose of conveniently and clearly explaining the embodiments of this disclosure.

It is noted that, in order to clearly illustrate the contents of the present disclosure, multiple embodiments are provided to further interpret different implementations of this disclosure, where the multiple embodiments are enumerated rather than listing all possible implementations. In addition, for the sake of simplicity, contents mentioned in the previous embodiments are often omitted in the following embodiments. Therefore, the contents that are not mentioned in the following embodiments may refer to the previous embodiments.

Although this disclosure may be expanded using various forms of modifications and alterations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions, and modifications based on spirit or scope defined by the claims in the disclosure. The same reference numbers may be used throughout the drawings to refer to the same or like parts.

Although CPU is used as an example for the cache system in this disclosure, this invention may be applied to the cache system of any proper processor system such as general purpose processor, CPU, MCU, DSP, GPU, SOC, and ASIC, etc.

In this disclosure, the instruction and data addresses mean the main memory addresses of the instruction and data. For the sake of simplicity, assume in this disclosure the virtual address is the same as the physical address. However, the method disclosed by this invention may also be applied in the case address translation is required. In the disclosure, current instruction means instruction currently being executed or acquired by the processor core; current instruction block means the block contains the instruction currently being executed by the processor core.

Figure 1:
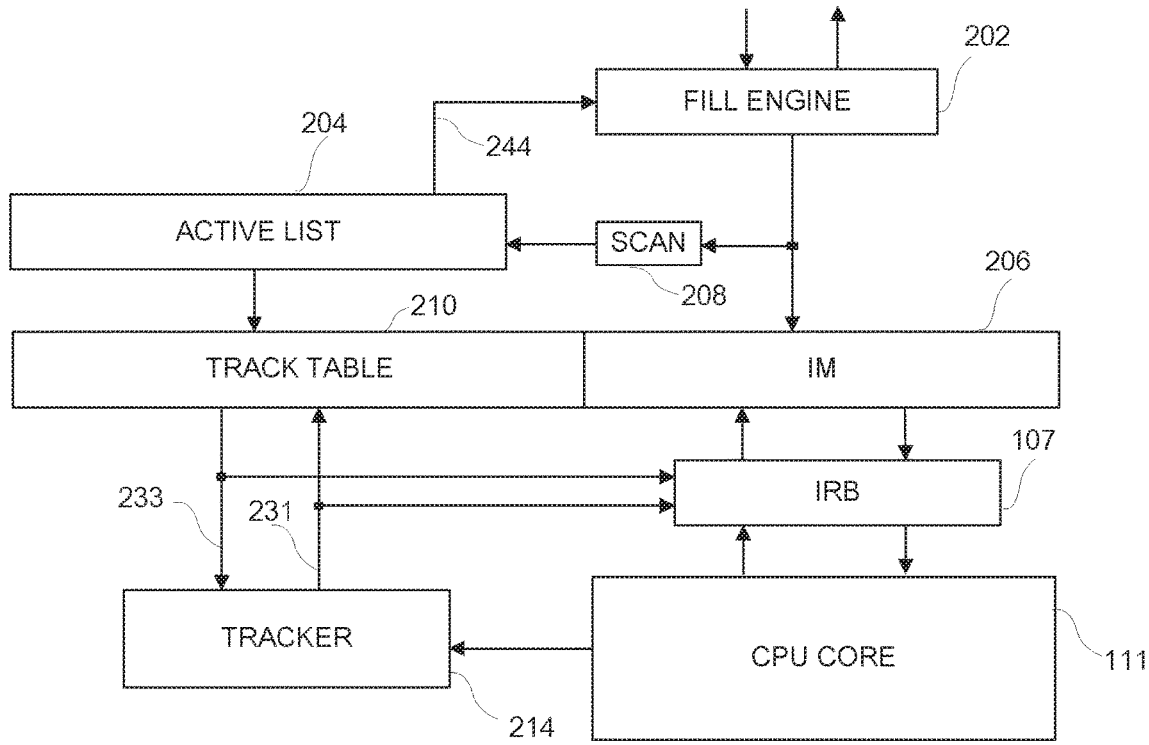
FIG. 1 illustrates an exemplary processor system of the said instruction cache system consistent with this disclosure.

Please refer to FIG. 1, the processor unit includes filler 202, an active list 204, a scanner 208, a track table 210, a tracker 214, an instruction memory 206, an instruction read buffer 107, and a processor core 111. The listed components are for description purpose, and may include other components, while some components may have been left out. The components listed may be from multiple systems. They may be physical or virtual, implemented through hardware (such as integrated circuit), implemented through software or may be a combination of both hardware and software.

When the processor core (CPU Core) 111 executes an instruction, it first reads instruction from a high level memory. Here, the memory hierarchy level means the distance from the processor core 111. The closer to the processor core 111 it is, the higher the level. A higher-level memory in general is faster but has less capacity compared to a lower level memory.

In this embodiment, the capacity and the latency of the instruction read buffer 107 are respectively smaller and shorter than those of instruction memory 206, and its access time is also shorter. Instruction memory 103 and instruction read buffer 107 may be any suitable memories, such as register, register file, SRAM, DRAM, flash memory, hard disk, solid state disk, or any suitable memory or any new future memory. Instruction memory 103 may function as a cache of the system or as a level 1 cache when other cache levels exist. It may be subdivided into memory blocks on the memory section that stores the data the processor core 111 will fetch, such as instructions in the instruction block.

Filler 202 fetches instruction or instruction block from lower level memory and fills them into instruction memory 206 based on the address provided by active list 204. Then, the instruction block is filled into instruction read buffer 107 from instruction memory 206, ready to be read by processor core 111. Here, fill means move instruction from a lower level memory to a higher-level memory. Memory access means the processor core 111 reads instructions from memory or instruction read buffer 107.

The memory block in both the table entries in table 204 and instruction memory 206 correspond to each other one-to-one. In each of the entries of active list 204 is a pair of memory block address of an instruction block, and its block number (BNX) in memory 206. The block number in this invention indicates the location of the storage block in instruction memory 206. The branch target instruction address generated by scanner 208 may be matched with the instruction block memory address stored in active list 204 to determine if the branch target is already stored in instruction memory 206. If the target instruction block is not yet in instruction memory 206, then fill it into 206. At the same time a corresponding pair of instruction block addresses and block number (BNX) will be established in active list 204. The Match referred to in this disclosure means comparing two values. When the two values are equivalent then the match is successful, else it is 'not a match'.

Scanner 208 scans the instructions from low level memory that were filled to instruction memory 206, and extracts information such as: instruction type, instruction source address and branch offset, and based on this information calculates the branch target address. In this invention, branch instruction or branch point is any appropriate instruction that may cause processor core 116 to change the execution flow (such as: executes instruction not in order). Branch source means a branch instruction; branch source address is the instruction address of the branch instruction; branch target instruction is executed after a successful branch. Branch Target Address is the address a successful branch transfer transfers to; it is also the address in the branch target instruction. For example, instruction type may include conditional branch instruction, unconditional branch instruction, and other instruction types, etc. Instruction type may include condition branch instruction sub categories, such as branch on equal, on greater, etc. Unconditional branch instruction may be viewed as a type of condition branch instruction, with always taken condition. Other information may also be included. Scanner 208 sends the above information and address to other modules, such as active list 204 and track table 210.

Instruction read buffer 107 contains at least one instruction block including the current instruction block. Every row in instruction read buffer may contain a lesser number or the same number of instructions as the number of instructions in an instruction block in memory 206. When each row of IRB and an instruction block have the same number of instructions, the corresponding instruction block number may represent the IRB rows. If the rows in IRB 107 have fewer instructions than those in memory instruction block, multiple rows would be equivalent to one instruction block, and lesser significant address bit may be added to the block number to identify the IRB row. For example, if there is an instruction block whose BNX is '111', its corresponding rows in IRB 107 will be identified as '1110'; and '1111'.

For ease of following explanation, the rows in IRB 107 are assumed to have the same number of instructions as the number of instructions in instruction blocks in instruction memory 206.

In this invention, IRB 107 may automatically provide instructions for processor core 111 to execute based on the execution state of processor core 111.

Track Table 210 has a plural number of track points. A track point is a table element of a track table. It may hold at least one instruction's information, such as instruction type, branch target address, etc. In this invention, an instruction in instruction memory is addressed by the same track table address of its corresponding track table entry. The track table entry corresponds to a branch instruction containing the track table address of its branch target instruction. A track is a plural number of track entries (track points) corresponding to one instruction block in the instruction memory 206. The same block number indexes a track and its corresponding instructions block. The track table includes at least one track. The number of track points may be the same number of entities in a row on track table 210. Track table 210 may also be organized in other forms.

The first address (BNX) and second address (BNY) may be employed to index a track point (i.e. instruction) in the track table (instruction memory). The first address represents the instruction block number of the track point; the second address represents the position (address offset) of the track point (and its corresponding instruction) in the track (memory block). If the track point has a branch type, the address content of the track point denotes its branch target. The first address in the track point identifies the target track and the second address identifies the target instruction on the target track. Therefore, track table is a table whose own address corresponds to branch source instruction and its content corresponds to branch target address.

Scanner 208 extracts the instruction information being stored in instruction memory 206, and then stores the extracted information in the corresponding entries in track table 210. If the instruction is a branch instruction, the branch instruction's branch target instruction address is calculated and sent to Active List 204 to be matched. When it is matched, it gets the block number (BNX) of the branch target instruction. If branch target address is not yet in active list 204, the branch target address is sent to filler 202 that reads instruction blocks from lower level memory. At the same time, replacement logic in the active list assigns a block number BNX for the instruction block; the more significant part of the target address is stored in the active list 204 entry and the instruction block fetched by Filler 202 is filled into the memory block indicated by the block number. Then the BNX and the lower part of target address are stored in the corresponding TT entry as first and second address.

The tracks in Track Table 210 and the memory block in instruction memory 206 correspond one-to-one and both use the same pointer. The instructions to be executed by Processor Core 111 may all be filled into instruction memory 206 and IRB 107. To preserve program order relationship between tracks, there is an end track point beyond the track point corresponding to the last instruction on every track, which stores the first address of the sequential next track's instruction block. If instruction memory 206 stores multiple instruction blocks, when an instruction block is being executed, the sequential next instruction block is stored into instruction memory 206 and IRB 107, ready to be executed by processor core 111. The address of the next instruction block is the sum of the address of previous instruction block and the block size. This address is also sent to Active List 204 for matching, the instruction block obtained is filled into instruction memory 206 and the BNX is filled into the end track point of the current track. The instructions in this new block being filled into 206 are also scanned by scanner 208, and the extracted information fills the corresponding track as described before.

Read pointer of tracker 214 points to the track point in track table 210 which corresponds the first branch instruction after the entry in track table which the read pointer of tracker 214 is comprised of a first address pointer and a second address pointer. The first address pointer points to the track currently being executed in track table 210. The second address pointer points to the first branch track point, or the end point if there is no branch track point remaining on the track, after the track point corresponds to the current instruction currently being executed. The first address pointer indexes instruction memory 206, fetching the target or next instruction block to be filled into IRB 107, in preparation for Core 111 to execute if it successfully takes a branch.

If tracker 214 points to a branch instruction but the branch is not taken, the read pointer of tracker 214's points to the next branch track point, or the End track point if there is no more remaining branch track point on the track. IRB 107 provides fall-through instructions following the not taken branch instruction for Core 111 to execute.

If branch instruction pointed to by the tracker 114 takes a branch, the first address and the second address of the branch target become the new address pointer of the tracker, pointing to the track point corresponding to the branch target in the track table. The new tracker address pointer also points to the recently filled branch instruction block, making it the new current instruction block. Instruction read buffer 107 provides branch target instruction and the sequential instructions of the current branch instruction to processor core 111 for execution. Then, the read pointer of the tracker 214 points to the first branch instruction track point after the current instruction in the track corresponding the new instruction block, or to the end track point if no more branch track points remain on the track.

If tracker 214 points to the End track point in the track, the content of the End track point is updated to the read pointer of tracker 214, that is, the read pointer points to the first track point of the next track, thereby pointing to the new current instruction block. Then, the read pointer of the tracker 214 points to the first branch instruction track point after the current instruction in the track containing the current instruction in the track table 210; or End track point when there are no more branch track points in the remaining track. Repeat the said sequence. The instruction may be filled to the instruction memory 206 and IRB 107 before it is executed by the processor core 111. The Core 111 may fetch the instruction with minimum latency, therefore improving the performance of the processor.

As used herein, when the address from scanner 208 does not match in active list 204, the address will be sent to filler 202 to fetch the corresponding instruction block from lower level memory. At the same time, the active list 204 assigns an entry storing the block address of the instruction block and thus forms a block address/block number pair. Block address in this disclosure means the address of the starting instruction of the instruction block. The instruction memory in this disclosure is logically divided into a plural number of memory blocks. Each memory block stores an instruction block and corresponds to inactive List which stores the block address. The same block number addresses an Active List entry and its corresponding instruction memory block in memory 206.

The scanner 208 may examine every instruction from the instruction memory 206, extract instruction type, and calculate branch target instruction address. The said branch target address may be calculated as the sum of branch address and the branch offset. The more significant part of the branch target address is matched with the content of Active List 204 to obtain the corresponding block number which is the first address. The less significant part of branch target address, the offset address within the block, is the second address.

For the End track point, the sum of instruction block address and the instruction block length is the block address of the next sequential instruction block. Then the block address may be matched as a branch target address to obtain its block number, which is stored in the End point.

If the more significant part of target address is matched in active list 204, then active list 204 outputs the corresponding block number to track table 210. If it is not matched, then Active List 204 sends this address to fill 202 via bus 244 to fill the corresponding instruction block to instruction memory while assigning a block number to this address and outputting this block number to track table 210.

A new track may be placed into a replaceable row in track table 210. If there is a branch instruction in the instruction block corresponding to the said new track, a branch track point is built in the corresponding track entry. The said branch track point may be located by the address of branch source instruction. For example, the more significant part of branch source address may be mapped into a track number (block number) and index a track; the less significant part (offset) of the source address indexes an entry on the track.

Each track point or track table entry in the track table row may have a format including type field, first address (XADDR) field, and second address (YADDR) field. Other fields may also be included. The type field represents the instruction type of the corresponding instruction. Type field may represent the type of the instruction corresponding to the track point, such as conditional branch, unconditional branch, and other instructions. XADDR field is also known as first dimension address, or first address. YADDR field is also known as second dimension address, or second address.

The content of a new track point may correspond to a branch target address. That is, the branch track point stores the address information of a branch target instruction. For example, the block number of the target track in track table 210 is stored in the said branch track point as first address. The offset address of the branch target instruction is the second address stored in the said branch track point.

The End track point of the tracks is a special track point. Because the End track point points to the first instruction of the Next block, the format of the End track is a type of unconditional branch and the first address of the sequential next block in program order, but without the second address. Alternatively, a constant '0' may be placed in the second address field.

Figure 2A:
FIG. 2A illustrates an exemplary track point format consistent with the disclosed embodiments.

FIG. 2A shows an exemplary track point format consistent with the disclosed embodiments. As shown in FIG. 2A, non-ending track point may have a content format including an instruction type 322, a first address 334, and a second address 336. The instruction type of at least two track points of the track may be read out at the same time. Therefore, the instruction types of all non-ending track points in the track may be stored together, while the first address and the second address of these non-ending track points may be stored together. The End track point may only have a content format including an instruction type 332 and a first address 334, and a constant 338 with a value '0'. Similarly, instruction type 332 of the End track point and non-ending track points may also be stored together, while the first address 334 and constant 338 of the End track point may be stored after the first address and the second address of all non-ending track points of the track. Further, because the second address of the ending track point is the constant 338 with a value of '0'; therefore, the constant may not be stored. The second address '0' is produced directly when tracker 214 points to the ending track point.

Figure 2B:
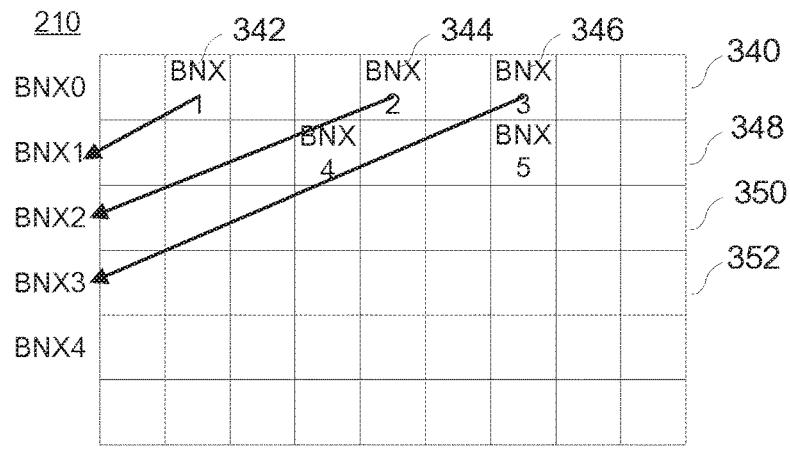
FIG. 2B illustrates an exemplary embodiment of building a new track consistent with the disclosed embodiments.

As shown in FIG. 2B, an existing track 340 (denoted as BNX0) may include three branch instructions or branch points 342, 344, and 346. When examining branch point 342 (a target block number BNX1 is matched or assigned in the active list), a new track 348 (next available row denoted as BNX1) is created to contain the target instruction of branch point 342, and the block number in track table 210 (i.e., BNX1) is recorded in branch point 324 as the first address. Similarly, when examining branch point 344 (a target block number BNX2 is matched or assigned in the active list), another new track 350 (denoted as BNX2) is created in track table 210 and the block number is recorded in branch point 344; when examining branch point 546 (a target block number BNX3 is matched or assigned in the active list), another new track 352 (denoted as BNX3) is created in track table 210 and the block number is recorded in branch point 346. Therefore, new tracks corresponding to all branch points in a single track may be created.

As used herein, the second address stored in the track point of each branch instruction is an offset of the instruction block containing the branch target instruction of the branch instruction.

The described various embodiments above use a direct addressing mode to calculate the branch target address and implement an instruction pre-fetching operation. However, an indirect addressing mode may also be used. In the indirect addressing mode, at the beginning, the register value (e.g., a base register value) is determined, thereby calculating the branch target address. The register value is changed based on the result of instruction execution. Therefore, when a new value is calculated for the base register of an indirect branch but is not yet written in the base register, the new value may be bypassed to perform the target address calculation and subsequent operation.

Figure 3:
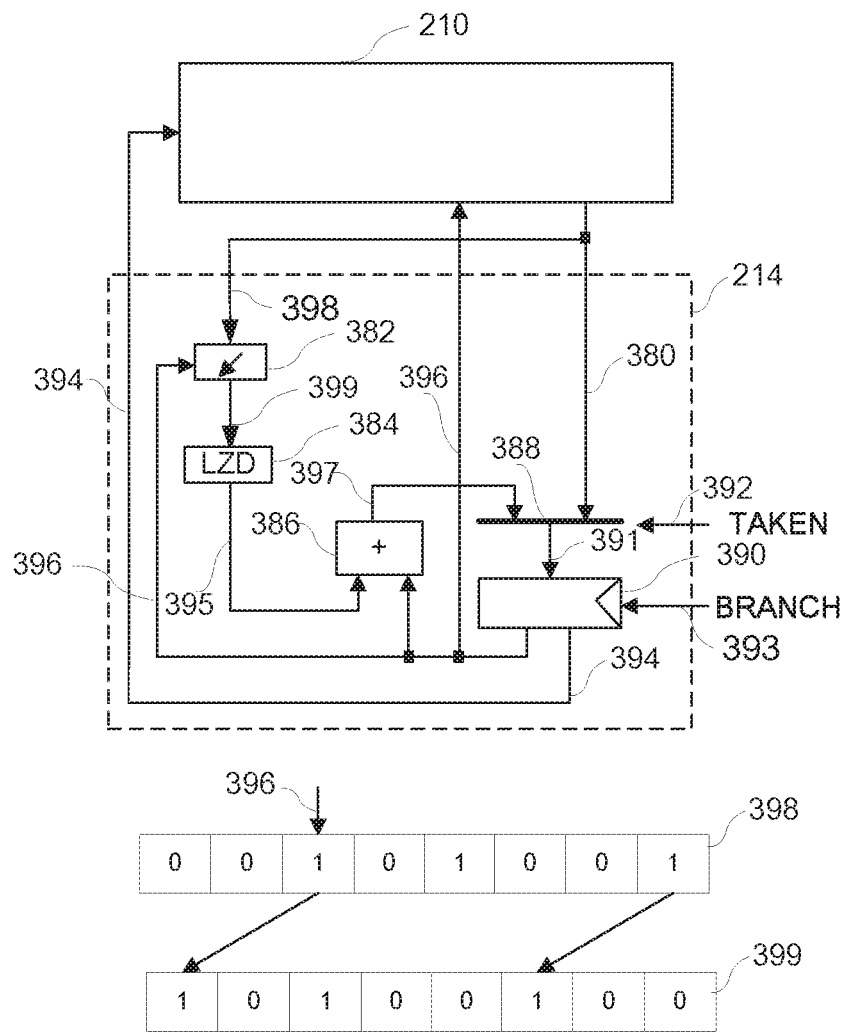
FIG. 3 illustrates an exemplary movement of the read pointer of the tracker consistent with the disclosed embodiments.

FIG. 3 is an exemplary movement of the read pointer of the tracker consistent with the disclosed embodiments. As shown in FIG. 3, the read pointer of the tracker skips the non-branch instructions in the track table, and moves to the next branching point of the track table to wait for branch decision by the processor core 111. The parts or components without relevance may be omitted in the present embodiment in FIG. 3. In the present embodiment, assuming that the instruction type and other extracted instruction information stored in the memory 210 are arranged from left to right in increasing address order, i.e., the program order. It is also assumed that the instruction type '0' in the memory 210 indicates that the corresponding instruction is a non-branch instruction, and the instruction type '1' in the memory 210 indicates that the corresponding instruction is a branch instruction.

The entry representing the instruction pointed to by the second address 396 (block offset, BNY) in a track pointed to by the first address 394 (block number, BNX) in the memory 210 may be read out at any time. A plurality of entries, even all entries representing instruction types in a track indexed by the first address 394 in the memory 210, may be read out at the same time.

On the right of the entry corresponding to the instruction with the largest offset address in each row of the memory 210, an end entry is added to store the address of the next instruction currently being executed in sequence. The instruction type of the end entry is always set to '1'. The first address of the instruction information in the end entry is the instruction block number of the next instruction. The second address (BNY) is always set to zero and points to the first entry of the instruction track. The end entry is defined as an equivalent unconditional branch instruction. When the tracker points to an end entry, an internal control signal is always generated to make multiplexer 388 select the output 380 of the track table (TT) 210; another control signal is also generated to update the value of register 390. The internal signal may be triggered by the special bit in the end entry of TT 550 or when the second address 396 points to the End entry.

In FIG. 3, the tracker 114 mainly includes a shifter 382, a leading zero counter 384, an adder 386, a multiplexer 388 and a register 390. A plurality of instruction types representing a plurality of instructions that are read out from the TT 210 are shifted to the left by shifter 382. The shift amount is determined by the second address pointer 396 outputted by register 390. The left most bit of the shifted instruction type 399 outputted by the shifter 382 is a step bit. The signal of the step bit and BRANCH signal from the processor core together determines the update of the register 390. The multiplexer 388 is controlled by the signal TAKEN. The output 391 of the multiplexer is the next address, which includes the first address portion and the second address portion. When TAKEN is '1' (there is a branch), the multiplexer 388 selects output 380 of the TT 210 (including the first address and the second address of the branch target) as the output 391. When TAKEN is '0' (there is no branch), the multiplexer 388 selects the current first address 394 as the first address portion of the output 391 and the output 397 of the adder as the second address portion of the output 391. Instruction type 399 is sent to the leading zero counter 384 to calculate the number of '0' instruction types (representing the corresponding instruction is a non-branch instruction) before the next '1' instruction type (indicating the corresponding instruction is a branch instruction). In the calculation the step bit is treated as if it is a '0' regardless of if the step bit is actually a '0' or '1'. The number 395 (step number) of the leading '0' is sent to the adder 386 to be added with the second address 396 outputted by the register 390 to obtain the next branch source address 397. It should be noted that the next source branch address is the second address of the next branch instruction of the current instruction, and the tracker 214 skips non-branch instructions that are before the next source branch address.

When the second address points to an entry representing an instruction, the shifter controlled by the second address shifts a plurality of the instruction types outputted by the TT 210 to the left. At this moment, the instruction type representing the instruction read out by the TT 210 is shifted to the left most step bit of the instruction type 399. The shift instruction type 399 is sent into the leading zero counter to count the number of instructions before the next branch instruction. The output 395 of the leading zero counter 384 is a forward step of the tracker. This step is added to the second address 396 by the adder 386. The result of the addition operation is the next branch instruction address 397.

When the step bit signal of the shifted instruction type 399 is '0', which indicates that the entry of the TT 210 pointed to by the second address 396 is a non-branch instruction, the step bit signal controls the update of the register 390; the multiplexer 388 selects next branch source address 397 as the second address 396 while the first address 394 remains unchanged, under the control of '0' TAKEN signal 392. The new first and second address point to the next branch instruction in the same track, non-branch instructions before the branch instruction are skipped. The new second address controls the shifter 396 to shift the instruction type 398, and the instruction type representing the branch instruction is placed in step bit 399 for the next operation.

When the step bit signal of the shifted instruction type 399 is '1', it indicates that the entry in the TT 210 pointed to by the second address represents branch instruction. The step bit signal does not affect the update of the register 390, while BRANCH signal 393 from the processor core controls the update of the register 390. The output 397 of the adder is the next branch instruction address of the current branch instruction in the same track, while the output 380 of memory is the target address of the current branch instruction.

When the BRANCH signal is '1', the output 391 of the multiplexer 388 updates the register 390. If TAKEN signal 392 from the processor core is '0', it indicates that the processor core has determined to execute operations in sequence at this branch point. The multiplexer 388 selects the source address 397 of the next branch. The first address 394 outputted by the register 390 remains unchanged, and the next branch source address 397 becomes the new second address 396. The new first address and the new second address point to the next branch instruction in the same track. The new second address controls the shifter 396 to shift the instruction type 398, and the instruction type representing the branch instruction bit is placed in step bit 399 for the next operation.

If the TAKEN signal 392 from the processor core is '1', it indicates that the processor core has determined to jump to the branch target at this branch point. The multiplexer selects the branch target address 380 read out from the TT 210 to become the first address 394 outputted by the register 390 and the second address 395. In this case, the BRANCH signal 393 controls the register 390 to latch the first address and the second address as the new first address and the new second address, respectively. The new first address and the new second address may point to the branch target addresses that are not in the same track. The new second address controls the shifter 396 to shift the instruction type 398, and the instruction type representing the branch instruction bit is placed in step bit 399 for the next operation.

When the second address points to the end entry of the track table (the next line entry), as previously described, the internal control signal controls the multiplexer 388 to select the output 530 of the TT 210, and update the register 390. In this case, the new first address 394 is the first address of the next track recorded in the end entry of the TT 210, and the second address is zero. The second address controls the shifter 396 to shift the instruction type 398 zero bit to start the next operation. The operation is performed repeatedly, therefore the tracker 214 may work together with the track table 210 to skip non-branch instructions in the track table and always point to the branch instruction.

As used herein, Active List 104 needs replacement when it is full and a new block address/block number pair is created. A correlation table, which records the status of each block as a target of a branch, is employed to prevent the track table entry from branching to a block that has already been replaced. Only the blocks in instruction memory together with their corresponding Active List entry, which are not branch targets, are candidates for replacement.

Figure 4:
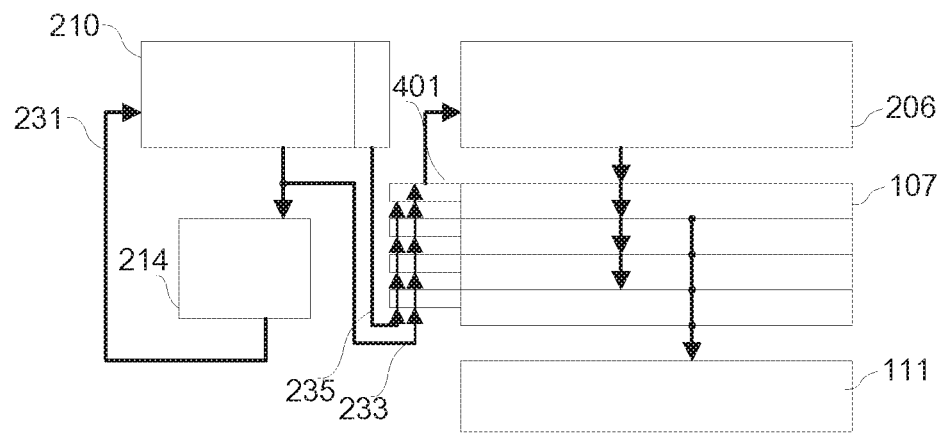
FIG. 4 illustrates an exemplary embodiment of the said IRB 107 that provides instructions to Core 11 for execution consistent with this disclosure.

FIG. 4 is an exemplary embodiment of the said IRB 107 that provides instructions to Core 111 for execution consistent with this disclosure. For ease of explanation, only TT 210, tracker 214, instruction memory 206, IRB 107, its control unit 401, and processor core 111 are shown.

In FIG. 4, read pointer 231 of tracker 214 moves along a track in track table 210 and stops at the first branch entry after the instruction currently being executed. The content of the branch entry BN 233, including BNX and BNY, are sent to control unit 401. In addition, the content of the End point 235 (the address of first instruction in the next sequential instruction) is also sent to 401.

Control unit 401 stores the corresponding block numbers of the instructions of each row in IRB 107. In this embodiment, each row of IRB stores one instruction block of memory 206. Control unit 401 matches first address (BNX) of the received branch source BN, branch target BN, and End Point with its content. The instruction blocks needed are already in IRB if matched. The unmatched BNX is sent to memory 206 to fetch the needed instruction block to fill in a replaceable row in IRB 107. The replaceable row is determined in a similar manner as the replacement of Active List 204.

Figure 5:
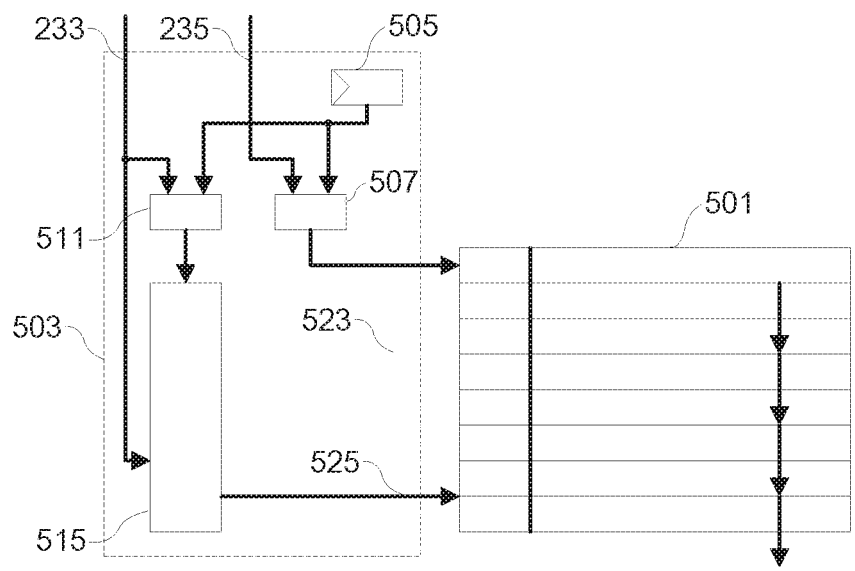
FIG. 5 illustrates an exemplary control unit undergoing configuration consistent with this disclosure.

Further, the second address (BNY) in the source or target BN is used to index the corresponding branch instruction or branch target instruction from the matched rows of IRB 107. FIG. 5 is an exemplary matching process of the said control consistent with the disclosed embodiments. In this embodiment, presume instruction memory 206 already contains all the needed instruction blocks.

As shown in FIG. 5, an instruction block 501 in 107 holds 8 instructions organized from top to bottom in increasing offset address order. Sub-block 503 of control unit 401 consists of first address register 505, next instruction block address comparator 507, branch target address comparator 511, and target address decoder 515. 505 stores the block number of instruction block 501. Comparator 507 compares BNX on bus 235 with the content of 505. If matched, the matched output of 507 points to the first (top) instruction in 501, because the instruction block is the Next sequential instruction block of the instruction currently being executed. Block 501 is not the next sequential block if not matched.

Comparator 511 compares BNX on bus 233 with the content of 505. If matched, the matched output of 511 enables address decoder 515 to decode the BNY address on bus 233. Output 525 of decoder 515 points at one of the instructions in 501, the branch target. If not matched, output of 511 disables 515. This indicates 501 is not the target instruction block.

Back to FIG. 4, when read pointer 231 of tracker 214 points to a new track, the End point 235 is read out and sent to control unit 401 to be compared by the comparators 507 with the first addresses in each of the first address registers 505. If not matched, the control unit 401 sends the BNX to instruction memory 206 to fetch instruction blocks and fill it into IRB 107. If matched, then the next sequential block is identified in IRB 107.

Read pointer 231 of Tracker 214 moves and stop at the first branch point after the track point corresponding to the instruction currently being executed as afore described. As used herein, the branch source and branch target addresses are sent to control unit 401 and compared as described in FIG. 5. The branch source location may be identified since the instruction block containing the branch source is already in IRB 107. The branch target location may also be identified through matching. The control unit 401 sends the branch target BNX to memory 206 to fetch the corresponding instruction block and fill it to IRB 107 if not matched. Therefore, the target location is known in IRB 107.

Thus, location of branch source, branch target and first instruction of the next sequential block are found through matching in control unit 401.

As used herein, the clock received by 401 depends on the system clock and the pipeline status of process core 111. Control Unit 401 receives a valid clock when Core 111 needs an instruction. Control Unit 401 receives no clock signal when Core 111 does not need new instructions, for example, during pipeline stall. Token passers are included in 401, and each passer corresponds to an instruction. The passers pass an active Token signal, which denotes the instruction the CPU needs. Control Unit 401 updates the token passer for every valid clock cycle, and passes the Token to token passer corresponds to the instruction the Core 111 needs next. Thus, the control unit controls IRB 107 to outputs the right instruction to Core 111 based on the Token signal.

This embodiment is only an example of how the control unit 401 takes initiative in serving instructions to Core 111 based on its needs. Other handshake signals or communication protocols to guarantee control unit 401 that take initiative in sending needed instructions to processor core 111 are also under the protection of this disclosure.

Figure 6:
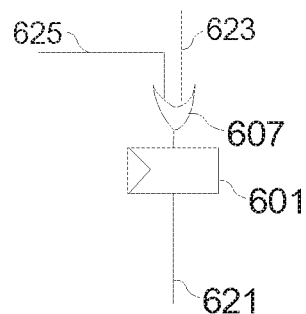
FIG. 6 shows an exemplary token passer corresponding to each instruction in the IRB 107.

FIG. 6 shows an exemplary token passer corresponding to each instruction in the IRB 107. Token passer in FIG. 6 includes a token signal register 601 and an OR logic 607, and the output 621 of one of the said token passers connects to the input 623 of another token passer in the order of instruction address sequence, to pass the token when executing instruction in sequence without branch. Token signal register 601 is resettable.

If there is no taken branch, the TAKEN signal that controls the resets of all token registers 601 are not active ('0'). Each token passer receives the token signal from the previous stage on input 203 and propagates the active Token under the control of clock of control unit 401. When a branch is taken, the TAKEN signal controls resets of all token registers 601 to be active '1', thus blocking the passing of the current active Token signal. The branch target decoder generates a new Token to be inserted to an OR logic 607 via 625 The new Token is subsequently latched the corresponding token register 601 and thus completes the Token signal insertion.

Figure 7:
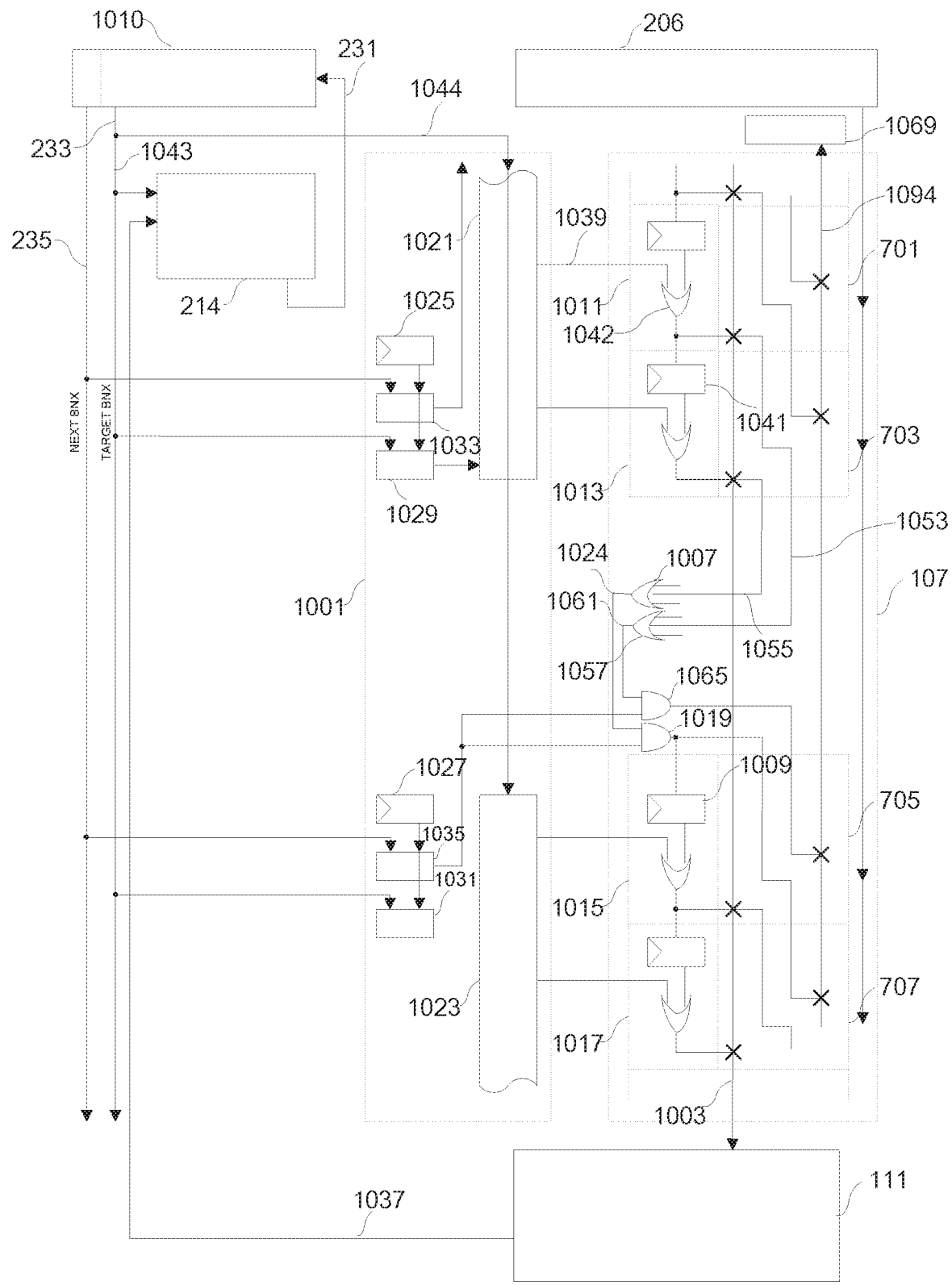
FIG. 7 illustrates another exemplary of token signal passing consistent with the disclosed embodiments.

FIG. 7 illustrates another exemplary of token signal passing consistent with the disclosed embodiments. For convenient illustration, FIG. 7 only includes a track table 1010, an instruction memory 206, a tracker 214, a control unit 1001 and an IRB 107 which includes some token passers. Herein, the token passers (1011, 1013, 1015 and 1017) each correspond to instructions (701, 703, 705 and 707). Instruction memory 206 and tracker 214 are the same as in FIG. 4. The token signal registers in the token passers have a reset port so that all the token signal registers may be reset to '0' at the same time. The control unit 1001 includes target decoders (such as 1021 and 1023), registers (such as 1025 and 1027) which are used to store BNX of the corresponding instruction blocks, target BNX comparators (such as 1029 and 1031) which are used to match BNX of the branch target block and next BNX comparators (such as 1033 and 1035) which are used to match BNX of the next instruction block. Herein, the function of Target BNX comparator is the same as the comparator 511 in FIG. 5 and the function of Next BNX comparator is the same as the comparator 507 in FIG. 5.

The branch source pointer 231 of tracker 214 points to track table 1010, and then it reads out the branch target address 233. Herein, the target BNX 1043 is sent to branch target comparators (such as comparator 1029 and 1031) in control unit 1001 and compared with the BNX address of each instruction. A corresponding branch target decoder (1021 or 1023) is enabled if 1043 matches one of the BNXs stored in the registers. The enabled decoder receives the BNY of branch target address and inserts the token signal into the token passer corresponding to the branch target instruction. In control unit 1001, once the branch is taken, it resets all of the token passers to '0', and clears the token signal that corresponds to branch source instruction block, and then the target decoder inserts a Token to the token passer that corresponds to the branch target instruction. In this embodiment, the input of the token signal register of the first token passer of each instruction block comes from an AND gate. One input of the AND gate couples to the global bus 1024, the other input couples to the output of the next instruction block BNX comparator.

The track 214 also reads out the next instruction block address 235 though branch source pointer 231 from track table 1010 and then sends the address to each next instruction block comparator (such as comparator 1033 and 1035) in control unit 1001 and compares it with each instruction block BNX (such as the BNX stored in register 1025 and 1027). The matched result is sent to AND gate (such as 1019) of the first token passer of the corresponding instruction block. In this embodiment, the token state of the last token passer of each instruction block couples with one input of the OR gate 1007 to generate the global bus 1024. Thus, the output 1024 of OR gate 1007 is '1' when Token reaches the last token passer of any instruction block. The token bus 1024 couples with one input of the AND gate (such as 1019) of the first token passer of each instruction block. The other input of these AND gates couples with the output of the corresponding Next instruction block comparator. At this time, the output of the matched comparator (such as the comparator 1035) is '1' and the state of the bus 1024 is '1', thus the output of the AND gate corresponding to the match instruction block is '1' and the Token is sent to the first token passer of corresponding instruction block.

Further, the output of OR gate 1007 is sent to the AND gate (such as AND gate 1019) that corresponds to each instruction block. The other input of the said AND gate couples with the output of the Next comparator (such as the comparator 1033 and 1035), which is used to determine the next instruction block. Its output is sent to the first token passer (such as token passer 1015) in an instruction block in IRB 107. The Next block BNX read out from the End track point on the current track in track table 1010 is sent to next BNX comparators in control unit 1001 though bus 235, and this BNX is compared with the BNX of the corresponding instruction. Here the instruction block of instructions (705 and 707) is the one next instruction block, so only the result of next BNX comparator 1035 is '1', the results of the other next BNX comparator is '0'. Thus the AND gate 1019 outputs a '1' and this value is written into token signal register 1009. The value of token signal registers in other token passers are '0', thus the token signal may pass to the token passer that corresponds to the first instruction of next instruction block pointed to by the End point in track table. It outputs the correct instruction to CPU core for execution and the Token is passed to next instruction block from the current instruction block.

On the other hand, when the branch instruction is taken, it needs to pass a token from the token passer that corresponds to the current instruction to the token passer that corresponds to the branch target instruction. Let's assume that the token passer 1017 in FIG. 7 corresponds to the branch target instruction and the instruction 701 is the branch target instruction. In this embodiment, when the branch TAKEN signal 1037 is generated by CPU core 111, this signal is sent to reset port of all token signal registers to clear the token signal. The target BNX is read out from track table 1010 and is sent to all target BNX comparators to be compared. In this example, only the result of the target BNX comparator 1029 is '1', and it controls the target decoder 1021 to decode the BNY of target track point. Based on the decoding result, the word line 1039 of target decoder 1021 is '1', it inserts token signal to OR gate 1042, and controls the storage 701 to output branch target instruction 701 to CPU core 111 though bus 1003. At the next clock cycle, the token signal is passed to token passer 1013 and outputs instruction 703.

As is used herein, the processor pipeline may be partitioned into front-end pipeline and back-end pipeline by the location of the TAKEN signal. A duplicated front-end pipeline may be added to the CPU core so that the IRB may provide both the fall through instruction and the branch target instruction to the CPU core after a branch instruction.

The two front-end pipelines in CPU core execute the instructions after the branch instruction, when the TAKEN signal 1037 is generated; it selects one of the two execution results of front-end pipeline to be further executed by the back-end pipeline. It ensures the pipeline suffers no branch penalty no matter if the branch is taken or not.

Back to FIG. 7, there is another bus 1094 couples with each instruction so it may be read out two clock cycles ahead and be pre-processed by a pre-processing unit 1069. Thus the token passer is capable of providing the current instruction for normal execution and the instruction after next instruction for load/store instruction at the same time. Herein, the instruction that corresponds to token signal is sent to CPU core 111 for execution, the instruction after next instruction is sent to pre-processing unit 1069 to perform the load/store operation ahead of time.

In this embodiment, the token signal is passed over global bus when the two instructions outputted are not in the same instruction block. That is, the current instruction is located at the current instruction block but the instruction after the next instruction is located at the Next instruction block. In particular, the last two token passers of an instruction block may each outputs the value of its token signal register and send the value to OR gate (1057 and 1007) though bus (1053 and 1055). When the Token signal is at the token passer before the last token passer of the current instruction block, IRB outputs the corresponding instruction, the token signal is also sent to OR gate 1057 though bus 1053 and the output of OR gate 1057 is sent to AND gate 1065 though global bus 1061. In here, it is assumed that the token passer coupled to AND gate 1065 is the Next instruction block. The output of AND gate 1065 is '1' because the other input of the AND gate 1065 couples with the output of the Next BNX comparator whose output is '1.' Therefore, the first instruction of the said Next instruction block may be outputted with the instruction before the last instruction of the current instruction block at the same time. On the other hand, when the token signal is at the last token passer of the current instruction block, IRB outputs the corresponding instruction, the token signal is also sent to OR gate 1007 though bus 1055 and the result of the OR gate 1007 is sent to AND gate 1019 though global bus 1024. The output of AND gate 1019 is '1' because the other input port of AND gate 1019 couples with the output of Next BNX comparator which is '1', thus the second instruction of the said next instruction block may be outputted with the last instruction of the current instruction block at the same time.

Figure 8A:
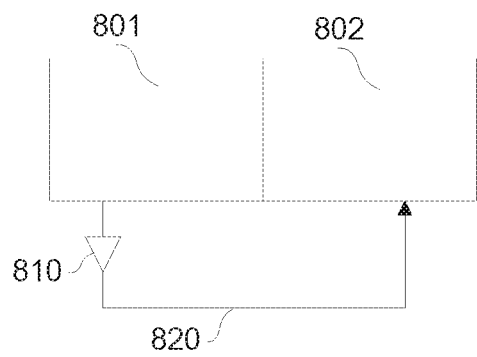
FIG. 8A shows an exemplary intra-lane bus consistent with this disclosure.
Figure 8B:
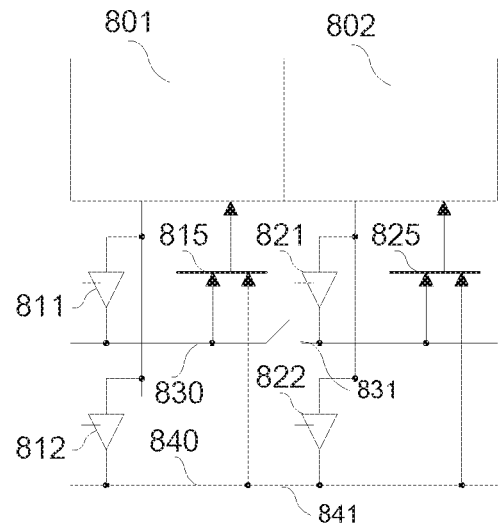
FIG. 8B shows another exemplary intra-lane bus consistent with this disclosure.

As used herein, processor system may contain multiple lanes; each lane contains an independent IRB, register, execution unit and read/write unit. Data in one lane may be sent to other lanes through the intra-lane bus, which enables exchanging information between lanes. FIG. 8A, shows an exemplary intra-lane bus consistent with this disclosure. The lane 801's output driver 810 drives bus 820 to send data to lane 802. For example, driver 810 drives output of execution unit in lane 801 through bus 820 to RF or execution unit in lane 802. Please refer to FIG. 8B. The output transfer gates 811 and 812 of lane 801 drive intra-lane bus 830 and 840 under the control of configuration signals; transfer gates 821 and 822 of lane 802 also drive intra-lane buses 830 and 840 under the control of configuration signals. Input multiplexer 815 selects data on bus 830 or 840 as input to lane 801, while input multiplexer 825 selects data on bus 830 or 840 as input to lane 802. The input selector may be under the control of configuration signal or be controlled by the matching of operand register address. For example, R1 is the destination register of an instruction executed in lane 801; but R1 is also one of the source operands of lane 802. Then, the matching result controls multiplexer 825 to select bus 840, therefore passing the execution result of 801 through bus 840 to lane 802. The zone of intra-lane connecting may be defined by configuring control signals. For example, bus 830 is opened by switch 832, and bus 840 is closed by switch 841 in this embodiment.

Figure 8C:
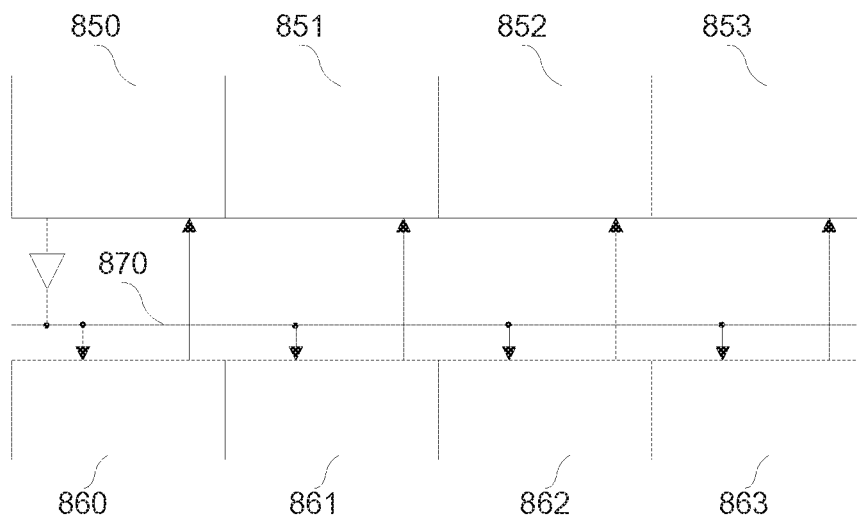
FIG. 8C illustrates an exemplary group of lanes executing the same or different instructions consistent with the disclosed embodiments.

As used herein, execution units of different lanes may take the same operand as input under certain operation mode, while each execution unit in different lanes may need individual operands as their inputs under other operation modes. FIG. 8C illustrates an exemplary group of lanes executing the same or different instructions consistent with the disclosed embodiments. Here 850, 851,852, 853 are execution units of different lanes, 860, 861, 862, 863 are register files each corresponding to an execution unit in each RF's own lane. Execution unit 850 reads and writes from the register 860 of its own lane and the other 3 lanes perform the same when each lane executes on individual operands.

The result of one execution unit may be outputted to and written in register files in multiple-lanes via intra-lane bus 870 when multiple lanes are executing the same program under certain operation modes. Thus, each execution unit in multiple lanes may read the same operand.

As used herein, multiple trackers may be used to control Multiple Instruction Multiple Data (MIMD) operations. In a typical MIMD system, multiple instruction streams are executed on multiple lanes at the same time, all those lanes may share common instruction cache and data cache.

Figure 9A:
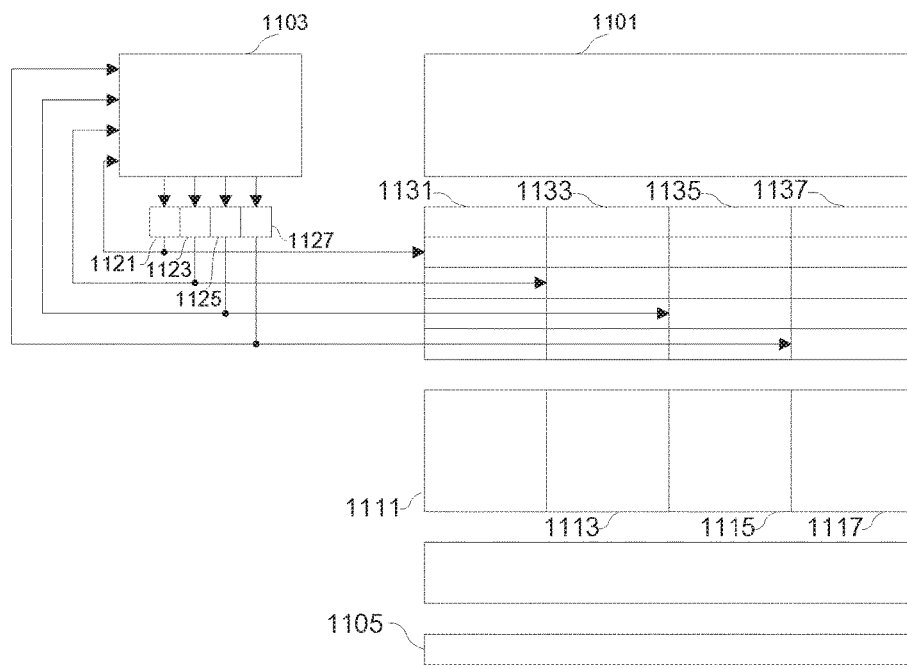
FIG. 9A illustrates an exemplary MIMD operation consistent with the disclosed embodiments.

FIG. 9A illustrates an exemplary MIMD operation consistent with the disclosed embodiments; FIG. 9A contains instruction cache 1101, track table 1103, data cache 1105, four execution units 1111, 1113, 1115, 1117, four trackers 1121, 1123, 1125, 1127, and four IRB s 1131, 1133, 1135, 1137 corresponding to the four execution units. Each execution unit has its own register file, Arithmetic Logic Unit (ALU) and decoder, and may independently execute instructions sent from the corresponding IRB.

In this embodiment, track table 1103 has four read ports; each serves one tracker to read out content of its own track point at the same time. Each tracker functions as afore described, the read pointer moves and stops on the first branch after the instruction currently being executed. Instruction cache 1101 provides the next sequential blocks and target blocks to the 4 IRB s based on the matching results of the target addresses in the IRB s. Each IRB provides instructions to its corresponding lane for decoding and execution under each lane's own token passer.

Figure 9B:
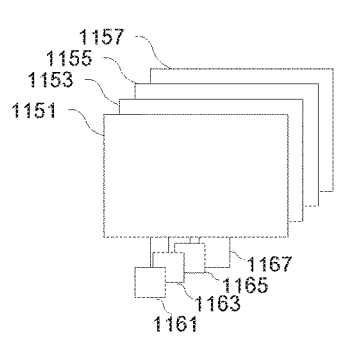
FIG. 9B illustrates an exemplary multiple TTs with identical content that supports MIMD operation consistent with the disclosed embodiments.

Four track tables with identical content, that each supports its own tracker, may replace the 4 port track table 1103 in FIG. 9A. FIG. 9B illustrates an exemplary multiple TTs with identical content that supports MIMD operation consistent with the disclosed embodiments. Track tables 1151, 1153, 1155, and 1157 contain the same content, and each outputs the track points content indexed by read pointers of each TT's own tracker 1161, 1163, 1165, and 1167. When a new track is added or an old track is replaced in one of the TTs, the same is performed on other TTs to maintain the content consistency, and thus implement the same function as in FIG. 9A.

Figure 9C:
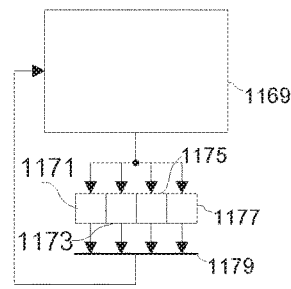
FIG. 9C illustrates an exemplary Time division multiplexing TT consistent with the disclosed embodiments.

Time division multiplexing may provide multiple track point contents using a one port TT and multiple trackers. FIG. 9C illustrates an exemplary Time division multiplexing TT consistent with the disclosed embodiments. One of the read pointers outputted by the four trackers 1171, 1173, 1175 and 1177 are selected by multiplexer 1179 to index TT 1169. Track table 1169 outputs track table content to all four trackers. Only the tracker that requested content accepts the content while the other trackers do not accept the content. The four trackers may perform time division multiplexing to visit the track table, because not every tracker needs to visit the track table in each cycle. The control of multiplexer 1179 may be based on the execution priority in each of the four lanes. This enables the control of the number of instructions being executed in each of the lanes to be different in the same period of time. Further, higher frequency clock may be provided to TT 1169 and trackers 1171, 1173, 1175, and 1177 (such as the frequency of this clock is four times of the frequency of the lane's clock), so within a system clock cycle, track table may output track point content to all trackers one by one. This way, each IRB provides non-store instructions for the corresponding lanes.

Figure 9D:
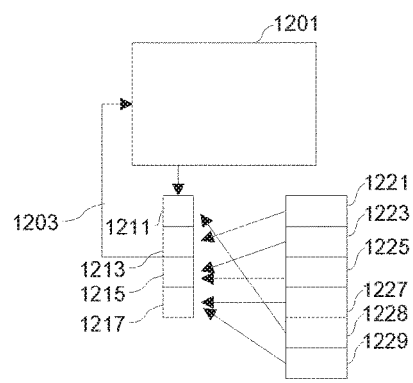
FIG. 9D illustrates an exemplary embodiment providing subsequent track information to multiple lanes consistent with the disclosure.

As used herein, subsequent tracks after multiple branch points may also be utilized based on the information stored in multiple branch point in the track table. The said subsequent tracks including the sequential next track and branch target track. FIG. 9D illustrates an exemplary embodiment providing subsequent track information to multiple lanes consistent with the disclosure.

In FIG. 9D, track table 1201 outputs information of four tracks 1211, 1213, 1215, and 1217 based on the branch point indexed by read pointer outputted by tracker 1203. The information of the four tracks are: track information 1211 is of that the branch indexed by 1203 (the first branch) and the following branch (the second branch) are both not taken; track information 1213 is of that the first branch is not taken but the second is taken; track information 1213 is of that the first branch is taken but the second is not taken; track information 1213 is of that the first and second branch are both taken.

The registers 1221, 1223, 1225, 1227, 1228, and 1229 in FIG. 9D each stores the branch histories of the corresponding six lanes. When the lanes are executed to the said branch points, each value in the 6 registers are '01', '10', '10', '11', '00', and '11'. Based on that, the $5^{th}$ lane selects track information in 1211 to direct further execution, the $1^{st}$ lane selects track information in 1213 to direct further execution, and the $4^{th}$ and $6^{th}$ lanes select track information in 1217 to direct further execution. This way, the same one tracker provides subsequent track information based on the execution of two branches in 6 lanes, enables 6 lanes to execute the same instruction. Thus enabling the parallel execution of multiple branches with small hardware cost.

At the same time an independent temporary track may be provided for each tracker to relieve the track table access bottleneck when multiple trackers visit the same track table. Please refer to FIG. 9E, which is an example of this invention's temporary track row.

Figure 9E:
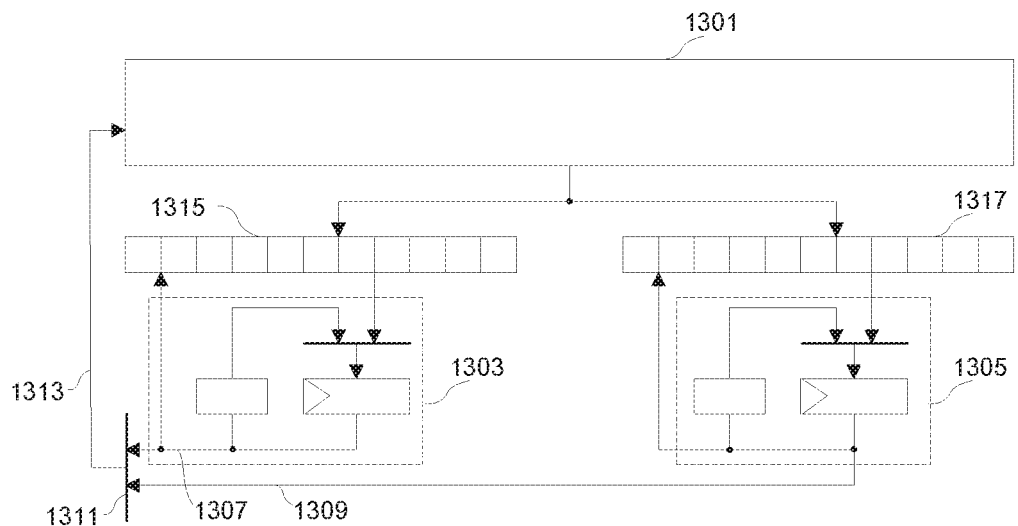
FIG. 9E illustrates an exemplary embodiment of the temporary track row consistent with the disclosed embodiments.
Figure 9F:
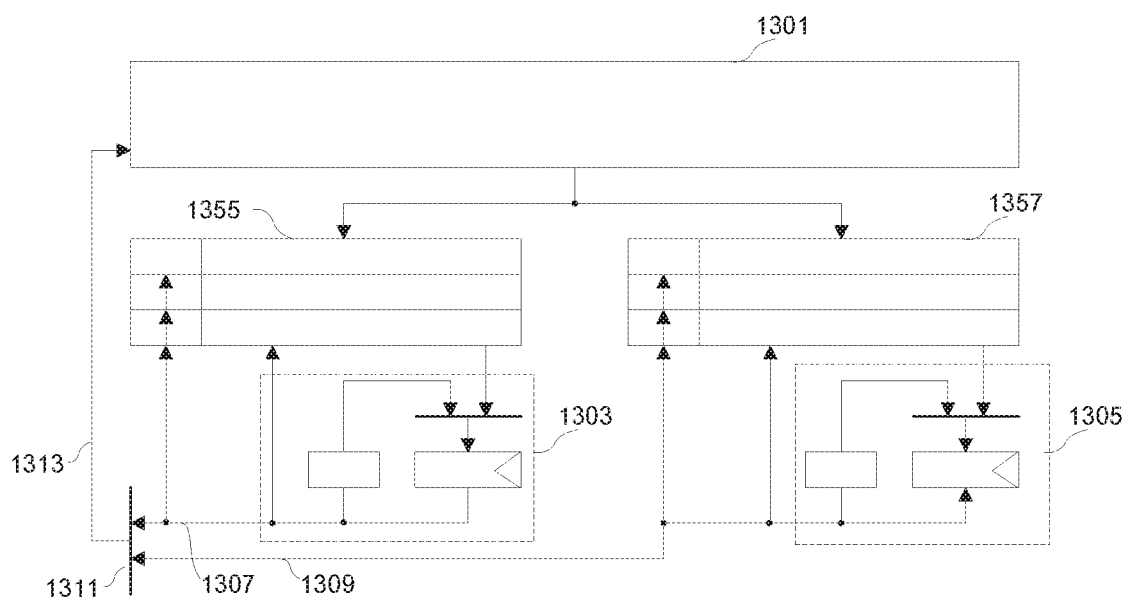
FIG. 9F illustrates an exemplary embodiment of the micro track table consistent with the disclosed embodiments.

Take two trackers 1303 and 1305 accessing track table 1301 at the same time as an example. When tracker 1303's read pointer 1307 points to a new track, multiplexer 1311 selects read pointer 1307's value and sends it to index track table 1301 via bus 1313. The entire track is read out and stored in temporary track row 1315. Then, track point may be directly read out from temporary track row 1315 instead of accessing track table 1301 as long as the read pointer of tracker 1303 still indexes the same track. When tracker 1305's read pointer 1309 points to a new track, multiplexer 1311 selects read pointer 1309's value and sends it to index track table 1301 via bus 1313. The entire track is read out and stored in temporary track row 1317. Then, track point may be directly read out from temporary track row 1317 instead of accessing track table 1301 as long as the read pointer of tracker 1305 still indexes the same track. This reduces the access conflict and number of accesses to track table 1301, and power consumption at the same time Further, the scale of the temporary track row may be increased to better work with the tracker. FIG. 9F is an exemplary micro track table consistent with disclosed embodiments.

In this embodiment, track table 1301, tracker 1303 and 1305 are the same as those in 9E. The difference is that 9F uses micro track table 1355 and 1357 to replace 9E's temporary track rows 1315 and 1317. In FIG. 9E, when tracker's read pointer points to a new track, the corresponding temporary track row's content is replaced. In this embodiment, when tracker's read pointer points to a new track, the said new track's content will be written into a replaceable row in the micro track table (use traditional memory replacement policies). Each track in the micro track table has a register that stores the track's corresponding BNX. The BNX value of the tracker read pointer is matched with the BNXs stored in micro track table, to check if the track indexed by the tracker read pointer is already stored in the track table and its position if it is already in the track table. This way, when tracker's read pointer points to the current track again, the corresponding track point is found and read out from the micro track table instead of accessing track table 1301 again. This further reduces track table 1301's access conflict by the two trackers and reduces the power consumption at the same time.

Micro track table's row number may be the same as or different from the corresponding IRB's instruction block number. When micro track table's row number and the block number of the instruction block of the IRB are the same, the two may correspond. If the two exactly correspond, the two may use the same BNX comparator, and do not need to have their own comparators.

This said instruction cache of the disclosure could store multiple different programs at the same time, as the tracks corresponding to each program in the track table are orthogonal. Trackers for each program run on its own tracks without crossing each other. The only exception is the common subroutines called by different programs but even in that case, different programs return to its own tracks at the completion of the common subroutine execution.

As used herein, a general purpose token passer unit may be constructed under the multiple lane processor environment. The general purpose token passer not only controls the instruction execution of its own lane but may also correlate with token passers of other lanes to achieve synchronous operations between multiple lanes such as ILP or SIMD, etc. The said token passers of multiple lanes are organized as a matrix, which may be configured to support different modes of operations.

Figure 10A:
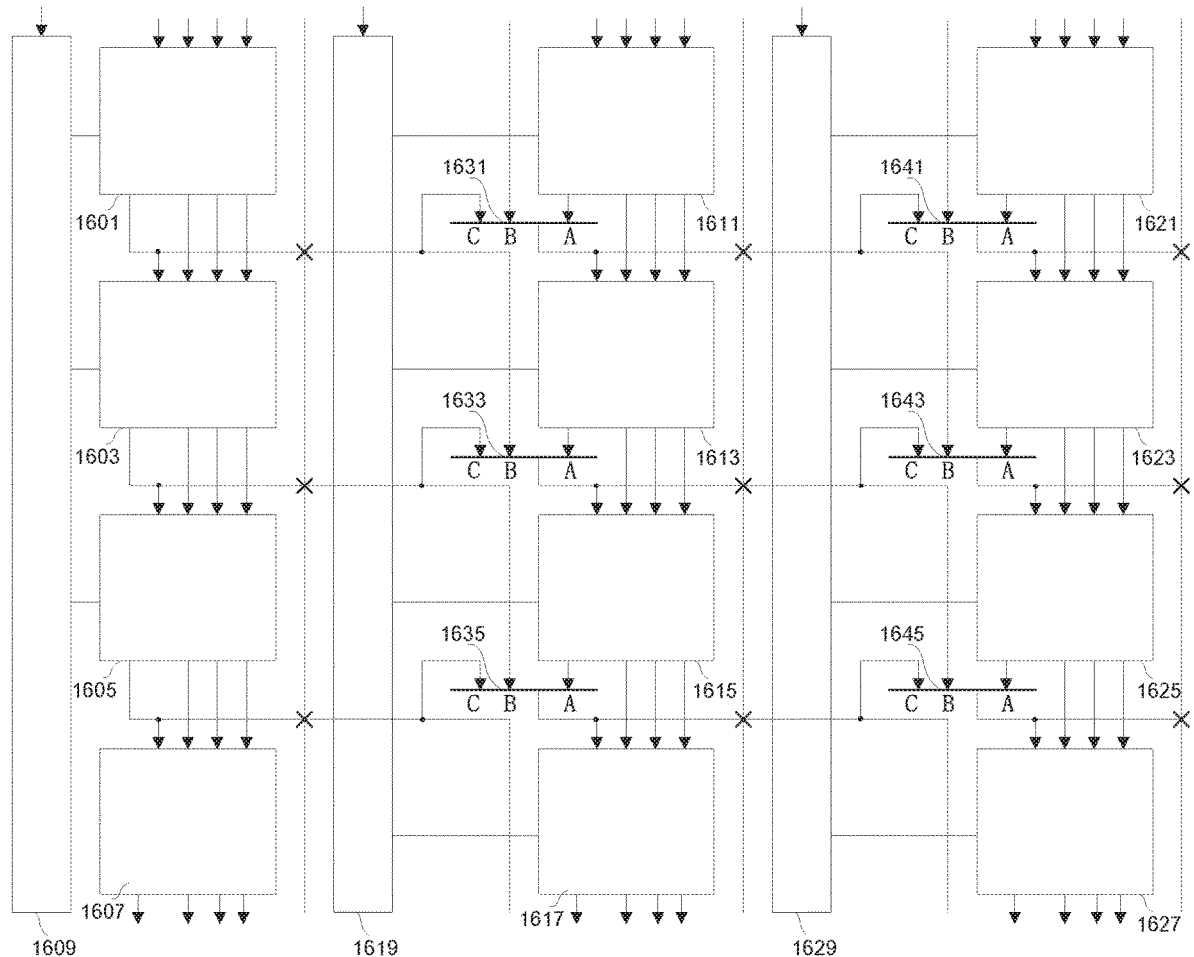
FIG. 10A illustrates an exemplary token passer array consistent with this disclosure.

FIG. 10A is an exemplary token passer array consistent with this disclosure. A matrix of 12 token passers is shown. As aforementioned, each row of token passers corresponds to an IRB for a lane. A part of the token passers in 3 lanes are shown here, where each token passer corresponds to an instruction in IRB. Each token passer is formed by a basic passer (such as 1611) and a 3-input multiplexer (such as 1631). Please refer to FIG. 10B, which is the said basic token passer in the token passer matrix of this disclosure.

Figure 10B:
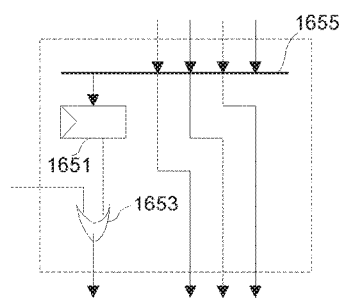
FIG. 10B illustrates an exemplary basic passer structure within the arrays of the said token passers.

In FIG. 10B, each basic passer is made of at least one token signal register 1651, an OR gate 1653, and a multiplexer 1655. As stated before, token passer may also have a more complicated structure to implement more functions. One of the inputs of OR gate 1653 is from the target decoder. The other one is from the output of token signal register 1651. Output of multiplexer 1655 goes to the input of token signal register 1651. Return to FIG. 10A, all columns, except for the left most column, have a three input multiplexer: 1631, 1633, 1635, 1641, 1643, and 1645. These multiplexers may be configured to define the relation between the columns. The left most column may also have three input multiplexers but it should be configured to only accept input A, which is accepting the token passing within this column.

The token passer of each column may be configured as not related to other columns and each lane executes the instructions in the IRB of its own lane (each lane executes different programs). Multiplexers 1631, 1633, 1635, 1641, 1643, and 1645 in FIG. 10A all select the output of the token passers in its own respective column (input A of the multiplexer). This way, token passers 1601, 1603, 1605, and 1607 constitute the first column's token passer that may successively pass token signals independently from other columns; token passer 1611, 1613, 1615 and 1617 constitute second column that may successively pass token signal; token passers 1621, 1623, 1625 and 1627 constitute the third column's token passer that may successively transfer token signal. Three groups of token passers each may control its own IRB to provide instructions for its own lane's execution, and thus implement the function of an MIMD processor. The plural number of trackers shown in the embodiment in FIG. 9 provide branch target addresses and next instruction block addresses to each group of token passers. This correlation within the token passers is named column correlation.

When the IRBs of these columns store the same exact instructions, then every track executes the same instruction at the same time (such as GPU's operation). Here, the left most column may be configured as lead column under the direction of a single tracker. The other columns on the right are configured as following columns, which follow and synchronize with the lead column. at the same time As used herein, the configuration of lead column and following column form a row correlation relation. Specifically, multiplexers 1631, 1633, 1635, 1641, 1643 and 1645 of FIG. 10A all select the output of token passer on its left (input C of multiplexers). That is, basic passers 1611 and 1621 both do not work, multiplexers 1631 and 1641 pass the basic passer 1601's token signal value; basic passers 1613 and 1623 both do not work, multiplexer 1633 and 1643 pass basic passer 1603's token signal value; basic passer 1615 and 1625 both do not work, multiplexer 1635 and 1645 pass the basic passer 1605's token signal value. This way, when the Token signal is in basic passer 1601, basic passer 1601's token signal value not only controls the output of instruction to the lane corresponding to basic passer 1601, it also is passed to multiplexer 1631 and multiplexer 1641, and from there controls the instruction output to lanes corresponding to basic passers 1611 and 1621.

Similarly, when Token signal is passed to basic passer 1603, it controls the output of instructions corresponding to basic passer 1603, basic passer 1611 and basic passer 1621, each to its own lane at the same time. In this mode, the initial token passer drives the passive token passer to output the same instruction, implementing the function of SIMD or GPU.

The lead column and following columns may be configured as a diagonal correlation. Specifically, multiplexers 1631, 1633, 1635, 1641, 1643, and 1645 of FIG. 10A all select output of token passer to its upper left (multiplexer's output B). That is, token passer 1613 and 1625 both output token passer 1601's token signal value, token passer 1615 and 1627 both output token passer 1603's token signal value. This way, when the Token signal is in basic passer 1601, basic passer 1601's token signal value not only controls the output of instruction to the lane corresponding to basic passer 1601, it also is passed to multiplexer 1633 and multiplexer 1645, and from there controls the instruction output to lanes corresponding to basic passers 1613 and 1625.

Similarly, when token signal is passed to basic passer 1603, it controls the output of instructions corresponding to basic passer 1603, basic passer 1615 and basic passer 1627, each to its own lane at the same time. In this mode, the lead token passer drives the passive token passer to output multiple contiguous instructions, implementing the function of ILP processor.

The said configurable processor system of this disclosure may be configured to implement the function of multiple different processors. Different lanes each execute an instruction of a segment of contiguous instructions when the said processor system is configured as an ILP processor. In this case, it is necessary to check the data dependence between the multiple instructions outputted by the IRBs in the same cycle. The data dependence between the multiple instructions outputted by the IRBs in the neighboring cycles are also checked, so the output of execution unit may be bypassed to the execution unit executing the later instruction which has data dependence, and thus improve the instruction execution efficiency at the same time.

As used herein, a plural number of lanes may be configured in ILP mode. FIG. 11 is an exemplary configurable multiple lane processor system with token passer matrix consistent with disclosed embodiments. An ILP configuration with maximum issue width 4 is used as an example. In FIG. 11, module 1701 contains token passer array and the corresponding instruction read buffer (in this example it corresponds to 4 lanes). By configuration, initial token passers pass token signal, and the following token passer accepts the token signal from the token passer at its upper left, in diagonal correlation. Unused parts are omitted for simplicity. As stated before, module 1701 is capable of outputting the continuous 4 instructions starting with the one corresponding to the token signal in every clock cycle.

Module 1703 may be configured to perform dependency check on continuous instructions. Using the dependency check on 4 contiguous instructions as an example. Four lanes 1411, 1413, 1415 and 1417 of module 1701 output the said 4 contiguous instructions via bus 1461, 1463, 1465, and 1467. Destination register addresses of the first three instructions of the said contiguous four instructions are put on bus 1711, 1713, and 1715. The eight operand source register addresses of the said 4 continuous instructions are put on bus 1721, 1723, 1725, 1727, 1731, 1733, 1735 and 1737. As shown in FIG. 11, there are configurable comparators at the crossing of bus 1711, 1713, and 1715 to bus 1725, 1727, 1731, 1733, 1735, and 1737. The instruction dependent check may be performed according to the configuration of those comparators to compare source register addresses of particular instructions to the destination register addresses of other instructions. The configuration of the comparators (that is configured as to compare or not to compare), decides to compare source register address of certain instructions with the destination register address of certain other instructions, and thus conduct the inter-instruction dependence check.

The hollow circle in these embodiments represents comparators configured to perform comparison. The source operand register addresses of the same instruction are ORed together. That is, the results of the two comparators at the crossing of bus 1725, 1727 and bus 1711, which are configured to compare the two source register addresses of the second instruction with the destination register address of the first instruction, are ORed by OR gate 1743; the results of the comparators at the crossing of bus 1731, 1733 and bus 1711, 1713, which are configured to compare the two source register addresses of the third instruction with the destination register addresses of the first and second instruction, are ORed by OR gate 1745; the results of six comparators at the crossing of buses 1735, 1737 and buses 1711, 1713, 1715, which are configured to compare the two source register addresses of the forth instruction with the destination register addresses of the first, second and third instructions, are ORed by OR gate 1747. In this embodiment, the two source register addresses are not needed to compare with destination register addresses of other instructions. Therefore, the comparators at the crossings of bus 1721, 1723 and bus 1711, 1713, 1715, 1717 are configured as not to compare. Thus the output of OR logic 1741 is '0'.

Then, the outputs of OR logic 1741, 1743, 1745, and 1747 are sent to each logic's own decision block 1751, 1753, 1755, and 1757 in the four lanes 1411, 1413, 1415, and 1417. In FIG. 11, each decision block accepts output of the OR gate in its own lane. In addition, the decision modules are cascaded; each module accepts the outputs from the module in the lane to its right, which is also shifted downward by one position. And the decision module's remaining input left out by the downward shift of the right hand lane module output is connected to output of the OR gate in the right hand lane. For example, decision block 1755 accepts the output of OR logic 1745, its $1^{st}$ right hand side input on the top accepts the output of OR logic 1747 on its right, its $2^{nd}$, $3^{rd}$ and $4^{th}$ right hand side inputs accepts the $1^{st}$, $2^{nd}$ and $3^{rd}$ outputs of decision block 1757.

To support the 4 maximum issue rate, the 4 corresponding decision blocks are configured to be a dependency checker. In this dependency checker, the input to the last stage decision block (the left most) are grouped as selection signal 1739, which controls the multiplexers in the token passer, control the proper passing of Token signal.

In this embodiment, each decision block has the same structure. Please refer to FIG. 12; it illustrates an exemplary internal structure of dependency checker consistent with the disclosed embodiments. As used herein, it is not necessary to check Write after Read (WAR) hazard and Read after Read (RAR) hazard; it only needs to check Read after Write (RAW) hazard and Write after Write (WAW) hazard. That is, if the source register address (operand) of an instruction is the same as the destination register address of one instruction before this instruction, these two instructions cannot be executed in parallel. When two instructions are writing to the same destination register, the result of the first instruction should be discarded, only the result of the second instruction is written to RF.

In this embodiment, each instruction uses at most two source registers and one destination register is used as an example. Other scenarios may be deduced by analogy. In checking the RAW hazard, the destination register addresses 1711, 1713 and 1715 extracted from the first three instructions are compared with the source register addresses 1725, 1727, 1731, 1733, 1735 and 1737 extracted from the instructions after the first instruction. Specifically, the destination register address 1711 of the first instruction is compared with each source register address 1725, 1727, 1731, 1733, 1735 and 1737. The destination register address 1713 is compared with each source register address 1731, 1733, 1735 and 1737. The destination register address 1715 is compared with each source register address 1735 and 1737. The said comparison result of a lane is sent to the decision logic attached to the lane.

In this embodiment, the OR gate in the last stage of the decision logic group (the left most because the decision of each group is made from right to left) is forced to be '1'. Each stage of the rest of the decision logic processes the comparison result of its corresponding lane and the decision result from the decision block of the previous stage. The decision result of the last stage of these logics becomes selection signal 1739, which controls the multiplexers in each of the token passers in FIG. 11.

Assume the Token signal is in token passer 1431, then the four instructions corresponding to token passer 1431, 1433, 1435 and 1437 are sent to dependency check unit and execution unit at the same time via bus 1461, 1463, 1465 and 1467. The execution unit decides which of these four instructions may be executed in parallel depending on the detection result of the dependency check unit. Selection signal 1739 outputted by dependence check unit is sent to each token passer controlling the passing of Token signal.

Figure 12:
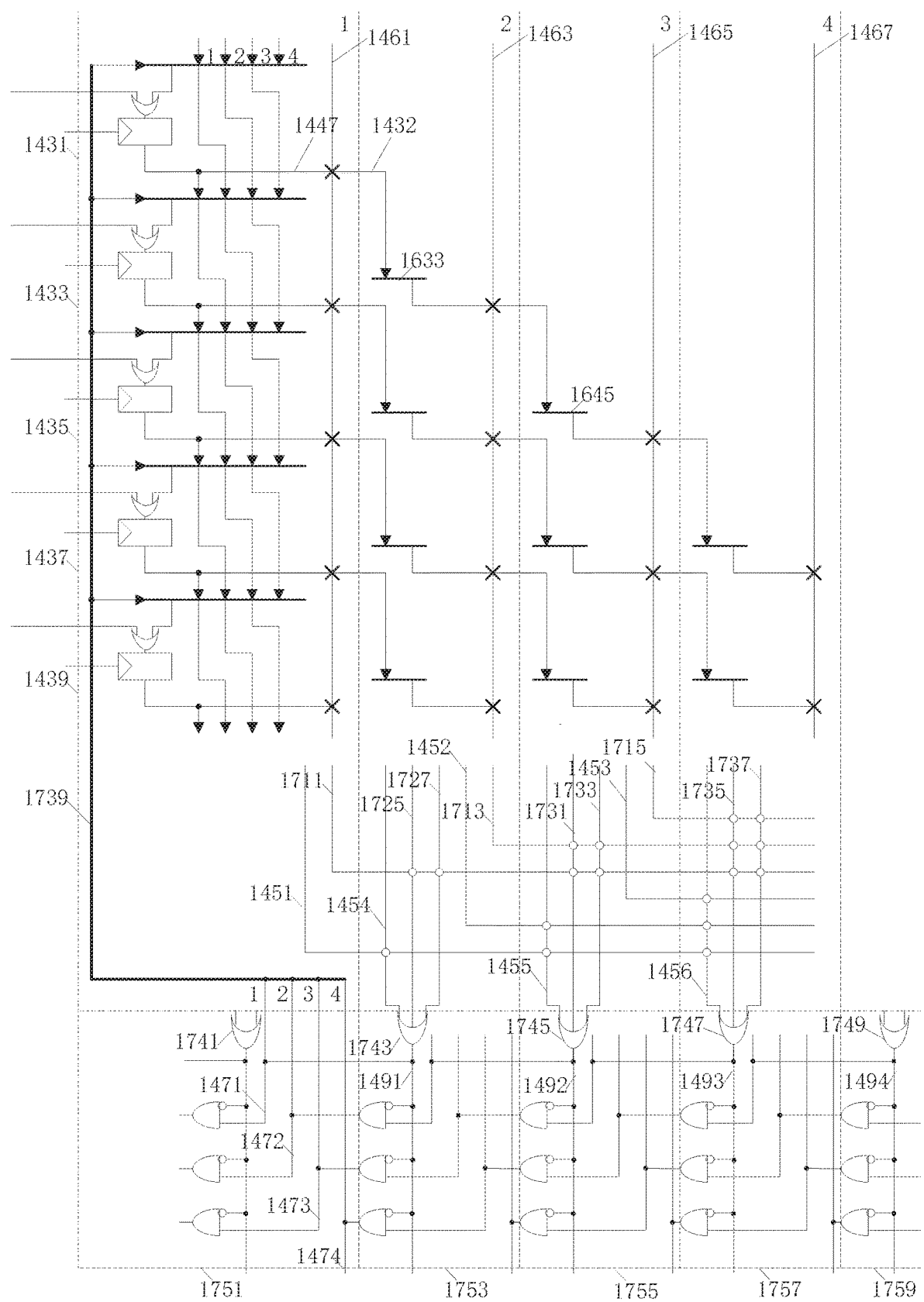
FIG. 12 illustrates an exemplary internal structure of dependency checker consistent with the disclosed embodiments.

The process of dependency check is illustrated in both FIGS. 11 and 12. Assume the Token signal is in token passer 1431, lanes 1411, 1413, 1415 and 1417 each respectively issues instructions via bus 1461, 1463, 1465 and 1467. Output of OR gate 1741 is forced to '1' to block the effect of this group of dependency decision logic on the next group. Output of OR gate 1749, which is the last stage of another decision logic, is also forced to '1' to block the effect of that group of dependence decision logic to this decision group. If there is no dependency between the four issued instructions, the outputs of the OR gates 1743, 1745, and 1747 are all '0'. The outputs the decision block 1759 sends to decision block 1757 are '1', '0', '0' and '0' from top to bottom. In decision block 1757, because the output of OR gate 1747 is '0', the outputs the decision block sends to decision block 1755 is then '0', '1', '0' and '0' from top to bottom. In the same manner, the outputs of the decision block 1755 are '0', '0', '1' and '0' from top to bottom, and the outputs the decision block 1753 are '0', '0', '0' and '1' from top to bottom. Shift blocker logic 1753, 1755, and 1757 all do not block the passing of signal, the '0' signals on 1491, 1492, and 1493 are respectively shifted to become 1471, 1472, and 1473 (that is dependency is not detected on instructions 2, 3, and 4), signal of 1494 is fixed as '1' and shifted and passed to arrive at signal 1474, setting the control signal that controls the four-input multiplexers in each token passer to the value '0001', to select the fourth input of all four-input multiplexers. The fourth input of each four-input multiplexer is '0', except the four-input multiplexer in token passer 1439, this multiplexer's fourth input is connected to control line 1447 whose value is '1'. Therefore, token signal skips over token signal passers 1433, 1435, and 1437, and is passed into token passer 1439. Because there is no dependency on the four instructions in the beginning of the instruction corresponding to token signal passer 1431, these four instructions may be successfully issued in parallel; all of these four instructions may be executed by execution units. The next clock cycle, IRB outputs the four instructions starting from the instruction that corresponds to token passer 1439, to processor core for execution and to dependency check unit for checking.

Back to the issue of four instructions starting with the one corresponding to token signal passer 1431. If only the fourth instruction (the instruction corresponding to token signal passer 1437) has dependency (fourth instruction has dependency with any of the first three instructions), then dependency bit 1493 is '1', making the 3 AND gates of shift blocker logic 1757 all output '0', blocking the passing of signal 1494, and signal 1493 goes through two stages of shifting to arrive at signal 1473. Making the control signals controlling all the four-input multiplexers in each token passer to be '0010', selecting the third input of all the four-input multiplexers. The third input of all the four-input multiplexers are '0', except for the four-input multiplexer in token passer 1437, whose third input is connected to control line 1447 whose value is '1'. This way, token is passed into token passer 1437. This is because the instruction that token passer 1437 corresponds to has dependency with the first three instructions, and cannot be issued at the same time with these three instructions, and must be re-issued in a new clock cycle. Then, execution units may only execute the said first three instructions. The next clock cycle, IRB outputs the four instructions that start at the instruction of token signal passer 1437 to processor core for execution and to dependency check unit for checking. The instructions corresponding to token passer 1437 are outputted from bus 1461 of first lane 1411 at this time (the previous cycle outputted from bus 1467 on fourth lane 1417).

Back to the issue of four instructions starting with the one corresponding to token signal passer 1431. If the second (corresponding to token passer 1433) and fourth instructions (corresponding to token passer 1437) both have dependency with previous instructions, the dependency signal 1493 of the fourth instruction is therefore '1', making the three AND gates in shift blocker logic 1757 output '0', therefore blocking the passing of signal 1494; and signal 1493 shifts and passes to the left. However, at this time, the dependency bit 1491 of the second instruction is '1', making the three AND gates in shift blocker logic 1753 to output '0', therefore blocking the passing of signal 1493; 1491 itself reaches signal 1471, making the control signals of all the four-input multiplexers in token passer to be '1000', selecting the first input of all four-input multiplexers. Each first input of the four-input multiplexers is '0', except the four-input multiplexer in token passer 1433, whose first input connects to the control line 1447 whose value is '1'. Therefore, token signal is passed into token passer 1433. Then, execution units may only execute the said first instruction. The next clock cycle, instruction buffer outputs the four instructions corresponding to the beginning instructions of token signal passer 1433 to processor core to execute and to dependency check unit 1449 to check. The instructions corresponding to token passer 1433 are this time outputted from bus 1461 in first lane 1411 (the previous cycle outputted from bus 1463 on second lane 1413).

In this embodiment, because the multiplexers in token passer are four-input multiplexers, and dependency check unit is configurable, therefore it may support at most four issues. To issue less number of instructions in parallel, the dependency check unit module may be correspondingly configured, blocking the passing of dependency bit. For example, in FIG. 12, to carry out 3 issues in parallel, the dependency bit 1493 may be configured as '1', blocking the AND gates of judgment module 1757, making the signals 1471, 1472, and 1473 of control signal 1739 have one and only one '1' among them, and signal 1474 is '0'. According to the dependency check result of the first three instructions (instructions on buses 1461, 1462, and 1463) token signal is correspondingly passed to the first, second, or third token signal passer after the current token signal passer, to achieve 3-issue ILP. Any other appropriate maximum number of instructions may be configured in a similar manner.

As used herein, to save electricity, a smaller issue rate may be configured and power supply of unused lanes may be shut off. A smaller issue rate may also be configured so the other lanes may be used for other purposes.

In some of the instruction set architectures, comparing the values in registers makes branch decision. In these circumstances, the correct branch instruction execution may be guaranteed using the dependency check method described above.

In some other instruction set structures, branch decision may be made based on flags, which usually are the execution result of a prior instruction. In these circumstances, additional logic may be added to check the dependency of those flags. For example, in FIG. 12, the values on buses 1451, 1452, and 1453 respectively represent if the first, second, and third instructions are flag setting instructions, and the values on buses 1454, 1455, and 1456 respectively represent if the second, third, and fourth instructions are branch instructions that use said branch flags. This way, use the same method as the said register dependency check, to determine if there is dependency between flag setting instructions and branch instructions, to ensure correct branch instruction execution.

Back to FIG. 11, module 1705 contains corresponding execution units; module 1709 contains the corresponding lane's register files of the said four lanes 1411, 1413, 1415, and 1417. Each register file has two read ports (read port A and read port B), and four write ports. The said read port A and read port B may support the read out of two source operands at the same time. In this embodiment, the said four write ports support the writing back of the 4 execution results of the 4 instructions in 4 lanes at the same time in support of coherently executing the contiguous instructions of the same program by multiple lanes. The same value is at the same time written into register files of all four lanes, thus guaranteeing the coherence of value in these 4 register files. Thus, when execution unit in each lane reads out data from the lane's register file, it reads the same data. 'Write after write' dependency check should also be performed, so only the execution result of the last of the multiple instructions that have the same destination register address is written back to the RFs. The WAW dependence check may be performed in a similar manner as the WAR dependence check shown in FIG. 12. For ease of comprehension, the WAW dependence check is not shown in the figures, but should be easy to implement by an average person skilled in the art.

There are intra-lane data buses between the lanes, which carry data from one lane to the plural number of other lanes. Please refer to FIG. 11, execution unit in each lane has transfer gate under the control of configuration register, driving the execution result of each execution unit to the intra-lane buses. Each execution unit in the lanes has multiplexer under the control of bypass logic, which may receive data put on the intra-lane buses by other lanes.

Module 1707 contains the bypass logic. In this embodiment, the destination register addresses of the instructions in the previous clock cycle are delayed to be matched with the source register addresses of all the instructions in the current cycle, to determine if the execution results produced by the execution units may be bypassed as the source operands of the corresponding instructions before those results are written back into RF. The hollow circles in module 1707 represent comparators. The destination register address 1711, 1713, 1715, and 1717 of the said contiguous 4 instructions are put on buses 1781, 1783, 1785, and 1787 after each is delayed by their respective registers 1771, 1773, 1775, and 1777.

It is presumed that the four instructions of the previous cycle have no data dependency for easy of explanation. Thus, the source register addresses of the current cycle instructions are compared with all four destination register addresses of the previous cycle. If there is data dependency in the previous cycle, it is handled similarly. The source register addresses of the current cycle instructions are only needed to be compared with the destination register addresses of all previous cycle instructions that may be executed in parallel (in this circumstance, at least 1, at most 4).

In module 1707, first row of comparators (8 in total) respectively compare destination register addresses of the first instruction in previous cycle (value on bus 1781) and 8 source register addresses of the four instruction of the current cycle (values on bus 1721, 1723, 1735, 1727, 1731, 1733, 1735 and 1737); similarly, second row of comparators respectively compare destination register address of the second instruction in previous cycle (value on bus 1782) and 8 source register address of the four instructions of the current cycle; the third row of comparators respectively compare destination register address of the third instruction in previous cycle (value on bus 1783) and 8 source register address of the four instructions of the current cycle; and fourth row of comparators respectively compare destination register address of the forth instruction in previous cycle (value on bus 1784) and 8 source register address of the four instructions of the current cycle. Instructions of the current cycle may get operands either from bypassing results of previous cycle or from the register files. In this embodiment, only the execution result of the last instruction in last cycle should be bypassed as source operand in this cycle if the WAW check finds there are multiple instructions that have the same destination register address.

For example, the source register address 1721 of the first instruction in current cycle compares with each of the previous cycle's four destination register addresses: 1781, 1783, 1785, and 1788. The compared result 1795 controls multiplexer 1791. Multiplexer 1791 has 5 inputs, 4 of them connect to the execution results of 4 previous cycle instructions, one connects to read port A of the register file. When source register address 1721 matches with the destination and destination register address 1781, multiplexer 1791 selects execution result of the first instruction from the previous cycle. Similarly, if source register address 1721 matches destination register address 1783 or 1785 or 1787, multiplexer 1791 selects the result of the second, third, or fourth instruction from the previous cycle. If none of them match, multiplexer 1791 selects output of register file read port A as operand. Other circumstances may be reasoned through analogy.

Therefore, the main body of the said processor system of this disclosure may be constructed as a matrix of lanes of the same structure. Each lane contains instruction read buffer, execution unit, register file, data read buffer, load/store unit. The lanes share instruction cache and data cache. Further, the said processor system may be configured as processors with different functionality, such as: single instruction single data (SISD) processor, single instruction multiple data processor (SIMD), multiple instruction single data (MISD) processor, multiple instruction multiple data processor (MIMD), instruction level parallel (ILP) processor, or vector processor. It may also be Thread Level Parallel processor (TLP) if appropriate thread resources are added. Thread resources here means the duplicated instruction read buffer, register file, data read buffer, state register, and pipeline register, etc. which stores instruction, data and state. The following description is based on a processor system of 4 lanes.

FIG. 13A is an exemplary processor system consistent with this disclosure. The said processor system contains 4 lanes 1811, 1813, 1815 and 1817. The said lane is similar with the embodiment in FIG. 11, but besides the execution unit and the load/store unit, there are two sets of instruction read buffer (IRB) and two groups of register files (RF). Of these, IRB 1801, IRB 1861, execution unit 1813, RF 1821, RF 1831, and load/store unit 1841 all correspond to lane 1811; IRB 1803, IRB 1863, execution unit 1813, RF 1823, RF 1833, load/store unit 1843 all correspond to lane 1813; IRB 1805, IRB 1865, execution unit 1815, RF 1825, RF 1835, load/store unit 1845 all correspond to lane 1815; IRB 1807, IRB 1867, execution unit 1817, RF 1827, RF 1837, load/store unit 1847 all correspond to lane 1817. IRB 1801, 1803, 1805, 1807 and RFs 1821, 1823, 1825, 1827 correspond to thread Q, IRB 1861, 1863, 1865, 1867 and RF 1831, 1833, 1835, 1837 correspond to thread R. Therefore, 4 lanes and 2 threads form 8 virtual machines. Each of these virtual machines may run independently, or multiple virtual machines may run in cohesion. There are also intra-lanes buses that exchange data between lanes, and data dependence check units, which check data dependence for multi-lane cohesion operations. In this example, parts are left out whose functions have been described before.

In the afore mentioned lane structures consisting of IRB, RF, and load/store unit, the IRB fetches instruction block from instruction cache under the direction of track addresses provided by a tracker. The IRB also provides instructions to execution unit and load/store unit for execution. The execution unit decodes and executes the instructions, reads operand from and store result to RF. The load/store unit fetches data and load to RF or store data from RF to data cache.

Please refer to FIG. 13B, which is an SISD processor example of this disclosure. In this example, the structure and function of each module is the same as those of FIG. 13A. Only one lane and one set of thread resources in column correlation mode are needed for SISD operation. In FIG. 13B, IRB 1801 automatically outputs instructions to lane 1811 for execution. Lane 1811 executes the instructions, working together with RF 1821, 1831 and load/store unit 1841 in the same manner as depicted in FIG. 13A. The other three lanes and their associated IRBs, RFs and load/store units may all be shut down, for example, by stopping the clock or turning off the power of those modules. Intra-lane buses and data dependency check are not used. The load/store unit associated with Lane 1811 fetches single data. The processor system configured as in FIG. 13B is able to perform as a SISD processor, a normal single issue CPU.

Please refer to FIG. 13C, which is an SIMD example of this disclosure. In this example, each module's structure and functions are identical to those of FIG. 13A. Resources of one thread are used for SIMD operation. Four IRBs store the same instruction blocks, and provide identical instructions to four lanes, in row correlation mode under the direction of a single tracker. Each lane's corresponding RF may store different data; also each lane's corresponding load/store unit may read/write from and to different data addresses. This way, four lanes execute the same program, on each lane's own data to implement the function of a SIMD processor. Intra-lane buses and data dependency check are not used. The processor system configured as in FIG. 13C may function as a SIMD processor, such as vector processor.

The processor system of this disclosure may also function under a super SIMD mode. The usual SIMD mode is that multiple lanes execute the same instruction at the same time. When program has branching, each lane of the existing SIMD processor makes branch decision and generates lane mask. Then each lane operates according to its lane mask value. First the lanes with lane mask value '0' (branch decision is not to take) execute the non-branch instructions (the fall through instructions up to the branch instruction) while the lanes with lane value '1' stop and wait. Then, the lanes with lane mask value '1' (branch decision is to take) execute the branch target instructions while the lanes with lane mask '0' stop and wait. If there are multiple layers of branches (such as three layer branches, program may need to split 8 times and execution, efficiency may only be at 12.5%). This reduces the efficiency of multi-lane processor, making it only work for special programs without much branching. The super SIMD mode of this disclosure differs from the usual SIMD, in that multiple lanes execute the same program, but each lane has its own branch decision and instruction indexing mechanism. Each lane may execute different segments or different branches of the same program. So the processor system still has 100% efficiency executing multiple branches.

Please refer to FIG. 13D, which is a super SIMD example of this disclosure. In this example, each module's structure and function are identical to those in FIG. 13A. Resources of one thread are used for super SIMD operation. Four IRBs store the same instruction blocks, and provide instructions to four lanes, in column correlation mode under the direction of four trackers. Each lane's corresponding RF may store different data; also each lane's corresponding load/store unit may read/write from and to different data addresses. Because each lane processes its own data, executing each lane's branch decision may not be the same, even when the lanes execute the same instruction, leading to four lanes executing different branches of a program after branch points. Under this mode, each lane operates in column correlation mode under its own tracker and token passer, executing program independently and thus much more efficiently than the SIMD processor using mask register to take turns executing each of the branches. Intra-lane buses and data dependency check are not used. The processor system configured as in FIG. 13D may function as a SIMD processor with high efficiency.

Please refer to FIG. 13E, which is a MISD example of this disclosure. In this example, each module's structure and functions are the same as those in FIG. 13A. Four IRBs store different instruction blocks, and provide different instructions to four lanes, in column correlation mode under the direction of four trackers. Only one of the four load/store units is working (such as 1841 in FIG. 13E) while the other three are shut down. Data fetched by 1841 are sent to load in RFs of all four lanes via intra-lane buses. The resulting data generated by all four lanes are also sent via intra-lane buses to 1841 to be stored back into data cache. Data dependency check is not used. Each of the four lanes executes different programs on the same data source to function as a MISD processor.

Please refer to FIG. 13F, which is an MIMD example of this disclosure. In this example, each module's structure and functions are identical to those of FIG. 13A. Resources of one or both threads are used for MIMD operation. Four IRBs store different instruction blocks, and provide different instructions to four lanes, in column correlation mode under the direction of four trackers. Each lane's corresponding RF may store different data; also each lane's corresponding load/store unit may read/write from and to different data addresses. Intra-lane buses and data dependency check are not used. This way, four lanes execute different programs independent from each other on each lane's own data to implement the function of a MIMD processor.

Please refer to FIG. 13G, which is an ILP example of this disclosure. In this example, each module's structure and functions are identical to those of FIG. 13A. Four IRBs store the same instruction blocks, and provide contiguous instructions of the same program to four lanes, in diagonal correlation mode under the direction of a single tracker. Data dependency check is used. If there are no data dependencies between the four instructions, then the IRBs 1801, 1803, 1805, 1807 respectively output the first, second, third, and fourth of the four instructions to achieve four issues. If there is data dependency, then the instruction that has dependency has to be issued again in the next clock cycle. The intra lane buses are used to carry execution results of each lane to the RF of all four lanes. Therefore, each execution unit obtains their operands as if from a common RF. Each lane's corresponding load/store unit may read/write from and to different data addresses. In this mode, the multi-lane processor functions as a multi-issue ILP processor.

Please refer to FIG. 13H, which is a TLP example of this disclosure. In this example, there are two sets of thread resources Q and R, and the four lanes correspond to them forming total 8 virtual machines. IRBs output instructions to each of its corresponding lanes depending on the wait/execution state of the thread, and the RFs corresponding to the thread are used to retrieve or store data. For example, when lane 1811 is waiting for the row store unit 1841 to fetch data from data cache and store into register file 1821 under one thread, then IRB 1861 may provide instructions of another thread to lane 1811 for execution. The intermediate execution result of the previous thread is stored in the RF 1821 but the result of new thread is in 1831, then lane 1811 may execute instructions of each thread correctly. Therefore, it may function as a TLP processor such as GPU.

Multiple threads may coexist with the other afore mentioned modes, such as multiple threads SIMD processor; or one thread is ILP while the other thread is SIMD. Different threads will not interfere with each other because the threads do not share a storage element. The processor system of this disclosure may be configured as multi-thread super SIMD processor. It's much more efficient executing program with branches than GPU because each of the lanes has independent instruction flow control. It does not have to execute different branches in turn as the GPU using masking.

Please refer to FIG. 13I, which is a "soft wired" example of this disclosure. One thread is used in this embodiment. The IRBs of different lanes containing different instructions but in cohesion and the IRBs are in row correlation mode. Alternatively, it may also be that the IRBs of different lanes containing the same instructions and the IRBs are in diagonal correlation mode. In both cases, the instruction dependency check is turned off, the intra-lane buses are operating. What's special is that the programming is in read after write fashion, in which at least one operand register of an instruction is the destination register of the immediate prior instruction. Such as:

LD R3 R2 #0
AND R5 R4 R3
MUL R7 R6 R5
SD R7 R8 #0

In this example, constants are stored in registers R2, R3, R6, and R8 in RF. The first instruction loads data from the I/O address of (R2) +0 (such as stream data), and the operation result is stored back to the I/O address of (R8) +0. In this embodiment, dependency check is turned off, so the four instructions may be issued in the same clock cycle. However, each instruction's operands are actually generated by the previous instruction in the previous clock cycle. Such as operand R3 of the AND instruction, is loaded by LD instruction in the previous clock cycle. The result is a link between execution units. The clocks in the IRBs may be stopped while the clocks to the execution units and the intra-buses are operated normally. The result is each lane executes the same instruction repeatedly, and thus the execution units are soft wired together by instructions. The soft wiring is defined by the paring of destination register address and operand register address, and is established by the intra-lane buses and the bypass logic. The writing of the corresponding RFs may be disabled to save power in this case, for all of the data passing are through bus and bypass logic. This soft wiring method is good for massive scientific computation, such as Fast Fourier Transform (FFT).

As used herein, instruction loop may be unrolled as parallel operation to improve the execution efficiency of processor. When a program is being executed, there is usually alternating instructions executed in series and in parallel. The common parallel execution is in the form of loop. A loop may be executed tens of hundreds of times. There is usually a singular or plural number of in series instructions between loops. In a multi-lane processor, it is possible to allocate a single number of lanes in single issue or a plural number of lanes in ILP mode to execute the in-series instructions; but allocate plural number of lanes to unroll the loops for parallel execution to improve execution efficiency.

For this purpose, a new type of instruction, LOOP instruction, is defined. LOOP instruction unrolls the multiple iterations in an instruction loop and distributes it to plural number of lanes for parallel execution to reduce the number of cycles being executed and reduce execution time. Please refer to FIG. 14A which is an example of allocating lanes by LOOP instruction. LOOP instruction may use the following formats: loop instruction type (LOOP), common register address (CommonReg), base register address (BaseReg), step length (Stride), width (Width), depth (Depth), of these Loop is the instruction type, Common Reg is the register address of the parameter that the loops share (parameter doesn't change between iterations), BaseReg is the address of base register used in the loop Stride is the difference between two iterations of a parameter which changes in each iteration, width is the number of the loops, depth is the number of instructions in the loop. The Stride, Width, and Depth may be in the form of immediate number. Alternatively, the stride, width, and depth value may be stored in a RF, and the Loop instruction takes the format of Loop, CommonReg, BaseReg, and the register address of the stride, width, and depth. It may also take the form of part of its parameter in immediate number and part of the parameters in registers. Multiple different Strides, BaseReg, and CommonReg may also be used for instruction loop, which have multiple iteration patterns of parameter, multiple base addresses, and multiple common parameters.

Please refer to the following instruction example:
LOOP R2 R1 #−4 #256 #3
LD R3 R1 0
MUL R4 R3 R2
SD R4 R1 100

The meaning of LOOP is afore defined, R2 is CommonReg, R1 is the BaseReg, Stride is −4, Width is 256 (number of loops), Depth is 3 (apart from the loop instruction itself, the loop has 3 instructions). The first column of the other instructions is the instruction type, where LD is load, MUL is multiply, SD is store; the second column is the destination register address or source register address for a store instruction; the third column is the first source register address or the base register address of load store instruction; the fourth column are the second source register address or the immediate number.

Figure 14A:
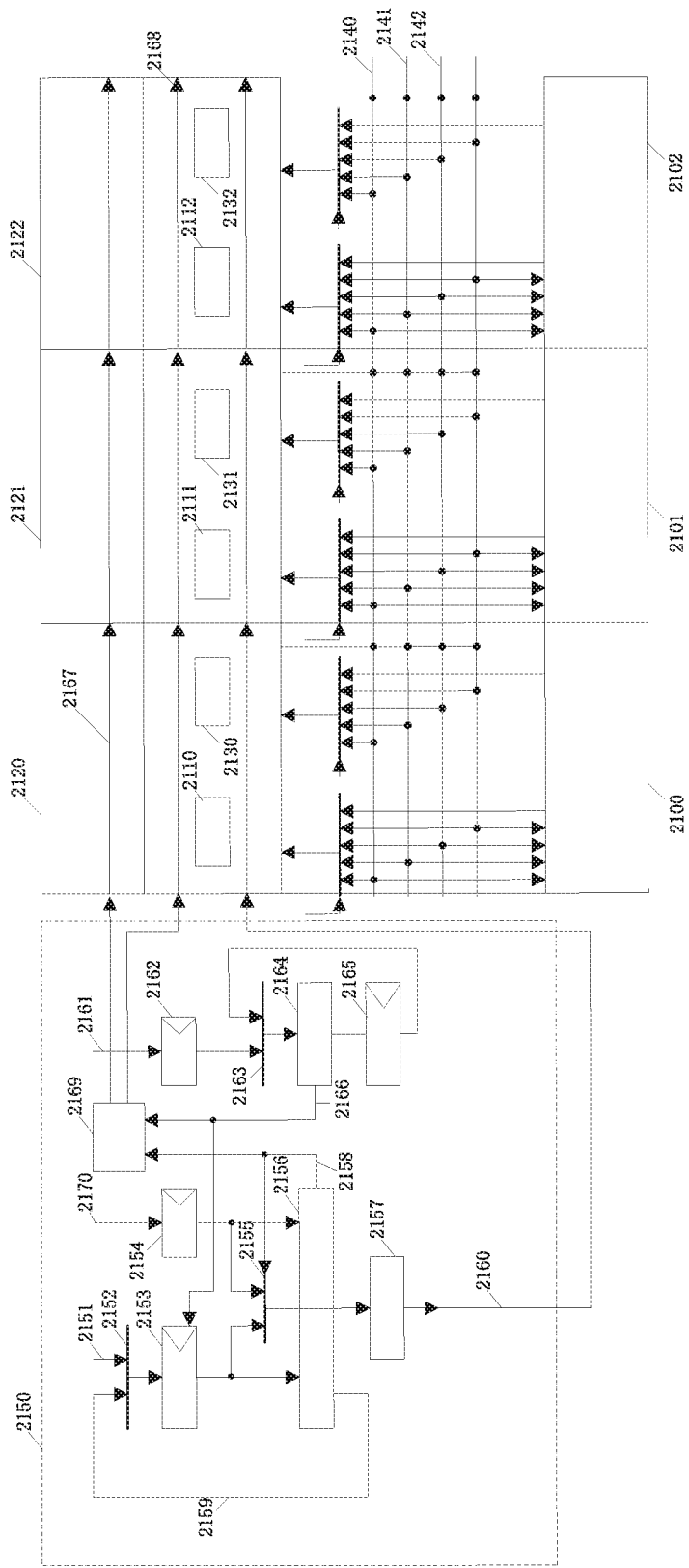
FIG. 14A illustrates an example of allocating lanes by LOOP instruction.

FIG. 14A shows 3 lanes 2100, 2101, 2102 of multiple lanes and controller 2150. Busses 2140, 2141, 2142, etc. transfer data between lanes. An instruction may control a lane to put data on the bus, or control a lane to receive data from a bus. The left most lane 2100 executes in series instructions before executing the LOOP instruction (hereafter this lane is called the Lead Lane). The value of R1 is 1024; value of R2 is 138 before the Loop instruction execution. A maximum of 31 lanes are allocated for this thread. There is a lane number register 2110, 2111, 2112, . . . , which stores lane number, in each lane for each thread. The Lead Lane number is '0' while the lane numbers of other Following Lanes from left to right are 1, 2, 3 . . . Every lane has a detector connected to the lane number register, if a '0' is detected, the lane is detected as a Lead Lane; if numbers other than '0' are detected, and the lanes are detected as Following Lane.

Here the IRBs 2120, 2121, 2122 of all the 31 lanes all have the same instructions, apart from lane 2100 that is running, other lanes do not work under enabler signal 2160. Alternatively, the instructions may only be in IRB 2110, but not in IRBs 2111, 2112; only when lane 2100 decodes Loop instruction, or when the Loop instruction is detected ahead, then the instruction identical to the one in IRB 2120 is filled into the IRB 2111, 2112.

The decoder of Lead Lane 2100 sends a multi-lane execution request to the allocating unit when it decodes the Loop instruction, and instructions may be preprocessed for lane allocating using the preprocessor in FIG. 7 The allocating unit allocates 31 lanes for executing this loop based on the request width (256 here) and the maximum number of threads allowed for this thread. The allocate unit may allocate just enough numbers of lanes if the requested width is less than the maximum number of lanes allowed. At this point the loop instruction and the following instructions are in IRBs 2110, 2111, 2112 . . . of all the lanes.

Cycle controller 2150 assists in controlling the execution of loop instructions. 2150 consists of multiplexers 2152, 2155, and 2163; registers 2153, 2154, 2162, 2165, subtractor 2156, decrementor 2164, decoder 2157, and cycle decision block 2169. The subtractor 2156 may detect if the subtracted result is greater than 0, and use the result as signal 2158 to control multiplexer 2155. Decrementor 2164 subtracts '1' from the input and sends the result to register 2165 to store. It also detects and sends out signal 2166 when the result is '0'. Decoder 2157 decodes binary number into lane enable signal. Cycle decision block 2169 takes signal 2158 and signal 2166 as input, generates signal 2167 and signal 2168 control the instruction flow. Decrementor 2164 and register 2165 form a counter that counts the instruction execution within a loop, indicate the end of the loop to notify the lanes to jump back to execute the beginning of the loop with signal 2166. Signal 2166 also notifies register 2153 and subtracts 2156 to enter the counting of next cycle. Clock to register 2165 are synchronized with the clock of the lanes. Subtractor 2156 and register 2153 form a counter that counts the number of the cycles, controls the loop exit timing, also calculates the number of lanes in the last cycle.

Controller 2150 enters loop mode when it detects a Loop instruction, it's decode and control logic controls multiplexer 2152 and register 2153 latches in the Width 2151 of Loop instruction (in this case it's 256). At the same time the number of lanes 2170 allocated to the thread (in this case it's 31) is latched in 2154, Depth 2161 is latched in 2162. Subtractor 2156 then subtracts value of register 2154 from value of register 2153 (here, 256−31=225) and detects the result is greater than 0. Detection result 2158 controls multiplexer 2155 in selecting register 2154's value (31) to decoder 2157. After decoding, bus 2160 from 2157 enables all the lanes (lanes 0-31). Controller 2150 also sets the first instruction after the Loop instruction as branch target. Cycle decision unit 2169 takes signals 2158 and 2166 as input, generating signal 2167 and signal 2168. When signal 2158 shows the result of subtractor 2156 is greater than 0 and signal 2166 shows the result of subtractor 2164 is equal to 0, signal 2167 is valid. Here 2167 controls register 2153 to update, and controls instruction buffer 2120, 2121, 2122, . . . to execute jump to branch target. 2167 is invalid under other circumstances, in this case do not update 2153 and do not execute the branch. When signal 2158 shows the result of subtractor 2156 is not greater than 0 and signal 2166 shows that subtractor 2164's result is equal to 0, signal 2168 is valid. At this point signal 2168 controls each lane and controller 2150 to exit the loop, ready to execute in series instructions in ILP format on single number or plural number of lanes.

The following example illustrates the execution of the afore mentioned LOOP instructions. When the LOOP instruction is executed, the Lead Lane transmits the data and the passive lane receives the data. After Lead Lane (lane 0) decodes Loop instruction, register value of R1 (R1[0]) (1000) is read out and put on the data bus 2140. Following Lane after decoding Loop instruction reads out (R1[0]) from data bus and then executes a multiplication addition operation (R1[n])=(R1[0])+n*stride, and execution result is written into the R1 register of the corresponding lane. In this, n is the lane number stored in the lane number register, (R1[n]) represents the R1 register value of the nth lane (R1 register values in the lanes from left to right are: 1000, 996, 992, 988 . . . 880). Lane 0 performs a multiplication operation, interval value=n*stride, and the value is stored into interval register 2130, 2131, 2132, . . . of the lane through bus 2142. At the same time, based on the CommonReg value R2 in the Loop instruction, the value of R2 in the reference lane (R2[0]) is stored in the R2 of the other 30 lanes through the data bus 2141, and the value is '138'. In this case, the LOOP instruction is executed and the lanes are ready for the iteration of the parallel execution cycle.

When all 31 lanes execute instruction LD, each lane sums the value of the offset (here it is 0) with the value in BaseReg R1 as load address, fetch data from memory and store them into each R3 register. At the same time decrementor 2164 decrements the depth value (3) by 1 in register 2162 and stored in register 2165 (here the value is 2). When each lane executes MUL instruction, the data of the R3 register in each lane and the value of register R2 (138) multiply together, and the result is stored in R4 registers. At the same time, decrementor 2164 decrements the value in register 2165 and puts it back into register 2165 (value equal to 1). When each lane executes SD instruction, store the value of R4 register into memory. The memory address is the sum of the offset (100) and value of BaseReg R1 of each lane (1000, 1096, 1092, 1088, . . . 980). At the same time decrementor 2164 decrements register 2165's value by 1 (it is now 0). At this time decrementor 2165 detects result is 0 but subtractor 2156's result is greater than 0, therefore signal 2167 is valid. Signal 2167 notifies IRBs 2120, 2121, 2122, . . . to execute the branch, point to LD instruction (the branch target set earlier). At the same time signal 2167 controls the output of subtractor 2156 (225 here) to pass through multiplexer 2152, and update register 2153. Signal 2167 also controls the R1 register of each lane to add an interval value (here it is −124) and store back into R1, so now each lane's R1's value is respectively 876, 872, 868, 864, . . . , 756. At this time, under 2166's control, the depth (3) of register 2106 is sent to decrementor 2164 through multiplexer 2163. The detection result of subtractor 2156 is greater than 0 (225−31=194), this result passed by 2188 controlling multiplexer 2155 selects value of register 2156 (31), which is decoded by decoder 2157 (0-30 valid) enabling all 31 lanes to execute the next cycle. Preparation for the next cycle is now ready. The next cycle starts from LD instruction, and operation is the same as in the previous cycle. 8 such cycles are executed in total.

Therefore, in the beginning of the 9$^{th}$ cycle, the value stored in register 2153 is 8 (256−8*31=8). The result of subtractor 2156 is −23 (8−31=−23), result detector 2158 shows this is less than 0; the signal control multiplexer 2155 selects the remaining width '8' stored in register 2153. They are decoded into enable signal of lanes 0-7 by decoder 2157. In the 9$^{th}$ loop there are only lanes 0-7 that execute cycle instructions under enabler signal, while lanes number 8-30 are under invalid enable signal control and do not operate.

By the end of the 9$^{th}$ cycle, signal 2158 (result of subtractor 2156 less than 0) and signal 2166 (result of decrementor 2164 equal to 0) jointly enable signal 2168 and disable signal 2167. The valid signal 2168 makes controller 2150 to exit cycle state. The valid signal 2168 also resets register 2154 to 1, directing follow up instructions to be only executed at lane 0. The valid signal 2168 also controls the R1 value of lane 7 to be written back to R1 register of lane 0, or executes an operation in lane 0 (R1[0])=(R1[0])+ remaining width*stride making (R1[0]) reflect final state of cycle execution. The invalid signal 2167 controls IRB not to take the branch, and then the next instruction after the cycle is executed in lane 0 normally.

Loop instruction functions may be implemented using existing instructions, the technique is to extract the key element of the Loop instruction from the existing instruction loop, and then send them to loop controller 2150 so the multiple iterations in the instruction loop may be unrolled and executed in parallel to reduce the number of loops. It may be explained with the following code together with FIG. 14A:

Entry: LD R3 R1 0
MUL R4 R3 R2
SD R4 R1 100
SUBS R1 R1 #4
BNZ Entry

This embodiment and the aforementioned LOOP instruction example implement the same function. Presume value of R1 is 1024; value of R2 is 138 as before at the time of entering the loop. The first time the loop is executed, cycle controller 2150 does not know this is a loop, so the instructions in the loop are executed in series. When executing BNZ instruction, the detecting logic determines it is a backward branch instruction based on is instruction type and negative address offset. At the same time the depth '5' (that is the offset address's absolute value) is determined. Logic detection also extracts branch decision basis from this instruction (here it is based on if the execution result of the instruction before the branch instruction is '0' or not). The second execution of this loop the detection logic begins to record and compare the source register and destination register address to extract elements. R2 is not a destination register in the loop, and is determined as a Common register. R1 is the base address of LD instruction and SD instruction, and is determined as Base address. SUBS is the last instruction to update the branch decision before the branch instruction, its operation is to subtract 4, and therefore Stride is −4. At the end of the second loop, the cycle controller controls each lane computes and store the result to R1 register (each lane's R1 register content is respectively 1016, 1012, 1008, . . . , 896), based on the Stride and each lane number. The content of R2 in lane 0 is also stored to R2 registers of lanes 1-30. The interval value (31*−4=−124) is calculated by lane 0 based on the number of lane allocated and the Stride, and the interval value is stored in the interval registers of each lane. The rest of the operation is the same as the LOOP instruction embodiment afore mentioned.

Loop elements of other type of instructions may also be extracted, such as the one of branch condition is generated by the branch instruction, such as:

Entry: LD R3 R1 0
  MUL R4 R3 R2
  SD R4 R1 100
  SUB R1 R1 #4
  BNZ R1 Entry

The first three instructions are the same as the example of the preceding instruction, SUB instruction only performs subtraction, does not produce a branch the condition. The BNZ instruction, compare value of R1 to 0, determines if it fulfills conditions of NRZ (jump if result is not 0). In this example, R1 may be determined as Base register by the end of the first loop executed in series. Further operation is the same as before.

In this embodiment, the end of the loop branch may be determined by the TAKEN signal of each lane as a result of its own branch decision, which makes the depth controller in cycle controller 2150 unnecessary. Cycle counter here mainly counts the number of the enabled lanes in the last cycle. The timing of exiting the cycle may be controlled through cycle counter, or it may also be controlled by the TAKEN signal of last lane in the last cycle.

Figure 14B:
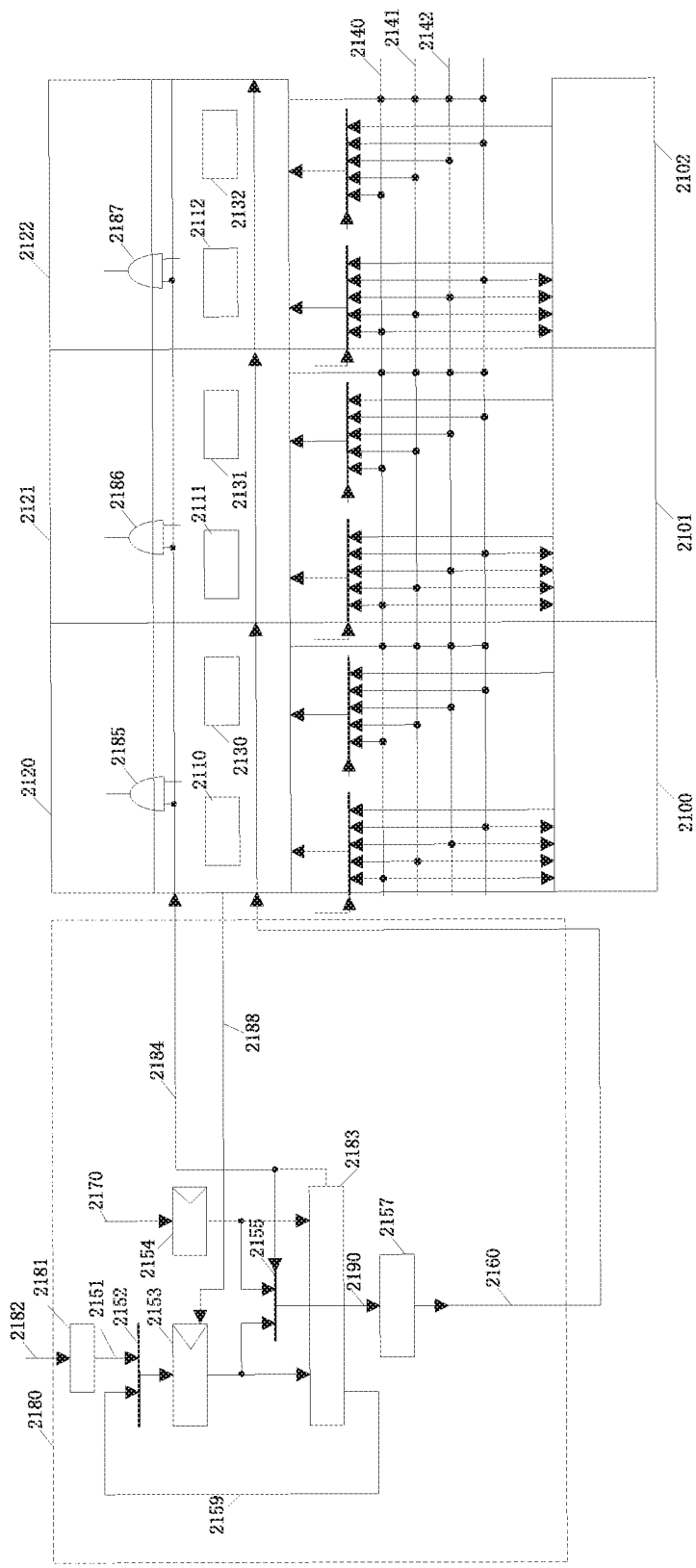
FIG. 14B illustrates another example of allocating lanes by LOOP instruction.

Please refer to cycle controller 2180 in FIG. 14B, the structure is similar to the cycle counter in controller 2150, but with an additional converter 2181. Converter 2181 converts the base address 2182 (when going into parallel loop, R1's value is 1024−2*4=1016), into Width 2151 (value as 1016/4=254) latched into register 2153. Converter performs a division calculation (as Base address/stride, it may also be obtained by shift the base address by the amount of Stride, or by checking a table of base/Stride). The number of lanes allocated is latched into register 2170 as before. In addition, the subtractor 2183 of this embodiment implements subtraction as the precedent, but decision logic not only decides on the condition of greater than 0, but on all of the allowed branch decision in the instruction set. Therefore, the branch type (such as NRZ) in instructions and branch conditions generated by the lanes are also sent to 2183 for decision. If output of decoder 2157's is negative, then output on bus 2160 enable lane 0 but disable the other lanes. Thus the system is ready for parallels execution of the loop.

Each of the 31 lanes in turn executes the LD instruction (here R1 content of each lane is different as afore described), MUL instruction, SD instruction, SUBS and NRZ instruction when entering the loop. Branch decision logic in each lane makes its own branch decision and send its own TAKEN signal is sent to the AND logic in each lane 2185, 2186, 2187, . . . Under the control of the branch signal of each lane (branch signal signifies a lane is currently executing a branch instruction, branch signal is '1' when executing a branch instruction no matter if the branch is taken or not), interval −124 is added to content of R1 it is latched back into R1 (for example, R1 value of each lane after operation is respectively 892, 888, 884, . . . , 772). At the same time, the '1' branch signal updates the register 2153 so the content is now 223 and output of subtractor/comparator 2183 is '192', and the comparison output 2184 is still '1', control multiplexer 2155 selects content of register 2154 to be decoded by decoder 2157, sending enable signal 2160 to enable all 31 lanes. The '1' 2184 signal enables the AND logic of each lane 2185, 2186, 2187, . . . , allowing the taken signal of each lane to be transferred from each lane's branch decision logic to IRB 2120, 2121, 2122, . . . . In each of the IRB, Token is passed to the branch target designated by the corresponding track table, start executing the first instruction LD in the loop, a $2^{nd}$ time At the beginning of the $9^{th}$ cycle, value of register 2153 is 6 (254−8*31=6), result of subtractor 2183 is −25 (6−31=−25), the result is detected as less than 0; signal 2184 is '1' controls multiplexer 2155 to select the stored remaining width 8 in register 2153 which is decoded by decoder 2157 and the resulting enable signal enables of lanes 0-5. In the $9^{th}$ loop only lane 0 through lane 5 execute the loop instructions, lanes 6-30 do not execute because they are not enabled.

At the end of $9^{th}$ cycle, the '0' signal 2184 makes the outputs of AND logic in each lane 2185, 2186, 2187 . . . become '0', control IRBs not to branch, but begin to execute instructions outside of the loop (instructions after BNZ), making controller 2180 exit the loop state. Register 2154 is reset to '1', directing the subsequent instructions to only be executed in lane 0, and writes back R1 value of lane 5 to R1 register of lane 0, alternatively lane 0 executes a multiplication/addition operation (R1[0])=(R1[0])+remaining width*stride (R1[0]) reflects the state at the end of loop execution. When signal 2184 is '0', the branch signal makes processor transfers the content of base address R1 (R1[5]) of the last enabled lane (can be determined by 2157's input, here is lane 5) and store into R1 of lane 0 (R1[0]).

Figure 14C:
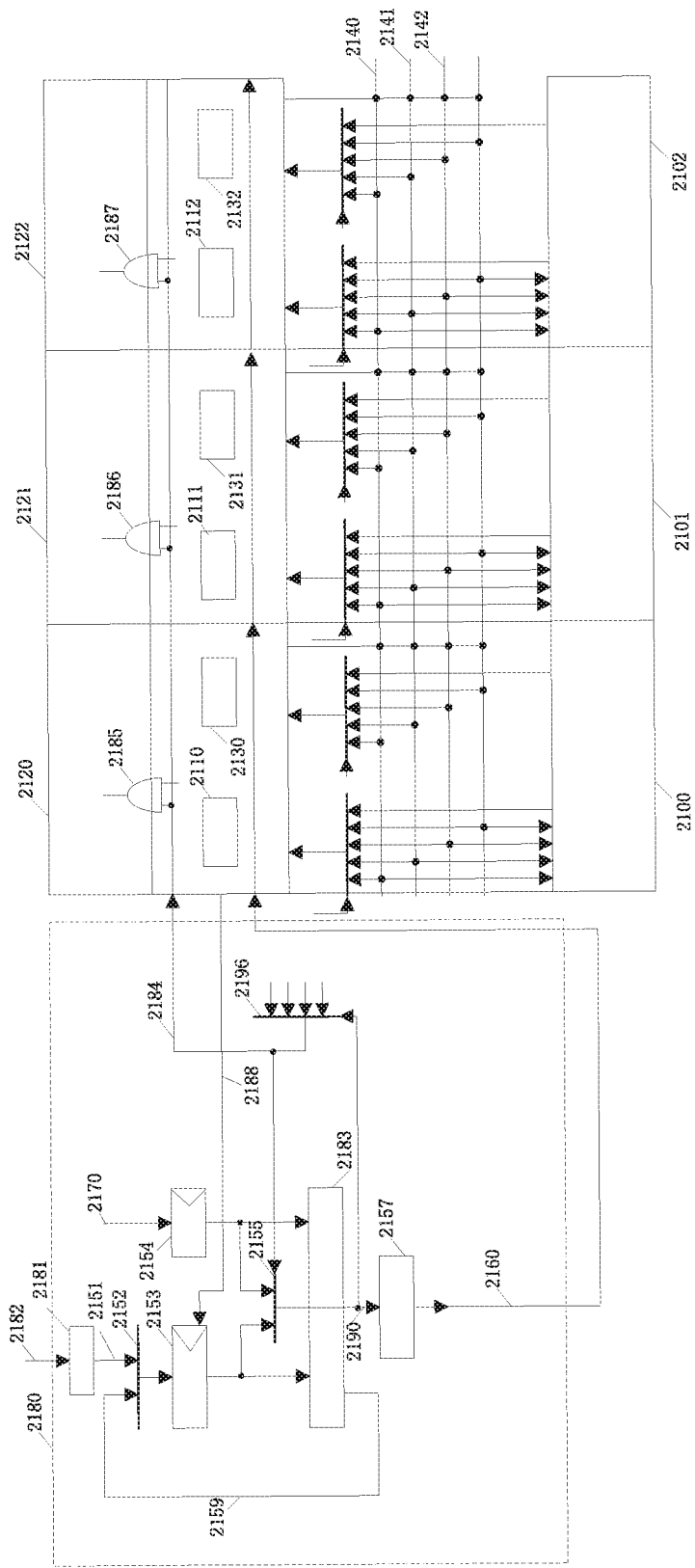
FIG. 14C illustrates another example of allocating lanes by LOOP instruction.

It is possible to control the cycles using the existing branch decision logic in each of the channels rather than making decision on the number of cycles. Please refer to FIG. 14C, the method may be using the output 2190 of multiplexer 2155 selecting the taken signal from the last (right most) lane in a cycle as the control signal 2184 to control the AND gates 2185, 2186, 2187, . . . to enable the Taken signals. In this embodiment, output 2190 is '31' in the first 8 cycles. This selects the Taken signal of lanes 30 to be 2084 controlling the AND logic aforementioned. In all of the 8 cycles, the branch decision of lane 30 is all branch taken, and therefore the Taken signal of lane 30 is '1', which is put on bus 2184 controlling each lane take branch and enter the next cycle. In the $9^{th}$ cycle, the value of 2090 is '6', the Taken value of lane 5 is selected to pass on signal 2184. At the end of the $9^{th}$ cycle, Taken of lanes 0-4 are '1', but Taken of lane 5 is '0'. The Taken value of lane 5 is passed to signal 2184, making each of the IRBs 2120, 2121, 2122, . . . all output the instruction after BNZ, exiting the loops. Signal 2184 also controls putting the value of R1 [5] into R1[0]. In this embodiment, the main function of cycle controller 2180 is to provide the allocated number for the cycle controlling the execution on the needed lanes (stopping the execution of unneeded lanes at the end of the cycle to avoid producing error data); On the other hand, it also selects the Token signal of the last lane in the cycles as cycle control (the branch decision of the last lane is the right decision).

Another method of implementation may be storing the base address value 2181 into register 2153 at the beginning of the cycle (no division or shifting or table check is necessary), but multiply the allocated number of lanes 2170 by stride and store the result into 2154. In the last example, the numbers 254 (base address divided by stride equal to width) −31 (number of allocated lanes). In this example, it is 1016 (base address) −124 (number of allocated lanes times stride equal to interval value). The result of this operation needs to be adjusted in this example the signal 2190's value compared to that of the previous example is greater by 'stride' times, so a converter has to be added to memory 2155's output port, the converter selects multiplexer 2155's output divided by 'stride' to create 2190. The converter may be implemented through table or shifting.

As stated, LOOP instruction and normal backward branch instructions may be exchanged. The advantage of normal branch instruction is software compatibility; advantage of LOOP instruction is greater execution efficiency. The following embodiment uses loop instruction, but it may be replaced by a combination of ordinary branch instruction.

If stride of LOOP instruction is '0', it makes each lane to store the same data. It enables the lane processor switching operation mode), such as between SIMD, MISD, and MIMD. Take MISD as example, the following instructions are at the beginning of this program. The LOOP instruction has the format of operation type, CommonReg, BaseReg, stride, width, and depth.

LOOP R2 R1 #−4 #3 #3
LD R3 R1 0
LD R11 R1 66
LD R12 R1 66

Before executing the LOOP instruction, value of R1 is set as 1024 by a prior instruction, value of R2 is set as 138, value of R4 is 621, and value of R5 is 2148. When executing LOOP instruction, the allocating unit allocates 3 lanes: lanes 0, 1, and 2 based on the request of the LOOP instruction. The R1 value of each lane (as the previous example) is respectively 1024, 1021, and 1016. When executing the first LD instruction, each lane fetches its own data based on (R1) +0 (offset), so 3 pieces of data are put into R3 registers of each lane. After the execution of the first LD instruction, (R3[0])=1, (R3[1])=0, (R3[2])=−1. The second and third LD instructions are also executed to store different data to the R11 and R12 registers of the 3 lanes. Because width is 3, there are 3 lanes, so the program exits loop when it reaches the third LD instruction and then continues to execution the next instruction:

LOOP R4 R5 #−0 #3 #256
LD R7 R5 0
LD R8 R5 82
LD R9 R5 116
. . .

In this segment of LOOP instructions, because stride is 0, base R5 of the 3 lanes is the same value (2148). Therefore, when executing the first LD instruction, all 3 lanes all load data from the same memory address 2148, and store the data into R7 of each lane. When executing the second LD instruction, all 3 lanes all load data from the same memory address 2230, and store the data into R8 of each lane. Then the following branch instructions are executed (please note the lanes are still in the cycle state).

BGT R3 entry0
BEQ R3 entry1
BLT R3 entry2

Entry0: MUL R21 R7 R2
. . .
SD R21 R1 500
NOP
Entry1: AND R21 R7 R8
. . .
SD R21 R1 500
NOP
Entry2: SUB R21 R7 R9
. . .
SD R21 R1 500
NOP Used herein, the meaning of BGT instruction is it branches to Entry0 when value of register R3 is greater than 0; the meaning of BEQ instruction is it branches to Entry1 when value of register R3 is equal to 0; the meaning of BLT instruction is it branches to Entry2 when value of register R3 is less than 0. Because the R3 values in the 3 lanes are not the same, lane 0 executes Entry0 code, lane 1 executes code of Entry1, and lane 2 executes code of Entry2, for the same data, such as R7, R8, R9's data, each lane executes different operations and writes the result back to each respective memory address. This way may write MISD programs into one program, start it as a normal in series program, but execute in MISD modes.

For MISD with the same instruction but different parameters, LOOP instruction with non-zero stride may be used to load different parameters into each lane; then LOOP instruction with zero stride may be used to load the same data into the lanes. Then, perform the same operation on the same data with different parameters, the results may be stored back to different memory addresses, such as LOOP R2 R1 #−4 #16 #3
LD R3 R1 0
LD R11 R1 66
LD R12 R1 78
LOOP R4 R5 #−0 #16 #256
LD R7 R5 0
LD R8 R5 82
LD R9 R5 116
MUL R21 R7 R11
ADD R21 R21 R12
SD R21 R5 56
. . .

Here, the first LOOP instruction with non-zero Strides loads different base address and parameters to each lane. The second LOOP instruction loads the same data or common parameters. The operation is run with the same data on the same or different parameters in parallel. The result of each lane is stored back to different memory addresses. In summary, using non-zero stride LOOP instructions if each lane needs different parameters or data, using zero stride LOOP instructions if each lane needs the same parameters or data.

The multi-lane processor of this disclosure may be configured to operate under multiple modes, table 1 summarizes some of them. Each row in the table represents a mode; each column represents the configuration of some of a key parameter. In the table, there are 11 modes in total, of these SISD is single instruction stream, single data stream mode, SIMD is single instruction stream, multiple data streams mode, multi-lane processor in this mode may emulate vector processor operations; super SIMD is the unique operation model of this disclosure, the operation is almost that of SIMD, but each lane may execute different instructions of the same program; MISD is multiple instruction streams, single data stream mode; MIMD is multiple instruction streams, multiple data streams mode; ILP is instruction level parallel mode; SWL is software wired logic mode; LOOP is the mode when multiple lane processor runs LOOP instructions; STLP is single lane multiple threads operation mode; MTLP is multiple lane multiple thread operation mode, multiple lane processor in these modes may emulate GPU operation; SMT is simultaneous multiple threading mode, which is a mix of modes, multi-lane processor is usually run in this mode.

The table has in total 8 columns of configuration parameters. Of these, thread column means the least thread resources required for a specific mode, the parameters in this column could be 'single' thread or 'multiple' thread. Program column refers to if different lanes run the same program, the configuration may be 'same' or 'different'. IRB column refers to the correlation between different lanes' instruction read buffers, of these 'column' represents IRBs of each lane are all lead columns in this configuration, all work independently under each lane's own tracker; 'row' represents the mode has one lead column and has at least one following column, lead column works independently under the tracker, following column follows lead column, and the instructions outputted from following column and lead column are the exact same instructions of the same program; 'diagonal' represents the mode has one lead column and at least one following column, lead column works independently under its own tracker, following column follows lead column, and instructions of following column are the instructions following instruction of lead column. RF column refers to if RFs of different lanes in the same thread have the same data, configured to have 'same' or 'different'. Intra-lane bus column represents if bus are used to exchange data between lanes, configured as 'yes' or 'no'. Dependency check column represents if the data dependence between lanes is checked, configured as 'yes' or 'no'. Data column represents if the data from load/store units of different lanes is the same, configured as 'same' or 'different'.

TABLE 1

11 Working modes of multi lane processor

|  | Thread | Program | IRB | RF | Intra-lane Bus | Dependency Check | Data |
|---|---|---|---|---|---|---|---|
| SISD | Single | — | Column | — | No | No | — |
| SIMD | Single | Same | Row | Different | No | No | Different |
| Super SIMD | Single | Same | Column | Different | No | No | Different |
| MISD | Single | Different | Column | Different | Yes | No | Same |
| MIMD | Single | Different | Column | Different | No | No | Different |
| ILP | Single | Same | Diagonal | Same | Yes | Yes | Same |
| SWL | Single | Same | Diagonal | Same | Yes | No | Same |
| LOOP | Single | Same | Row | Different | No | No | Multiple |
| STLP | Multiple | — | Column | — | No | No | — |
| MTLP | Multiple | Same | Row | Different | No | No | Different |
| SMT | Multiple | Different | Mix | Same/Different | Yes/No | Yes/No | Mix |

Further, lanes may be divided into groups if there are more lanes in a processor system consistent with the disclosure. Each of those groups is configured as one specific processor structure, and all of those groups operate at the same time. As used herein, it is possible to configure and operate in different processor modes between different lanes as well as between different threads of the same lane. The Allocation unit dynamically allocates lanes and resources to utilize the resources, based on the preset priorities of the programs and the program's need of the resources. This is also the simultaneous multi thread mode (SMT) of the table above. FIG. 15A shows an exemplary dynamically configuration of lanes in processor system consistent with the disclosed embodiments. For ease of explanation, FIG. 15 only displays track table 1901, instruction cache 1903, data cache 1905, 16 lanes and the corresponding 16 trackers. Of these, each lane contains IRB, execution unit, RF, DRB and load/store unit.

In this embodiment, each lane supports 4 threads. Thus it is possible to switch the instructions being executed by switching the 4 threads. However, only one thread may be executed at a time. Therefore, IRB, RF, and DRB all have 4 identical parts, one each corresponds to the four threads. Specifically, take lane 1941 as example, which only has one execution unit 1909. However, IRB, RF and data read buffer of lane 1941 all have 4 parts. Of these, IRB 1911, RF 1921 and DRB 1931 correspond to thread Q, IRB 1913, RF 1923 and data read buffer 1933 correspond to thread R, IRB 1915, RF 1925 and data read buffer 1935 correspond to thread S, IRB 1917, RF 1927 and data read buffer 1937 correspond to thread T. Therefore, programs may be allocated to each thread in each lane to improve the execution efficiency of the processor system based on priority, and the degree of parallelism of the programs.

For example, there are 10 programs that need to be executed, listed by their priority from high to low: programs A, B, C, D, E, F, G, H, I, and J. In general, more computing resources (lanes) are allocated for higher priority programs. In addition, more lanes may be allocated for programs have higher degree of parallelism. Here, parallelism means contiguous instructions that may be executed simultaneously, or instruction that may be broken down to parallel executable instructions (such as loop instruction). Please refer to FIG. 15B, which is an example of thread resource allocation table in the Allocation Unit that allocates programs to each lane.

Herein, Allocation Unit dynamically allocates thread resources to different programs based on the thread resource, allocation table, and the program's current need of resources and the ready state of the program (such as if data may be used). In this example, because priority level of program A is the highest, therefore 16 lanes of Q thread from 1941 to 1956 are all allocated to program A, program B has the priority level only second to program A, therefore R thread's 12 lanes on the right from 1945 to 1956 are allocated for program B. In this example, program C occupies lanes 1949 to 1952 of thread S, program D occupies lanes 1953 to 1954 of thread S, program E occupies lanes 1955 to 1956 of thread S. Program F occupies lanes 1949 to 1950 of thread T, program G occupies lanes 1951 to 1952 of thread T, program H occupies lanes 1953 to 1954 of thread T, program I occupies lane 1955 of thread T, program J is allocated into lane 1956 of thread T, as shown in 1961. Thread resources of each lane, such as IRB, RF, DRB, are allocated according to thread resource table.

Thread resource allocation table has the same number of rows as the number of programs currently being executed (in this example, 10 rows 1990-1999 for program from A to J is), each row records the thread number of the corresponding program, lead column position and the position of lanes allocated for the of the program. This table has three columns in total. There is one column 1960 that records identification mark of each program. A column 1961 records thread number of the lead column of each program and the starting lane number. Another column, 1962, in which each row is a 16-bit binary number, represents the usable row positions for the program the row represented in the thread indicated in column 1961. '1' represents the program is entitled to use the lane that corresponds to the bit, '0' represents the program does not have the right to use the lane that corresponds to the bit. In this example, lead column is located in a usable lane. For example, table entry of row of 1990 and column of 1961 is Q0, represents the program (in this example the program A) uses resources of thread Q and the Lead column is in the usable lanes starting from lane 0. 16-bit binary number of table entry of row 1990, column of 1962 is '1111111111111111'. The combination of column 1961 and 1962 means the program represented by this row may use all lanes in Q thread, and the Lead Lane may be located in anyone of those lanes. Another example, in row 1991 column 1961 entry is R4, column 1962 entry is '0000111111111111', representing the program (here the program is B) may use lanes 4-15 of R thread and lead column is located in any one of the said lanes 4-15. Another example, in row 1992 the column 1961 entry is S8, 1962 entry is '0000000011110000', representing the program (here the program is C) may use lanes 8-11 in S thread and lead column may be located in any one of the lanes 8-11. The rest may be figured out by analogy. For ease of description, in the following explanations, assume lead column is located in the first of the said usable lanes, such as Q0 represents lead column is in lane 0, R4 represents lead columns is in lane 4, S8 represents lead column is in lane 8. Other similar technique may also be used.

Every clock cycle, data in column 1961 is sent to IRB of all lanes, which uses the data in 1961 to get instruction of Lead column ahead of execution, and after decoding send back a demand feedback signal. Demand feedback signal is also a 16 bit binary number, its value may have the following meaning: '0000000000000000' represents that the program does not need the thread resource two clock cycles later (here assume instruction is pre decode two cycles earlier), may be the data is not available, etc.; '1111000000000000' represents a normal instruction and data are ready; '1111100000000000'~'1111111111111111' represent a wide instruction (such as loop instruction, the binary number represents the lanes needed for the execution starting the left most lane (the Lead Lane), if it needs more than 16 lanes, send back '1111111111111111'. An operation is performed on the demand feedback signal sent back to thread resource allocation table and the entries in the corresponding row in the table. The operation right shifts the demand feedback signal by the amount in column 1961 and the shifted result is ANDed with the column 1962 value in the corresponding row. For example, the demand feedback signal for row 1990 is '1111000000000000', after doing a 0-bit logic right shift (column 1961's item is Q0), AND with value in column 1962, and obtains intermediate result 1980, whose value is '1111000000000000'. Demand feedback signal of row 1991 is '1111000000000000', after doing a 4 big logic right shift (table entry of column 1961 is R4), and perform an AND operation with value of column 1962, and the intermediate result 1981, is '0000111100000000'. Demand feedback signal of row 1992 is '1111111111111111', after doing an 8-bit logic right shift (1981's table entry is S8), and perform an AND operation with value of column 1962, the intermediate result 1982, is '0000000011110000', the meaning may be in program C reads out a loop instruction ahead, and requests 16 lanes, but program C's priority only allows for 4 lanes, so only 4 lanes are allocated. Row 1993's demand feedback signal is '0000000000000000', which means program D's data is not available, after doing a 12-bit logic right shift (table entry in 1961 is S12) and an AND operation with column 1962's value, and intermediate result 1983 is '0000000000000000'. Row 1994's demand feedback signal is '1111000000000000', after doing a 14-bit logic right shift (1961's item value is S14) and an AND operation with 1962's value, the intermediate result 1982 is '0000000000000011'. Row 1997's demand feedback signal is '1111000000000000', after doing a 12-bit logic right shift (column 1961's item value is T12) and an AND operation with column 1962's value, the intermediate result 1987 is '0000000000001100'. The operations on programs, F, G, I, and J are similar, so not repeated here.

Further operation on the said intermediate results leads to a two-dimensional thread lane allocation value, which controls the thread resources of each lane. Using the 'Q' in row 1990, column 1960 to replace the in the 1980 intermediate value '1111000000000000', the result is the allocation value 'QQQQ------------'. Here '-' represents the lane has not yet been allocated. Then row 1980's value is inverted to produce masking signal '0000111111111111' which is AND with the row 1981's value resulting in '0000111100000000'. Use this value to get the allocation value '----RRRR--------' as before. Invert this value to get '1111000011111111', which is ANDed with the masking signal from row 1980 to obtain a new masking signal '0000000011111111'. This new mask is applied to the intermediate value 1982 to get the allocation value '--------SSSS----'. Then another new mask '0000000000001111' is produced using the same method as before. Operation on Row 1983 results in an allocation value '----------------', and the new masking signal is still '0000000000001111', because program D does not request resources, so no lanes are allocated for it. Now AND the new masking signal and row 1984's value to get the allocation value '------------SS', and the new masking signal is '0000000000001100'. Then apply the masking signal to values on row 1985 and row 1986, both result in '----------------', because the two programs' allocated lanes are both taken by higher priority programs. Then AND the masking signal with row 1987's value and get the allocation value '------------TT--'. A new masking signal '0000000000000000' is produced using the same method before. To this point, all lanes are allocated. The process produces allocation value and masking is omitted here.

Perform 'OR' operation on all allocation value above results in a 1971 final allocation value 'QQQQR-RRRSSSSTTSS'. This value is sent to each lane and directs its operation. At the designated clock cycle, the lanes operate under this thread allocation; effectively perform the operation for the following programs 'AAAABBBBCCCCH-HEE'.

If in the next clock cycle, the demands of programs A, C, D, E, F, G, H, I, J have not changed, but program B pre decodes a loop instruction, making row 1991's demand feedback signal '1111111111111111'. After a 4-bit logic right shift (column 1961's table entry is R4), and AND with column 1962's value intermediate value 1984 is '0000111111111111'. Further operation on the said intermediate results leads to a two-dimensional thread lane allocation value, which controls the thread resources of each lane. Please refer to FIG. 15C, row 1980's value is '1111000000000000', and results in allocation value 'QQQQ------------', take the inverse of the value of row 1980 to get masking value '0000111111111111'. This value ANDed with row 1981's value gets '0000111111111111'. Use this value to get the allocation value '----RRRRRRRRRRRR' as before. Inverts this value to get '1111000000000000', which is ANDed with the masking signal from row 1980 to obtain a new masking signal '0000000000000000'. To this point, all the lanes are allocated. The new masking signal will mask resource requests of other programs after this point. The demand feedback signal of the other C, D, E, F, G, H, I, J, K will not influence allocation results. Then perform an OR operation with all the said allocation values, to get the final allocation value 1972 'QQQQRRRRRRRRRRRR'. This value is sent to each lane and directs the lane's operation. At the designated clock cycle, the lanes operate under this thread allocation, effectively perform the operation for the following programs 'AAAABBBBBBBBBBBB'.

The result of such allocation is that lanes 1941, 1942, 1943 and 1944 are allocated to program A of thread Q, there is no thread switching for these 4 lanes, they execute program A at all time. During program execution, when parallelism degree of program A is greater than 4, more lanes may be allocated to thread Q (can have at most 16 threads) for program A. when lanes 1945, 1946, 1947, and 1948 have not been used by program A, these four lanes are used exclusively by program B. These 4 lanes may keep executing program B's instruction as long as program A does not need more than 4 lanes. Because lanes 1941, 1942, 1943, and 1944 are used exclusively by program A, therefore program B may use at most 12 lanes, as indicated by 1972 in FIG. 15C.

The other 8 programs' priority level are lower; therefore, they do not exclusively use any lane. Similarly, as indicated by the lane allocation circumstances in FIG. 15B's 1965, when program A and program B both do not need to use one or more of lanes 1949, 1950, 1951, and 1952, those lanes may be allocated to program C on S thread; when program A and program B both do not need to use lane 1953 or 1954, those lanes may be allocated to program D on S thread; when program A and program B both do not need to use lane 1955 or 1956, those lanes may be allocated to program E on S thread.

The allocation unit dynamically allocates thread resources for different programs based on thread resources allocation table, and the demand of resources and ready state of each program.

Figure 16:
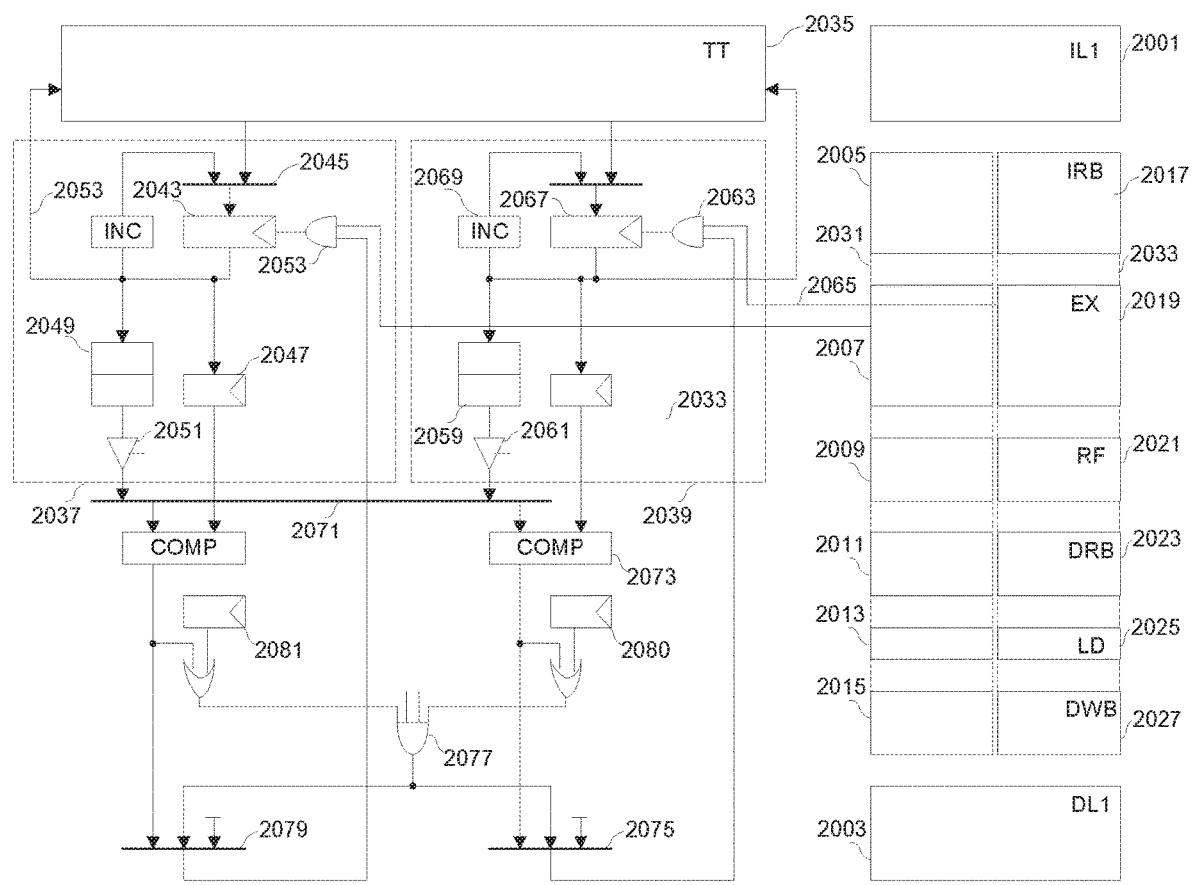
FIG. 16 illustrates an embodiment of instruction synchronizing of the processor in the structure of this disclosure.

As used herein, synchronous control may be applied to instructions executed in different lanes. Please refer to FIG. 16, which is an embodiment of instruction synchronizing of the processor in the structure of this disclosure. In this embodiment, use two lanes in a processor execute two different instructions at the same time as an example. Of these, IRB 2005, execution unit 2007, RF 2009, data read buffer 2011, load/store unit 2013 and data write buffer 2015 correspond to the first lane 2031, while IRB 2017, execution unit 2019, RF 2021, data read buffer 2023, load/store unit 2025 and data write buffer 2027 correspond to the second lane 2033. In addition, both these lanes share instruction cache 2001 and data cache 2003.

In this embodiment, there are two trackers indexing track table 2035, which are tracker 2037 working with lane 2031 and tracker 2039 working with lane 2033. These two tracker's functions and structures are identical. Take tracker 2037 as an example, besides the normal incrementor 2041, register 2043, and multiplexer 2045, also contains additional lock register 2047, unlock FIFO 2049, transmission gate 2051 and AND gate 2053. When performing lock and unlock operations for instruction synchronization lock register 2047 stores address information (such as track point position BN) which is used to lock, while unlock FIFO 2049 stores address information (such as track point position BN) that is used to unlock. Unlock happens when the instruction information in the unlock FIFO 2049 and in lock register 2047 are the same. The same instruction with the same address may be the lock if two lanes execute the same program. A subroutine both programs will call may be the lock if two lanes execute different programs. There are two ways to call this subroutine: lock and unlock.

Specifically, when a sequential lock is needed to synchronize the instructions lane 2031 and lane 2033 are executing, that is lane 2033 needs to wait for lane 2031 to finish executing instruction A before starting to execute instruction B athe enable transmission gate 2051 of tracker 2037 to drive the content of unlock FIFO 2049 on bus 2071, and also set the comparator 2073 of tracker 2039 to monitor the address information on bus 2071, the three input multiplexer 2075 selects the output of comparator 2073 as input of AND gate 2063. In this embodiment, lock and unlock instructions are defined as instructions similar to branch instructions, when scanner scans this type of instruction, it will treat it as a branch point and store it into the track table.

When lane 2033's tracker 2039 reads out a locked instruction's branch point it behaves similarly as if encountering a branch instruction, in that it stops at the instruction's address and waits for branch decision. Here, decoding indicates this is a lock instruction, and the instruction's address is latched into register 2057 (can decode the instruction itself, may also be the lock type generated by scanner during scanning and stored in the instruction's corresponding table entry in the track table, tracker has a decoder that may decode this special type). At the moment, comparator 2073 has not yet matched address in lock register 2057, and sends non match signal through multiplexer 2075 and feedback to AND gate 2063, preventing the update of the pointer register 2067 in tracker, stops the movement of tracker address pointer 2039. This signal also stops the execution of instructions in lane 2033. Lane 2033 and the corresponding tracker 2039 enter the lock state.

When lane 2031's tracker 2037 reads out a branch point of an unlock instruction from the track table, it behaves similarly to reading out a branch instruction by stopping at the address of the instruction and waiting for branch decision result. Here, decoder indicates this is an unlock instruction. Based on that, this instruction's address is stored into FIFO 2049 as well as put on bus 2071 through transmission gate 2051. At the same time, tracker 2037 produces a branch not taken signal which makes lane 2031 and tracker 2037 continue execution of the codes following. At this time, comparator 2073's 'matched' result is sent to AND gate 2063 through three-input multiplexer 2075, makes tracker and lane 2033 resume execution. Lane 2033 and the corresponding tracker 2039 enter the unlock state. The tracker 2039 in the unlock state resets lock register 2057 and unlocks FIFO 2049.

In the above example, if lane 2031 executes unlock instruction first, the unlock address is stored into FIFO 2049, and put onto bus 2071 through transmission gate 2051, lane 2031 and tracker 2037 then continue executing follow up code. If another unlock instruction is executed during execution, the new unlock instruction is also stored in FIFO 2049. When tracker 2039 latches the address of lock instruction into register 2057, comparator 2073's matched result makes lanes 2033 and 2039 to not go into lock state, but continue executing follow up instructions.

Token passing is paused when the Token is passed to token passer corresponds to instruction B in the corresponding IRB 2017. After execution unit 2019 pause execution after receiving instruction B, it also outputs a signal 2065 to AND gate 2063 in tracker 2039 rendering AND gate 2063 to pause the update of register 2067, that is to pause the update of read pointer 2055.

At the same time, lane 2031 continues to execute instructions, when approaching the execution of instruction A, write the corresponding track point position information to unlock register group 2049. Unlock register group 2049's structure may be the structure of FIFO.

For example, the track point information of instruction A may be written in the Unlock FIFO 2049 by a special instruction before the instruction A. In this case the depth of 2049 equals to the number of instructions from instruction A to the said special instruction.

Another example, tracker 2037's read pointer 2053 moves along the corresponding track as the instruction executes, and writes read pointer's value (track point's position data) into unlock FIFO 2049. Here, unlock FIFO 2049's depth corresponds to the time delay between read pointer 2053 of tracker 2037 points to instruction A and lane 2031 executes the same instruction.

This way, when read pointer 2053 points to the track point that corresponds to instruction A, the corresponding track point position data of instruction a is written into unlock FIFO 2049's corresponding first register. Afterwards the track point position is successively transmitted through each register in unlock FIFO 2049. When the position of the track point is transmitted to unlock FIFO 2049, lane 2031 is finished executing instruction A.

In this process (lane 2033 needs to wait for lane 2031 to finish executing instruction A to start executing instruction B), transmission gate 2051 is open, transmission gate 2061 is closed, sending the track point position that corresponds to instruction A in unlock FIFO 2049 to bus 2071. Comparator 2073 compares the track point position on bus 2071 with the track point of instruction A stored in lock register 2057, when the two are equal, it represents that instruction A has already been executed by lane 2031, here lane 2033 may start executing instruction B. In this embodiment, multiplexer 2075 selects the compared result created by comparator 2073 to control the update of register 2067 in tracker 2039, so lane 2033 continue executes follow up instructions after executing instruction B.

When barrier lock is needed to synchronize instructions running on lane 2031 and lane 2033, that is to execute the follow up instructions only after the completion of instruction A execution in both lane 2033 and lane 2031. In this case, each of the lock registers in tracker 2037 and 2039 latches in the track point position information of instruction A. Both multiplexers 2075 and 2079 select the output of AND gate 2077 to control the update of tracker read pointer. Thus, lanes 2031 and 2033 may execute the follow up instructions after instruction A only when AND gate 2077 outputs '1' to each of the multiplexors. That only happens after all of the registers (FIFO) of the related trackers (tracker 2037 and 2039 in this example) has outputted the track point position of instruction A to each's corresponding comparators, which means only after all of the related lanes (lane 2031 and 2033 in this example) have all executed instruction A. If some of the lanes do not take part in the barrier lock, the mask registers 2080 or 2081 in each of those lanes are set to '1'. This causes the signal from each of those lane to gate 2077 are set to '1', and therefore not interfere with the barrier lock applied to the other lanes.

In another case, when instructions executed in the two lanes do not need to synchronize with each other, multiplexer 2075 and 2077 both are set to select value '1', thus the register 2043 of tracker 2037 and the register 2067 of tracker 2039 are not controlled by the compared results, and thus each performs its own tracking independently.

Figure 17:
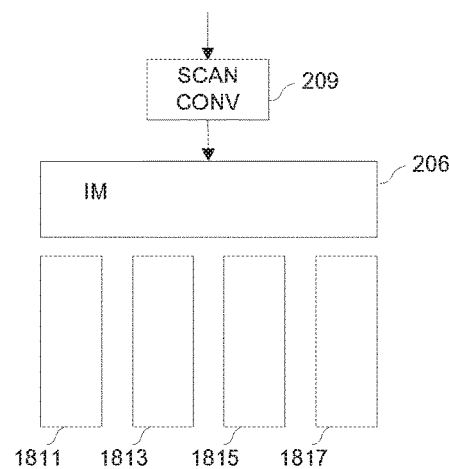
FIG. 17 illustrates an exemplary multi-lane processor that supports multiple instruction sets consistent with this disclosure.

The multi-lane processor disclosure may be expanded to support more than one instruction set. FIG. 17 is an exemplary multi-lane processor that supports multiple instruction sets consistent with this disclosure. In the FIG. 206 is instruction memory, 209 is scan converter, and 1811, 1813, 1815 and 1817 are four processor cores. Lanes 1811, 1813, 1815, and 1817 execute instructions of instruction set A only. The scan function of scan converter 209 is similar to the function of scanner 208, but it also has a converting function, and may convert the inputted instructions of instruction set B into the corresponding instructions of instruction set A. Therefore, the embodiment of FIG. 15 may support instruction set A and instruction set B at the same time. When executing instruction set A, scan converter only performs the scan function, and does not perform the instruction set converting function. Only when executing instruction set B scan converter 209 not only performs scanning function, but also performs instruction set converting function. The conversion of instructions occurs before instructions are stored in instruction memory 206, thus instruction memory 206 only has the instructions of instruction set A. Therefore, when each lane transfers and allocates instructions, as long as the target is hit in instruction memory 206, there is no need to wait for the instruction conversion.

Further, there are two instruction set converter mechanisms in scan converter 209, which respectively convert instruction set B and instruction set C to instruction set A. Under this circumstance, it is equivalent as different lanes and different threads in multi lane processor are executing instructions of different instruction sets.

Figure 18A:
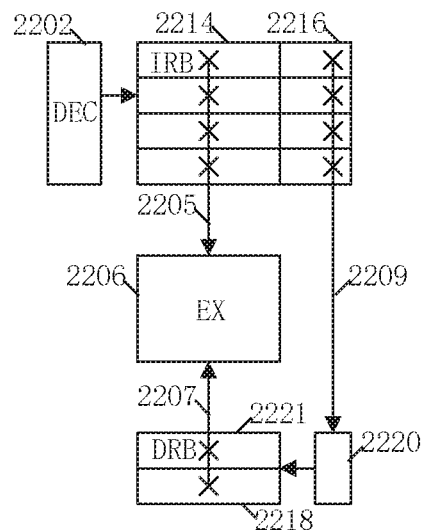
FIG. 18A illustrates an embodiment of processor system including DRB consistent with this disclosure.

As used herein, another embodiment of processor system including DRB is illustrated in FIG. 18A. The number of entries in DRB 2218 is different from the number of entries in IRB 2214, whereas its structure and functionality is the same as IRB 107. There is an additional field in each entry of IRB 2214, which is used to store a data read buffer address (DRBA), and an additional DRBA decoder 2220, which is used to decode DRBA and select the corresponding entry in DRB. The DRBA stored in the IRB entry is passed by bus 2209 and selects one entry in DRB 2218 after being decoded by decoder 2220 when this IRB entry issues instructions to execution unit 2206 through bus 2205. The data stored in the selected DRB entry is then also sent to execution unit 2206 at a proper pipeline cycle (which could be implemented by delaying the address pass on bus 2209). If an entry in IRB is replaced by other instructions, the DRBA in the replaced entry is read out and stored in a replacement module.

Figure 18B:
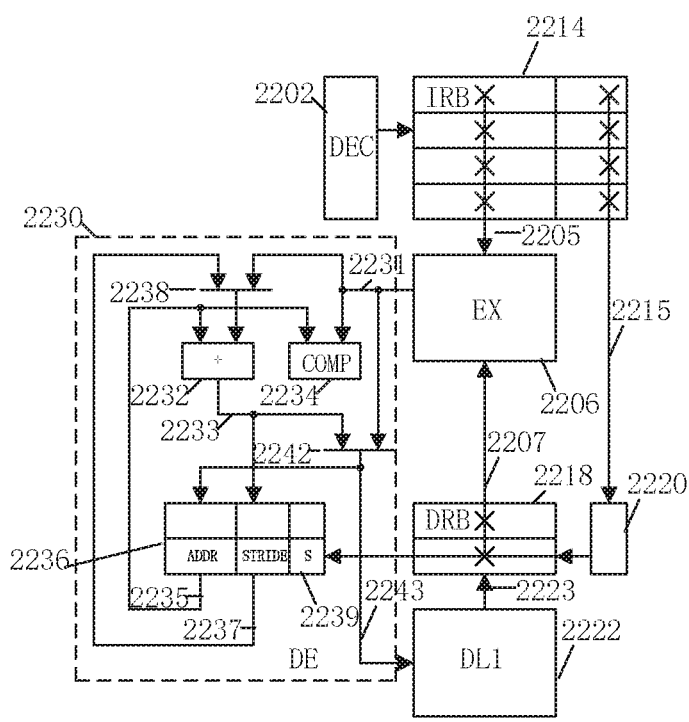
FIG. 18B illustrates another embodiment of processor system including DRB consistent with this disclosure.

As used herein, another embodiment of processor system including DRB is illustrated in FIG. 18B. There is a data engine 2230, which fills entries in DRB herein and consists of an adder 2232, a stride memory 2236 and multiplexers 2238, 2242. A data address 2235, stride value 2237 and status bit 2239 comprise each entry in the stride memory 2236. It inspects the instructions every time the instruction block is filled, and respectively allocates an entry in stride memory and DRB for each data load instruction. This could be implemented by filling an available DRBA into IRB entry corresponding to the data load instruction, which is done by replacement logic, completing initialization of stride memory entry and DRB entry. As to the detailed implementation, part or even all contents of stride memory (data address 2235, stride value 2237 or status bit 2239 for example) could be stored in DRB 2218 or the track table's corresponding entry. However, the embodiment in FIG. 18B illustrates independent DRB 2218 and stride memory 2236. The data address is computed according to the content of stride memory 2236, which is addressed by decoding the result of decoder 2220 on DRBA from bus 2215. Data engine 2230 is responsible for writing and updating the content of DRB 2218 and stride memory 2236. The status bit in stride memory 2239's entry and the valid bit in DRB 2218's entry are both set to '0' at the initial allocation.

The contents of stride memory 2236 and DRB 2218 which are addressed by DRBA on bus 2215 are read out when a data load instruction is issued the first time by IRB 2214 through bus 2205. The valid bit of DRB entry is '0' at this time, directing the execution unit should stall the pipeline and wait for data, whereas the status bit 2239 of stride memory entry is '0', directing the data engine 1930 to wait for data address 2231 to be generated by execution unit 2206 (or computed by the data engine itself, such as generating the data address by adding the data base address in data load instruction to the data offset). The data from cache 2242, which is indexed by address 2231 selected by multiplexer 2242 and sent through bus 2243, is filled into corresponding entry in DRB 2218 through bus 2223, making the valid bit of this entry and status bit 2239 in corresponding stride memory entry to be set to '1'. Execution unit reads out data from DRB through bus 2207 and completes the pipeline operations if the valid bit of the wanted DRB entry is '1'. The valid bit is then reset to '0', and data address on bus 2243 is filled into the corresponding entry's data address field 2235 in stride memory 2236.

If the data load instruction is issued again, the '0' valid bit of corresponding entry in DRB 2218 directs the pipeline in execution unit to be stalled and wait for the data filled into DRB 2218. The l'status bit 2239 of corresponding entry in stride memory 2236 directs the data engine to wait for the data address on bus 2231 generated by execution unit again, based on that the data is read out from data cache 2222 and filled into the corresponding entry in DRB 2218, then setting its valid bit as '1'. Thus, execution unit 2206 may read out the data needed from bus 2207 and proceed in execution as stated before. Then the '1' valid bit and '1' status bit controls the multiplexer 2238 in data engine to select data address 2231 of this time to adder 2232 The adder 2232 subtracts the old data address 2235 stored in stride memory 2236 from data address 2231, and the result (difference, namely data stride) is stored in stride field 2237 in stride memory 2236's entry.

Furthermore, the result 2233 of adding stride value in stride field 2237 to current data address on bus 2231 selected by multiplexer 2238 is the possible data address when the data load instruction is executed the next time. The resulting address is sent to bus 2243 after being selected by multiplexer 2242 and stored in data address field 2237 in the corresponding entry in stride memory 2236. Data engine reads out data from data cache 2233 in advance according to the data address on bus 2243 and then stores it in DRB 2218. The corresponding status bit is set to '2' and valid bit is set to '1'. It is worth noticing that the corresponding entry in stride memory 2236 stores pre-calculated next data address and data stride value while the corresponding entry in DRB 2218 stores pre-fetched next data, as well as that both the entry in DRB 2218 and the entry in stride memory 2236 are pointed to by DRBA in IRB 2214's entry which corresponds to the data load instruction.

As a result, data needed by the data load instruction is already stored in DRB 2218 once the instruction is executed again, which is pointed to by DRBA in the entry of IRB corresponding to the instruction, and could be sent to bus 2207 at proper time. Thus, execution unit 2206 does not have to wait to fetch data from data cache. Because the value of status bit 2239 is '2', the data engine 2236 again calculates the data address for next time by adding data address 2235 to data stride 2237 to fetch data. It also updates the corresponding entries in stride memory 2236 and DRB 2218 and sets the valid bit to '1'.

The above methods and devices may improve efficiency of data loading in a loop. However, it is necessary to verify due to pre-fetching data on a possible data address. The embodiment in FIG. 18B uses comparator 2234 to compare possible data address 2235 with the real data address 2231 generated by execution unit when it executes the data load instruction, so as to verify the correctness of the possible data addresses. It keeps the pre-fetched data, proceeds in the following operation, and keeps the status bit as '2' if these two addresses are identical, or otherwise sets the status bit to '1', re-computes data stride and repeats the above procedure from this state.

As used herein, data engines may be added to provide corresponding data to the Load instructions in a loop, based on the embodiments of executing instruction loop in parallel illustrated in FIG. 14A, B or C. Here, each lane has its own data engine, each data engine has a lane number of the corresponding to lanes (such as '0', '1', . . . ). Each lane has a multiplier, the said multiplier may be an independent multiplier located in the data engine, or the lanes may share the multiplier of the execution unit. In addition, there are also four groups of buses (stride bus, width bus, initial address bus, and last lane number bus) that span across all lanes, which respectively send data address stride value, the number of lanes used during parallel execution (lanes width), the data address where parallel execution begins, and the last lane number of the last parallel loop execution to every lane.

In this embodiment, loop instructions may be broken down by cycle controller as shown in embodiment in FIG. 14. First of all, execute the said instruction loop twice in a lane, and then obtain the data address stride in the same method as said before: subtract the two data addresses generated through executing the same data load instruction twice. Then, the cycle controller determines the number of the lanes (in this example, these lanes are continuous) needed for parallel execution based on total loop count, number of allocated lanes and the priority level of the loop instruction. Because the said instruction loop has already been executed twice, the said number of lanes should be equal to '2' less than the total number of loops. Cycle controller obtains the initial data address through the following: subtract the initial lane number (lane number of first lane of the lanes that execute the loop in parallel) from the last previous ($2^{nd}$ time) execution's data load instruction's data address, and then multiply by stride, that 'initial address=the last previous data address−initial lane number*data stride'. Cycle controller, like the calculation before, also calculates the number of cycles NI. Because the said loop instruction has already been executed twice, therefore number of cycle NI is equal to the rounded up integer quotient of the total loop number minus '2' divided by lane width (the remainder is the number of lanes used in the last parallel loop execution). Cycle controller also produces the last lane number LIL for the last cycle loop execution in parallel. The said last lane number LIL is equal to the number of lanes needed in the last cycle plus the initial lane number then minus '1.' Then, cycle controller sends the said stride, lane width, initial address, and the said last lane number LIL respectively through stride bus, width bus, initial address bus, and last lane number bus to every lane that is participating in the parallel cycle.

In the first parallel cycle, data engine in each lane calculates its data address based on its own lane number, the received initial address and the received data stride. Specifically, every lane's corresponding data address is equal to the lane number plus '1' and then multiplied with data stride and then plus initial address, which is 'data address=(lane number+1)*stride+initial address. This way, data engine may as said before, fill the data into DRB based on data address ahead of time. The DRB issues corresponding data to lane when corresponding data load instructions are issued to lane by IRB. For every cycle after the first cycle, the new data address may be obtained through multiplying the lane width with stride and then adding the original data address, and then the data engines fill data into DRBs ahead of time. Repeat the above operation until the last parallel cycle.

In this embodiment, in all the cycles before the last parallel cycle, the cycle controller sends the largest lane number of all the lanes that participate in parallel cycle through the last lane number bus to every lane, rendering every said lane to execute the said loop instruction. In the last parallel cycle, the cycle controller sends the last lane number LIL through the last lane number bus to every lane, then every lane participates in the parallel cycle compares the received last lane number LIL with its own lane number. All lanes with lane numbers greater than the last lane number LIL do not execute the said loop instruction, while the remaining lanes complete the last parallel cycle as described before.

For example, presume the total number of loops of an instruction loop is '100', the first data address generated when the load instruction in the loop is executed the first time '260' and data stride is '3'. And here 10 lanes are allocated in total (lane numbers are '4'~'13'). The stride '3' may be found through executing the instruction loop twice on one lane, as the data address is '263' when execute the load instruction in the loop the second time. 10 lanes are allocated for this instruction loop, therefore lane width is '10', initial address=(263−4*3)=251, parallel loop number NI=(100−2)/10=10 (rounded up), the last parallel loop uses 8 lanes, the last lane's number=8+4−1=11.

During the first parallel cycle, the first lane's (lane number '4') data address=(4+1)*3+251=266, the second lane's (lane number '5') data address=(5+1)*3+251=269, . . . and the last lane's (lane number '13') data address=(13+1)*3+251=293. Each lane's data engine, like before, fills data into its DRB based on the corresponding data address, and then calculates the new data address. Specifically, the first lane's new data address=10*3+266=296, the second lane's data address=10*3+269=299, . . . , and the last lane's data address=10*3+293=323. Then the data engines fill the corresponding data to each lane's own DRB prepare to issue during the second cycle. As such, the data address in each lane is updated after each time a load instruction is executed, then the data address in these ten lanes are each updated as '536', '539', . . . , '563' after the load instruction in the loop is executed the $9^{th}$ time.

In the $10^{th}$ parallel cycle, because the last lane number LIL is '11', therefore lanes '4'~'11' work normally, lanes '12' and '13' do not execute the said instruction loop. This way, in the $10^{th}$ parallel cycle, the data engines of lanes '4'~'11' have the data address '536', '539', . . . , '557', and the corresponding data to these addresses are issued to execution units to complete the last parallel cycle when their corresponding instructions are issued by the IRBs.

Figure 21:
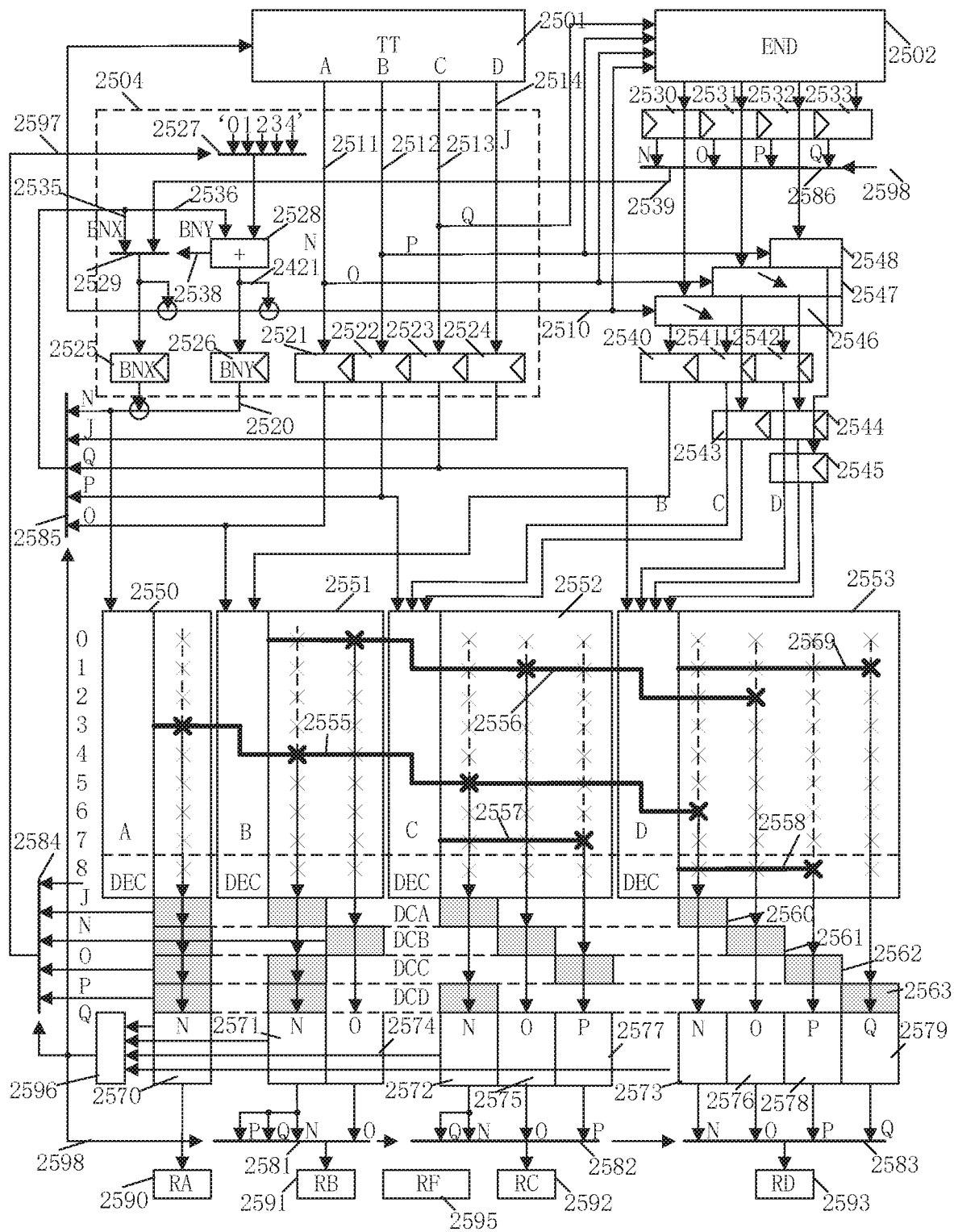
FIG. 21 illustrates an exemplary embodiment that may issue 4 instructions in parallel, and determine the program execution flow based on branch decisions on the branch instructions within the issued instructions.

With a little modification, the multi-lane processor and its IRB may handle branch instructions without the help of branch prediction, but without suffering from the pipeline stall and pipeline flush due to branch penalty. The method is to execute multiple possible instructions due to a branch decision not yet made (such as branch instruction's next sequential instruction (fall through instruction) and branch target instruction), at the same time until the branch decision has been made; then continue execution the branch of instructions selected by branch decision but terminate the other branch of instructions. Use the pipeline stage in which the branch decision is made as a border, the processor execution unit pipeline may be divided into the front-end pipeline and the back-end pipeline. A multiplexer controlled by the branch decision selects one of the partially processed instruction branches outputted by multiple front end pipelines, and the selected instruction branch is executed and complete by a single number of pipeline. The following descriptions are based on the embodiments in FIGS. 10~12, nevertheless, applications on others may be reached through analogy. FIG. 19 is an exemplary instruction segment consistent with the embodiments. FIG. 20 is an exemplary IRB that supports issuing a plural number of possible instructions at the same time consistent with the embodiments. FIG. 21 is an exemplary lane processor using the IRB in FIG. 20, execute instruction segment in FIG. 19 consistent with the embodiments to explain the structure and function.

An instruction segment being executed is illustrated in FIG. 19A. Row 2301 consists of 4 sequential instructions to be issued at the same time and the instruction denoted by circle in the figure is branch instruction. All 4 instructions in this example are branch instructions and are located at the same IRB block, whose first address is '68' and Next bock address is '23'. The track table entries corresponding to the 4 instructions in row 2301 are demonstrated in row 2302. As illustrated in the figure, the branch target of instruction 3 is '68.0', whereas instruction 4, 5, 6 are respectively '68.7', 68.1' and '68.2' (the address format denoted hereto is BNX.BNY). The track point 2303 is the end point of its track and it stores Next bock address '23'. For ease of explanation, the four different instructions issued at the same time are hereby defined as issued at different instruction issue slots by program sequence. As shown in row 2304, the instruction 3 is located at slot A, and instructions 4, 5, 6 are respectively located at slot B, C, D. FIG. 19B illustrates possible execution path of instruction segment such as 2301 with instruction address as axis. The point 2306 indicates the first instruction, the instruction 3, issued at one clock cycle and the shadowed area indicates the 4 instructions issued in the same cycle. The branch instructions denoted by the circle in this figure correspond to the ones in row 2301, while the arch derived from circle stands for a branch and the arrow which it points to represents branch targets corresponding to branch target addresses in row 2302. Instructions with addresses ranging from 0 to 7 have been filled into an IRB block and its first address BNX is '68', whereas instructions with addresses ranging from 8 to 15 have also been filled into another IRB block; the first address BNX of the IRB block is '23'.

The execution of these 4 instructions starts from instruction 3 and there are 4 possible program execution paths at this cycle based on the different branch decisions of the former 3 branch instructions. Result of the 4th branch instruction influences next clock cycle and will be discussed later. The execution path will be branch instruction 3, branch target 0 and its succeeding instructions 1 and 2 if branch instruction 3 is taken, i.e. instruction 3, 0, 1, 2; and instruction 3's branch target instructions 0, 1, 2 are hereafter referred to as O Way for ease of description. In a similar way, the execution path will be instructions 3, 4, 7, 8 if branch instruction 3 is not taken but branch instruction 4 is taken, and instruction 4's branch target instructions 7, 8 are hereafter referred to as P Way. By the same reason, the execution path will be instructions 3, 4, 5, 1 if branch instruction 3 and 4 are not taken but branch instruction 5 is taken, and instruction 5's branch target instruction 1 is hereafter referred to as Q Way. Finally, the execution path will be instructions 3, 4, 5, 6, which are hereafter referred to as N Way if all these three branch instructions are not taken. The succeeding instructions 7, 8, 9, 10 will be executed at next cycle if instruction 6 is not taken which is hereafter also referred to as N Way, or otherwise succeeding instructions 2, 3, 4, 5 which are hereafter referred to as J Way. The N Way and J Way are different execution paths in next clock cycle but their difference does not affect instructions executed in the current cycle. As long as sufficient execution units and corresponding IRB read ports and bit-lines are provided for each possible execute paths during one cycle, all possible instructions that may be executed could be issued to multiple front-end pipelines at the same time and then selected by the branch decisions, only part of the possible instructions are sent to back-end pipelines for further execution.

FIG. 20 is the exemplary IRB structure used in embodiment 21. Every IRB block constitutes a matrix, the instructions are placed in program sequence from top to bottom, with an instruction in each row; every column within each row has a read port from left to right serving a corresponding front-end pipeline. An instruction may be outputted from a read port in any column and be issued to the execution unit associated with the column base on the need. This embodiment organizes IRBs and their associated front-end pipelines in terms of issue slots, that is each lane handles the single or plural number of possible instructions in a fixed position in sequence (the issue slot) of a contiguous segment of instructions. In FIG. 19, slot A may have only one possibility of instruction, while B, C, and D slots have respectively 2, 3, and 4 possible instructions. Therefore, in this embodiment, each row has 4 read ports to support maximum 4 instructions being issued in one instruction issue slot in the IRB such as 2401.

Every lane has its own IRB (such as IRB 2401, 2407) that contains a plural number of IRB blocks. Every IRB block contains a decode module 2403, and matrix 2405 formed by storage elements, read ports and buses. Every row in matrix (such as 2411, 2413) stores an instruction, and has 4 read ports (represented by X in the figure); read ports on each row are connected by bit line bus (such as bus 2461) into columns. Instructions in the same row of different lane may be same or different from each other, depends on the different operation mode. Every column's Bit line bus in each column connects read ports on each row of each IRB block together to a front-end pipeline of a lane in the same column, such as bit line bus 2461 connects read ports in its column to front-end pipeline 2491. Every column corresponds to an instruction of one Way, which is explained in FIG. 19, in a slot. A Way may have instructions that need to be issued in multiple issue slots. Organizing the lanes as issue slots, then the instructions of the same way may distribute in multiple slots. A Way may have its own specific column in multiple issue slots (i.e. lanes). Such as N Way has an N Way specific column in each of the issue slots A, B, C, and D. In matrix 2405 of an issue slot (lane), column 2421 is the N Way specific column; column 2423, 2325 and 2427 are respectively specific columns of O, P, and Q Ways. IRB 2407 is the IRB of another lane, and has the same structure as 2401, the same decoder 2408 and the same matrix 2409. Only the components necessary for the explanation of operation are shown in decoder 2408 and matrix 2408. In this example, decoders 2403 and 2408 decode addresses from trackers to drive the word lines. The Token register of the embodiments in FIG. 10-12 may perform the same function under the directions of the trackers, whose principle of operation is the same as depicted in the following, is therefore not repeated here.

Using IRB block 2401's decoder module 2403 as example, the first address register 1025, the present first address comparator 1029 and the present second address decoder 1021 are the same as the corresponding parts of the previous embodiments (known as branch source comparator and branch source address decoder), of these first address register 1025 stores the corresponding BNX value of the current instruction block, written in at the same time when instructions are filled into the instruction block. The first address comparator 1029 compares the BNX of read pointer 2471 from tracker with the BNX stored in the first address register 1025, if the compare result is equal, it means the corresponding instruction block is the current instruction block. That enables the second address decoder 1021 to decode the BNY on read pointer 2471', to drive one and only one '1' on one of the local word line 2450 or 2451). When comparison result of the first address comparator 1029 is 'not equal', second address decoder 1021's output is all '0'.

As lane processor, read ports in each row of the IRBs in this embodiment issue instructions under the control of four types of word lines. These four types of word lines are selected by the multiplexers in each column (such as multiplexer 2431) to control the read ports in each row to implement the modes depicted in FIG. 13 embodiments. Of the four types of word lines, one type is local word line, which is driven by second address decoder, such as word line 2450 and 2451 driven by second address decoder 1021. The second type is a special zigzag word line (such as word line 2482), driven by the Next address comparator 2481 and controls read port in first row of each IRB block. The first, second types of word lines are allocated within a lane. The third, fourth types of global word line are not directly driven by decoder or comparator, but rather passing the signal on the word line in a lane to a lane on its right. The third type of global level word line (such as word line 2460) passes the signal horizontally to read ports in the same row in the lane on the right. The fourth type of global zigzag word line (such as word line 2453) passes the signal diagonally to read ports in one row below in the lane on the right. A common signal controls all multiplexers in the same column of a lane selecting the same input port of each multiplexer. The control signals of different columns may be independently configured, making read ports in the same column either be controlled or disabled by one of the four types of word lines.

When performing lane independent operations such as SISD or MIMD, the tracker of each lane controls the decoders (such as decoder 1021) and the token registers in IRB of the lane drives local word lines controlling read ports to issue instructions to the execution unit of the lane. The operation of this mode needs one Way only, which means only one column in each slot. For example, if only N Way is used, all the multiplexers in N column 2421 of control matrix 2405 selects the middle input, that is local word line 2450, 2451 and so on; and the multiplexers of control O column 2423, P column 2425 and Q column 2427 all selected the '0' (disable) input on the left. If the first address register 1025's content is '68', and the address on read pointer 2471 is '68.0', then comparator 1029 enabled decoder 1021 to drive word line 2450, and the N Way's multiplexer 2431 transmits it to horizontal global word line 2460 and enables read port 2432, send the instructions stored in row 2411 through bit line bus 2461 to front-end pipeline 2491 to process. And all the multiplexers in O, P, and Q (such as multiplexer 2433) are disabled; therefore, word line 2450 does not affect these three read ports. By the same argument multiplexers 2435 and 2457 in IRB 2407's N Way also selects local word line, and under the decoder 2409's control issue instructions for front-end pipeline 2492 to execute, not affected by signal on horizontal global word line 2460. This is the Column correlation stated before.

When executing SIMD type of operation, it also only needs to use only one column (one Way) of each lane, but the lanes are distinguish as the Lead Lane and the Following Lanes. In this type of operation, the left most lane in multiple lanes is the Lead Lane, the set up of multiplexers in each column of the Lead Lane is the same as that of the previous example. The plural number of lanes on the right hand side of the Lead Lane are the Following Lanes. The multiplexers of O, P, Q columns in the Following Lanes select '0' (disable) as before. However, N column multiplexer of the Following Lanes selects the left input, which is the third type of word line global horizontal word line (such as word line 2460). Now Inbreed port matrix 2405's lane is set as the Lead Lane, and IRB 2407's lane is set as the Following Lane. When multiplexer 2431 selects word line 2450 to drive global horizontal word line 2460 enabling read port 2432 issue instruction in row 2411, multiplexer 2435 also selects horizontal word line 2460 drive global horizontal word line 2467 enabling read port 2436, issue instruction in row 2411 to front-end pipeline 2499 for process (instructions in the same row of matrix 2405 and IRB 2407 maybe the same or different). At the same time horizontal word line 2467's signal may be sent to lanes even more to the right, and using the same method drive the N Way read ports on the same row in each lane to issue instructions. This is the Row correlation stated before. This example and the above example both only use N Way only, other Ways are disabled.

When performing multi-issue operation in instruction level parallel (ILP) mode all Ways N, O, P, and Q are used. In this mode, the global zigzag word lines (such as word line 2468) are used besides the word lines used in the two examples above. The zigzag word line passes the control signal of a read port in a row of in a lane of certain Way to the read port in one row lower in the lane to its right of the same way to issue the Next sequential instruction in the same way in the right hand lane. In this mode, a tracker controls the decoder 1021 or token register in the IRB drives local word lines of each lane controlling read ports to issue instructions. The signal on local word line is passed through zigzag word lines to the neighboring lanes to issue the sequential next instructions to implement ILP. In this mode, the second address decoder like 1021 in each lane each drives the word line of a way. For example, the A slot decoder drives N Way, B, C, D slots decoders respectively drive O, P, Q Ways. Specifically, the multiplexers in N column 2421 of slot A are configured to select the middle input, which is the local word line outputted by decoder, while those in the other columns select the left '0' (disable), because slot A has only one possible instruction. The multiplexers of column O 2423 of slot B are all configured to select the middle input, the local word line the decoder outputs, multiplexers in N Way are configured to select the right input, the zigzag word line, while Ways P and Q are configured to select disable on the left, because slot B only has two possible instructions.

Multiplexers in column P 2425 in slot C are configured to select the middle input, local word line outputted by decoder, and the other Ways N and O selects the right side input, the zigzag word line, and Way Q selects disable on the left side because slot C only has three possible instructions. The multiplexer in column Q2427 of slot D is configured to select the right side input (please note the multiplexers in this column only has two inputs, the right side input function is the same as that of middle inputs of multiplexers in other columns), which is the local word line outputted by the decoder, and the other N, P, Q Ways select the input on the right, zigzag word line, because slot D has four possible instructions. Please refer to FIG. 20, IRB 2401 is in slot C, IRB 2407 is in slot D. In IRB 2401, as said above, the multiplexers in N Way 2421 and O Way 2423 select the input on the right, the zigzag word line; Way 2425's multiplexer selects the middle input, the local word line; and Way Q 2427's multiplexer selects the input on the left, is disabled. And the multiplexers in IRB 2407, N, O, P Ways all select zigzag word line input; and Way Q selects local word line's input.

Like the previous example, slot C's decoder 2403 decodes read pointer 2471 and drives and enables local word line 2450, here only the multiplexer 2433 in P Way 2425 selects local word line 2450, sending the enabled signals to zigzag word line 2468 enabling read port 2433 to issue the instructions in row 2411 to front-end pipeline 2495 for process. D slot IRB 2407's multiplexer 2437 in P Way selects zigzag word line 2468, enabling read port 2438 to issue the instruction in row 2413 to front-end pipeline 2496 process. This is the Diagonal correlation stated before. Please notice that in this embodiment the global zigzag word line and the global horizontal word line of N Way shares the same word line, the word line not only connects to the left input of the multiplexer in the same row in N Way in the lane on the right, but also connects to the right input of the of the multiplexer in the row below in N Way in the lane on the right. If multiplexers in N Way all select left input, the operation mode is Row correlation as illustrated by the previous example. If multiplexers in N Way all select right input, the operation mode is Diagonal correlation. If IRB 2401 is in slot A and the local word line 2450 is valid, then multiplexer 2431 selects the valid word line 2450 to drive and global horizontal word line 2460 to issue instruction in row 2411 to front-end pipeline 2491. And multiplexer 2437 in slot B IRB 2407 is configured to select right input which controls read port 2438 to issue instruction from row 2413 to front-end pipeline 2492.

When decoder such as 1021 decodes and drives local word lines near the lower boundary of IRB block, it is possible that the zigzag bus reaches the lower boundary, therefore it is not able to pass further to enable the issuing of sequential instructions before it is passed to the last slot, slot D. Because each instruction block is randomly filled into each IRB block, so it cannot simply connect the zigzag word line at the lower boundary with zigzag word line of the next lower IRB block to solve this problem. This disclosure's previous embodiments have already explained how to use token bus to solve this problem. This embodiment uses FIG. 20 as an example to explain how address decoding may implement the same function. The number of the slot in which the Zigzag word line reaches lower boundary of an IRB block may be obtained by performing calculation on the second address BNY, which decides which local word line to drive, and the slot number of the decoder which decodes the second address. The row number is always the first row of an IRB block. The Way number is always the same Way in which the zigzag word line reaches the lower boundary. The calculation details are explained in the embodiment in FIG. 21, here only illustrates how IRBs drive the right zigzag word lines, based on first address BNX obtained through calculation or table checking, to seamlessly issue plural number of contiguous instructions utilizing issue slots, although those instructions may be stored in different IRB blocks.

Still use IRB 2401 as slot C, and IRB 2407 as slot D as an example. Row 2411 is the first row of IRB block', row 2413 is the second row but not the last row. The right inputs of the multiplexers of column N 2421, column O 2423, and column P 2425 of IRB 2401 are all connected to zigzag word lines. The right input of the 3 multiplexers in the first row of these 3 columns is each connected to special zigzag word lines driven by 3 Next block comparator of in decoder 2403. For example, N Way Next block comparator 2481 drives word line 1082 connects to the right input of N Way multiplexer 2431. The other O, P Ways may be deduced by analogy. Q Way does not have a Next block in this clock cycle, because Q Way only has one instruction which is issued in slot D, its follow up instructions all have to be issued in the next cycle. The Next block comparators compare the first address on the Next block address bus with the first address stored in the decoder, the comparison results drive the special zigzag buses directly.

Presume the instruction block address stored in first address register 1025 in IRB 2401 of the lane of slot C is '23'. And Current address on tracker read pointer is '68.6'. Read pointer is sent to slot A to drive the N Way zigzag word line. The read pointer's first address is compared with the first address stored in each of slot A's IRB blocks. The IRB blocks whose first addresses are '68' further decode read pointer's second address to drive to zigzag word line '6' (not featured in FIG. 20). Presume every IRB block contains 8 instructions and thus has 8 rows of read ports. As explained before, the said '6' zigzag word line enables the issue of the $6^{th}$ row instruction in slot A in an IRB block whose first address is '68. The zigzag bus also drives the issuing of the $7^{th}$ row instruction through slot B, the lane to the right. Then the zigzag word line reaches the lower boundary of the IRB block.

At the same time when read pointer '68.6' is generated, the next address '23' has already been obtained through the checking of the track table. Based on the BNY '6' on the read pointer and the fact this read pointer is sent to lane of slot A, and based on the fact that only the N Way multiplexer of this lane is configure to select the local word line which is outputted by the second address decoder, it may be deduced that the first instruction of the Next block should be issued from N Way in Slot C. Therefore, tracker puts the Next bock address '23' on Next block address bus 2486 of N Way slot C. In FIG. 20, the N Way Next block address comparator 2481 found a match with the address on bus 2486 and the content of first address register 1025, and thus drives the special zigzag bus 2482. It has been explained that the multiplexers of N Way (such as column 2421) in slot C and slot D are configured to select the right input, which is the input that connects to zigzag word line under the ILP mode. Therefore, word line 2482 is selected by slot C's multiplexer 2431 to drive bus 2460, Slot D's multiplexer 2437 selects bus 2460. The result is the instruction in row 2411 is issued to front-end pipeline 2491 in slot C, instruction in row 2413 is issued to front end pipeline 2492 in slot D. Thus, all four instruction issue slots in N Way are fully utilized even when the issuing crosses IRB block boundary.

Please refer to FIG. 21, which is an exemplary embodiment that may issue 4 instructions in parallel, and determine the program execution flow based on branch decisions on the branch instructions within the issued instructions. For ease of description, the execution unit pipeline of the embodiment has 3 stages: D pipe for instruction decode, E pipe for execution, and W pipe for write back. The method of this embodiment may be applied to pipelines of other forms and organizations. Instruction issued by IRB 2550, instruction decode, dependency check, branch decision and RF read are all performed in pipe stage D. The data engine shown in FIG. 18 will fill data into data read buffer DRB (not shown in FIG. 21) ahead of time. Under the control of IRBs, DRBs provide data at pipe stage E (bypass for execution) and at pipe stage W (for filling RF when executing load instructions); therefore, pipeline does not need the usual data access stage M.

The track table 2501 in FIG. 21 is different from previous embodiments. The track table may output the table entry 2511 pointed out by read pointer and the three sequential following table entries, 2512, 2513 and 2514, at the same time to provide up to 4 branch targets the 4 sequential instructions may point to. The End track point memory 2502 is detached from track table, but nevertheless stores its address content by the same row address as that in track table, and the content is updated at the same time as the corresponding row is updated in the track table. It has 4 read ports and outputs 4 End track points based on 4 BNX address inputs in parallel. Based on the 4 BNX address inputs, the Next block addresses provided by the End track point memory may be deemed as valid or invalid. Shifters 2546, 2547 and 2548 are responsible for shifting these Next block addresses (provided by the End track point memory) to the appropriate slot. Registers 2530, 2531, 2532 and 2533 store the said 4 Next block addresses. In these four Next block addresses, the first Next bock address after being shifted by shifter 2546, may be stored by either register 2540, 2541, or 2542; the second Next bock address after being shifted by shifter 2547, may be stored by either register 2543 or 2544; the third Next bock address after being shifted by shifter 2548, is stored by register 2545. The Next bock address BNX outputted by registers 2530, 2531, 2532 and 2533 is selected by multiplexer 2586, which is controlled by branch decision result 2598. The output passes through bus 2539 and is sent to an input of multiplexer 2529 in tracker 2504 for the calculation of Current address of next clock cycle. Also, the Next block addresses outputted by registers 2530, 2531 and 2532 are sent to the Next bock address comparator 2419 in IRBs 2550, 2551 and 2552. The Next bock address outputted by register 2540 is sent to column address controller 2411 in IRB 2551, the Next block addresses outputted by registers 2541 and 2543 are sent to column address controller 2411 in IRB 2552, the Next block addresses outputted by registers 2542, 2544 and 2545 are sent to column address controller 2411 in IRB 2553; these control the plural number of zigzag word lines in the Next IRB blocks. In this embodiment, register 2525, 2530, 2531, 2532 and 2533 store BNX; register 2526 stores BNY: registers 2521, 2522, 2523, and 2524 store both BNX and BNY.

Tracker 2504 is different from before in that it may provide the current instruction address, and all the branch targets of branch instructions within 4 instructions at the same time starting with the current instruction. Specifically, registers 2525, 2526 respectively store the current instruction's first address BNX and second address BNY; register 2521, 2522, 2523 and 2524 store branch target addresses (BNX and BNY) 2511, 2512, 2513, 2514 of the current instruction segment (4 in this embodiment) outputted by the track table. In this example, the 4 BNXs are '68', four BNYs are respectively '0', '7', '1', and '2'. The output of register 2525 (BNX) and 2526 (BNY) are joined together into bus 2520 (in the figure circle and arrow represent the two buses joined together). Outputs of registers 2521, 2524, 2523 are sent to all of the first address comparators in read buffer 2504 and the current second address decoder 1021, which drives multiple zigzag word lines.

The outputs of bus 2520 and registers 2521, 2522, 2523, 2524 are selected by multiplexer 2585, which is controlled by branch decision. The first address BNX portion 2535 of multiplexer 2585's output is sent to the other input of multiplexer 2529; the second address BNY portion 2536 is sent to adder 2528 and added to the increment amount provided multiplexer 2527, which is under the control of dependency checker's detection result 2565. The sum of the adder is used as the new current second address BNY and stored into register 2526. Adder's carry output signal 2538 controls multiplexer 2529. When there is no carry out, multiplexer 2529 selects the current first address 2535; when there is carry out, multiplexer 2529 selects the Next bock's first address 2539; the output of multiplexer 2529 is the new current first address BNX and is stored into register 2526.

Multiplexer 2529's output and adder 2528's output are also joined to become read pointer 2510 to control the reading of the track table 2501. Read pointer 2510 (the Current address of next cycle) and track table 2501's outputs 2511, 2512, 2513 (branch targets of instructions 1, 2, 3 in next cycle) are sent to End track point memory 2502 to read out the Next block address of each address; and are also sent to column address generator 2503. Column address generator generates the corresponding column address. The Current address' Next block address is stored in register 2530, and is stored in register 2540 after the corresponding shift. The Next block addresses of 2511, 2512, and 2513, which are the branch target address of the first, second, and third instructions of the current instruction segment, are stored into registers 2531, 2532, and 2533, and stored in registers 2541, 2542, 2543, 2544 and 2545 after corresponding shift.

IRB 2550, 2551, 2552, and 2553 are 4 groups of IRBs like the structure of FIG. 20. Among the four, IRB 2553 does not need to have Next block address decoder. Based on the dependency between the instructions, dependency checker 2560, 2561 2562 and 2563 provides signal 2597 to tracker 2504 to select the increment to determine the initial Current address in the next cycle. 2570~2579 are 10 front-end pipelines. Under the control of branch decisions, multiplexers 2581, 2582 and 2583 select outputs of the front-end pipelines for the further execution by the back-end pipelines 2590 etc. There are in total four rear-end pipelines 2590, 2591, 2592, and 2593 that support parallel execution of 4 instructions. RF 2595 is shared by all front-end pipelines and rear-ends pipelines. Instruction being processed by front-end pipeline 2570 controls the fetch of data from RF 2595, and the data is sent to rear-end pipeline 2590 for further processing. Instructions being processed by front-end pipeline 2571~2579 controls the fetch of data from RF 2595, and the data together with the corresponding operation control obtained through instruction decoding are selected by multiplexers 2581, 2582, and 2583. The selected data and operation control are sent to rear-end pipeline 2591, 2592, and 2593 for further processing. The execution result of the instruction selected to be completed in the rear-end pipelines are written back into RF 2595.

There are in total 10 front-end pipelines because there are common paths, which may be shared by the said 4 execution paths determined by branch decision. For example, all 4 paths need to execute the first instructions in the instruction segment (instruction 3 in this example), therefore the first instruction in the segment only needs 1 front-end pipeline, not 4, to process. The second, third, and fourth instructions in the segment respectively need 2, 3, and 4 front-end pipelines. The 4 instructions that are processed in the same cycle are in the same instruction execution slot. For ease of explanation, respectively name the instruction execution slots the 4 sequential instructions issued in the same clock cycle that would occupy as slots A, B, C, and D in the order of instruction execution sequence. Slot A only has one choice, instruction 3 in the example in FIGS. 19A, B; and slot B has two choices, instruction 4 (instruction 3 does not branch) or instruction 0 (instruction 3 branches); by the same reason, slot C has 3 choices, and slot D has 4 choices. Every instruction possibly executed in an instruction slot has its own designated front-end pipeline. As shown in this figure, instruction slot A only contains a front-end pipeline 2570, instruction B contains two front-end pipelines 2571, 2574, instruction slot C contains 3 front-end pipelines 2572, 2575 and 2577, instruction D contains 4 front-end pipelines 2573, 2576, 2578, 2579. Rear-end pipeline 2590, 2591, 2592 and 2593 are marked as RA, RB, RC and RD to indicate each executes the instruction after branch decision selection in A, B, C, D instruction slots respectively. RF 2595 is shared by the front-end and rear-end pipelines of all of the instruction slots.

Because there may be multiple instructions issued in an instruction slot, for ease of explanation, define Way as the possible different program execution paths due to branch instructions. First, define N Way as the execution path in which the plural number of instructions in slots A, B, C are either non branch instructions or branch instructions that do not take the branches, there are 4 instructions in this cycle; presume instruction A is presumed as taken branches, then all the needed instructions from hereon are named O Way. In this cycle there are 3 instructions; presume A instruction does not branch, but B instruction branches, then the instructions needed hereon are named P Way, there are two instructions in this cycle; if instructions A and B do not branch, but instruction C does branch, then the needed instruction hereon is named Q Way, in this cycle there is one instruction. A, B, C instructions do not branch, but the instructions needed by instruction branch D are named J Way, in this cycle there are 0 of these instructions. Please note that the outputs of track table 2511, 2512, 2513, 2514 are the corresponding track table entries of A, B, C, D slot instructions in N Way, the content is each instruction's branch target, and also the starting point of O, P, Q, J Ways.

As used herein, the Next block addresses of current instruction or branch target may be generated based on the following method. The generated Next block addresses may be shifted to store in appropriate registers. Define number of rows in every IRB block (number of storage entries) as n; block offset address (second address) as BNY, which has value 0~n−1, the row on the top is row 0; there are m slots in total, which have value from 0~m−1, the left most slot is slot 0; there are w Ways in total, which have value from 0~w−1, the left most is 0 Way. Then, the Next block address is valid if ((m−w)−(n−BNY)) is greater than 0, invalid if otherwise. In this embodiment, the Next block addresses for N, O, and P Ways may be shifted to appropriate slots based on the corresponding initial BNY addresses. Q Way does not need the said Next block address. Specifically, the value of ((m−w)−(n−BNY)−1) is used as the shift amount and right shifts the Next block address.

In this example, n=8, m=4, w=4, N corresponds to ay 0, O corresponds to Way 1, P corresponds to Way 2, Q corresponds to Way 3. When N Way's BNY=6, ((m−w)−(n−BNY))=((4−0)−(8−6))=2, greater than 0, therefore the Next block address is valid. The meaning is that address '6' is decoded and drives zigzag word line, the instruction that corresponds to address '6' is issued from N Way slot A, the instruction that corresponds to address '7' is issued from N Way slot B, at this time the zigzag word line terminates as it reaches IRB block's lower boundary. At this time, decoding of Next address points to the first instruction of the Next instruction block, the only thing that needs to know is which slot of N Way the instruction should be issued from to fully utilize processor resources and avoid collision with instructions issued by the current IRB. At this time, the shift amount ((m−w)−(n−BNY)−1)=1, shifter 2546 shifts right one position of the valid Next block address, which is the N Way Next block address stored in register 2530, and store the shifted result to register 2541 of N Way slot C (the values of N Way's other corresponding registers 2540 and 2542 are invalid). This address is decoded by the column decoder 2411 of Next instruction block in column 2 to issue the first instruction (BNY=0) from N Way slot C, the second instruction (BNY=1) is issued from N Way slot D. If ((m−w)−(n−BNY)) is less than 0, the Next bock address is invalid, and the corresponding registers 2540, 2541, 2542 of N Way are all invalid. Controller controls all column decoders 2411 so that they don't drive any zigzag word lines, because under the circumstances, the current IRB block issues instructions to all columns at the same time. The result of the above calculation may be placed in a reference table to replace calculation.

Dependency checker 2560~2563 has a structure similar to the dependency checker in FIG. 12, but the source of the instructions to be detected are slightly different. N Way's structure and connections of dependency checker 2560 are the same as that of the dependency checker in FIG. 12, the RF address being examined is from the N Way instructions of the 4 slots. The fundamental structure of O Way's dependency checker 2561 is similar to the dependency checker 2560, in that the last three instructions from the O Ways of slots B, C, and D, and the first instruction comes from A slot's N Way. The shadowed area in FIG. 21 shows the slot instructions that have to be examined by dependency check. P Way's dependency checker 2562 examines the correlation of instructions of N Way of slots A and B, and the P Way of slots C and D. Q Way's dependency checker 2563 examines the correlation of instructions in N Way of slots A, B, and C, and D slot's Q Way. Each dependency checker's result also has to be revised. For example, the first instruction O Way issues is from slot B, if dependency checker 2561 does not detect any dependency, therefore increment value should be '3'; if slot D's instruction has dependency, the increment value is '2'; if instruction in slot C has dependency, the increment value is '1'; if instructions in slot B has dependency the increment value is '0', the next cycle should start issuing from slot B's instruction. By the same reason, the sources of dependency checker 2562 are N Way of slots A and B and P Way of slots C and D, and may correspondingly produce increments '2' (no dependency between instructions), '1' (slot D has dependency), and '0' (slot C has dependency). By the same reason, the sources of dependency checker 2563 are N Way of slots A, B, C and Q Way of slot D, and may correspondingly produce increments '1' (no dependency between instructions) and '0' (slot D has dependency). Here presumes branch address itself will change processor state, and thus create dependency with later instructions. If not so, introduce the instruction types in tracker register 2521, 2522, 2523 into dependency check, and disable dependency check between branch instructions and instructions in the issue slots following them. The increments outputted by all 4 dependency checkers are selected by multiplexer 2584 which is controlled by branch decision, the output 2597 of 2584 controls tracker's multiplexer 2527 to provide appropriate increments for adder 2528.

Besides, dependency checker's result is also used to produce an abort signal that clears the result of instructions, which are issued in parallel but can't be executed in parallel. Specifically, when there is dependency between two instructions that are issued at the same time, the execution of the second instruction and instructions following it must be aborted.

Using the embodiment of a dependency checker in FIG. 12 as example, because at least one instruction must be issued, slot A's instruction will always be issued and executed no matter what the dependency check result is. When output 1491 is '1', there is dependency between slot B's instruction and slot A's instruction, therefore the abort signal of slots B, C, and D is '1', and the front-end pipeline's execution results of slots B, C, and D are all cleared. This way is equivalent to only issuing and executing slot A's instruction, and the instructions of slots B, C, and D are not executed, and slots B, C, and D will not produce branch taken signal.

When output 1491 is '0', output 1492 is '1', which indicates slot C instruction has dependency with slot A's or B's instruction, and the instructions of slots A and B have no dependency. Therefore, slot B's abort signal is '0', making slot B's front-end pipeline execute normally. At the same time, the abort signals of slots C and D are '1', so the execution result of slot C's and slot D's front-end pipeline are cleared. This way is equivalent to only issuing and executing instructions of slots A and B, and not executing instructions of slots C and D, and slots C and D will not produce a branch taken signal.

When outputs 1491 and 1492 are both '0', and output 1493 is '1', it indicates that D slot's instruction has dependency with an instruction in either slot A, B, or C and instructions in slots A, B, and C have no dependency with each other. Therefore, the abort signals of slots B and C are '0', making the front-end pipeline of slots B and C execute normally. At the same time, slot D's abort signal is '1', clearing the execution result of slot D's front-end pipeline. This way it is equivalent to only issuing and executing instructions of slots A, B, and C, and not executing slot D's instruction this cycle. Slot D will not produce branch taken signal.

Lastly, when outputs 1491, 1492, and 1493 are all '0', it indicates there is no dependency between instructions of slots A, B, C, and D. Therefore, the abort signals of slots B, C, and D are '0', making the front-end pipelines of slots B, C, and D execute normally, which is equivalent to issuing and executing instructions of slots A, B, C, and D during this issue.

The IRB in FIG. 21 is organized by slot for ease of explanation. If it is organized by Way, the principle and the result would be the same, and is therefore not repeated here. IRB 2550 corresponds to slot A, and it has a column of read ports linked together by a bit line, which issues instructions to the corresponding front-end pipeline 2570. There is only 1 Way (N Way) in slot A, which is identified by the mark on the corresponding front-end pipeline 2570. IRB 2551 corresponds to B slot and has 2 Ways in total (N Way and O Way). IRB 2552 corresponds to slot C and has 3 Ways in total (N Way, O Way, and P Way). IRB 2553 corresponds to slot D and has 4 Ways in total (N Way, O Way, P Way, and Q Way). Every time Slot A's IRB 2550's decoder 2417 issues, it drives zigzag word line 2555 to read out the instructions in N Way of slots A, B, C, and D and then issue to the corresponding front-end pipeline. Whether or not the corresponding decoders of IRBs 2550, 2551, and 2552 drive word lines, depends on if the instruction issued by N Way is a branch instruction or not. If slot A's N Way is a branch instruction, the instruction type in register 2521 is branch. Then the decoder in slot B IRB 2551 decodes the branch target address in register 2521 and drives word line 2556 to read out the instructions in O Way in slots B, C, and D and issues to the corresponding front-end pipeline; it does not drive word line if the type is not branch. Because if slot A has no branch instructions, then it does not have branch targets, so O Way in slots B, C, and D does not need to be issued. By the same principle, the drive of word line in Ways P and Q depends on if N Way instruction in slots B and C is a branch instruction (see if the instruction type in register 2522, 2523 is branch or not). Reading out a table entry from track table provides branch type information. In this embodiment, the read ports are directly controlled by word lines, which are configured as zigzag word lines.

When executing the instruction segment in FIG. 19A, initial conditions are that the instruction block with instruction addresses 0-7 is already in an IRB block, and the address in IRB block's first address register 505 is '68'; the instruction block with instruction addresses 8~15 are already in another IRB block, and the address in the IRB block's first address register 505 is '23'. In the previous clock cycle, read pointer 2510's first address BNX is '68', the second address is '3' (circle and arrow represents the two buses joined together). Using read pointer '68.3' as address, read four contiguous table entries starting from the 3$^{rd}$ table entry from track table 2501's row 63; the content of table entries in FIG. 19A, the branch target addresses '68.0', '68.7', '68.1', '68.2' are respectively read from buses 2511, 2512, 2513, and 2514 and sent to the input of registers 2521, 2522, 2523, and 2524. Here the address format is BNX.BNY. Each of the first instruction address BNXs on buses 2510, 2511 and 2512 are sent to End track point memory 2502 to read out the corresponding Next block address, while each second address BNY, like stated before, is used to produce the corresponding shift amount. The BNX addresses on bus 2510~2512 are all '68', and the content of memory 2502's row 68 is '23', so End track point memory 2502's 3 outputs are all '23'. As said before, the Current address' second address '3' and O Way's second address '0' both produce invalid Next block addresses. P Way's second address '7' may produce valid Next bock address, and shift amount $((m-w)-(n-BNY)-1)=((4-2)-(8-7)-1)=0$, does not need to shift, and is directly stored into register 2545 (here register 2540, 2541, 2542, 2543 and 2544 are all invalid).

After the clock signal updates tracker registers and the Next block address register, value '68.3' on bus 2520 which is the outputs of register 2525 and 2526 joined together, is sent to slot A IRB 2550 in the current clock cycle. The value is matched by decoder's first address comparator and decoded by the second address decoder, which drives zigzag word line 2555, to issue instructions 3, 4, 5, 6 along slots A, B, C, D; the Next bock address in N Way of registers 2540, 2541 and 2542 are all invalid, therefore after decoding slots B, C, and D the column decoder 2411 does not drive any word line in N Way. At the same time, register 2521's output '68.0' is sent to slot B's IRB 2551. After being matched and decoded by decoder, it drives zigzag word line 2556, and issues instructions 0, 1, 2 along the O Way of slots B, C, and D; the Next bock address of the O Way of registers 2543 and 2544 is invalid, therefore no word lines are driven by column decoder 2411 in slots C and D. At the same time, register 2522's output '68.7' is sent to P Way IRB 2552, after being matched and decoded by decoder, drive zigzag word line 2557. After issuing instruction 7 along P Way slot C, the word line terminates when it reaches IRB block's lower boundary; register 2545's P Way's Next block address is valid, therefore D slot's decoder decodes it to drive word line 2558; in D slot's P Way's IRB of Next instruction block, it's '0' row issues instruction 8. At the same time, register 2523's output '68.1' is sent to Q Way's IRB 2553, and after matching and decoding by decoder, decoder drives word line 2559 and issues instruction '1' along Q Way's slot D.

Each branch decision is independently made in the front-end pipelines of slots A, B, C, and D for instructions 3, 4, 5, 6 in N Way. The branch decision outputted by a front-end pipeline is 'taken' only when the instruction being processed by the front-end pipeline is a branch instruction, and the branch is decided as taken and the instruction does not have dependence. Under other circumstances the branch decision would be 'not taken'.

The N Way branch decision results of 4 slots are sent to priority encoder 2596 and encoded as Way priority code 2598. Priority encoder 2596 sets the priority of branch decisions based on the address order of their corresponding instructions. If slot A N Way branch decision is 'taken', then in this case the Way priority code 2598 outputted by the encoder means to select Way O, no matter the branch decision result of the instructions of N Way of slot B, C and D. If the instruction in slot A Way N is determined as 'not taken' and slot B Way N branch decision is 'taken', then the Way priority code 2598 outputted by the encoder means to select Way P, no matter the branch decision result of the instructions of N Way of slot C and D. If instruction in slot A, B Way N is determined as 'not taken' and the instruction in slot C Way N is determined as 'taken', the Way priority code 2598 outputted by the encoder means to select Way Q, no matter the branch decision result of the instructions of N Way of slot D. If the instructions in N Way in slots A, B, and C are determined as 'not taken' and the instruction in N Way D slot is determined as 'taken', then the Way priority code 2598 outputted by the encoder means to select Way J, which will be explained later. Lastly when N Way in slots A, B, C, and D are all determined as 'not taken', then the Way priority code 2598 outputted by the encoder means to select Way N.

Way priority code 2598 controls multiplexers 2581, 2582, 2583, 2584, 2585 and 2586. Not all multiplexers need the control of all the meaning types of Way priority code, such as Way priority code J does not control multiplexer 2586.

First, look at the circumstance of selecting outputs of front-end pipelines to be provided to the rear-end pipelines. Multiplexers 2581, 2582 and 2583 select the operation control signals decoded by front-end pipelines and the data from the DRBs. As shown in embodiments in FIG. 18, the DRB (not show in FIG. 21) filled by data engine, are also organized into slots, like the IRBs 2550~2553 in this embodiment; Slot A has N Way, slot B has N and O Ways, slot C has N, O, and P Ways, slot D has N, O, P, and Q Ways. The Way grouping are the same as IRB 2550~2553. DRBs in each slot provide data to rear-end processor and RF under the control of IRBs 2550, 2551, 2552, 2553 of its corresponding slot. The data from DRB slot A Way N and the operation control signal created by front-end pipeline 2570 of slot A Way N are both sent to rear-end pipeline 2580 for bypass execution or to be stored in RF 2595. The data from other slots in DRB and the operation control signal of the corresponding slot's front-end pipeline 2571 2579 are selected by multiplexer 2581, 2582 and 2583 and sent to rear-end pipeline 2591, 2592 and 2593 for bypassing execution or to be stored in RF 2595.

If Way priority code means select O Way, then multiplexers 2581, 2582, and 2583 select their O inputs, that is to select the outputs of the 3 O Way front-end pipelines to rear-end pipeline 2591, 2592 and 2593 to continue processing. The output of front-end pipeline 2470 is sent to rear-end pipeline 2590 which is not affected by branch decision. Here the instruction of front-end pipeline of Slot A N Way is instruction 3. The instructions in the front-end pipeline of O Way in slots B, C, and D are the instructions that presume instruction 3 is a 'taken' branch instruction, that is, the branch target 0 of branch instruction 3, and the two instructions following the target (instructions 1 and 2). So instructions 3, 0, 1, and 2 are sent to rear-end pipeline 2590, 2591, 2592 and 2593 to process.

By the same reason, when Way priority code means P Way, multiplexers 2581, 2582, and 2583 all select their P inputs, that is, the output of the front-end pipeline of N Way slots A and B and the output of the front-end pipeline of P Way slots C and D are used as the output of multiplexers and provided to rear-end pipeline to continue processing. So instructions 3, 4, 7, and 8 are sent to rear-end pipeline 2590, 2591, 2592 and 2593 to be processed. By the same reason when Way priority code means Q Way, multiplexers 2581, 2582, and 2583 all select their Q inputs, front-end pipeline of N Way slots A, B, and C outputs, the output of the front-end pipeline of Q Way slot D is the multiplexer output provided to rear-end pipeline to continue processing. So instructions 3, 4, 1, and 2 are sent to rear-end pipelines 2590, 2591, 2592 and 2593 to be processed. By the same reason, when Way priority code means N Way, then multiplexers 2581, 2582, and 2583 all select their N inputs, and N Way slots A, B, C, and D front-end pipeline outputs are provided to rear-end pipeline to continue processing. So instructions 3, 4, 5, and 6 are sent to rear-end pipeline 2590, 2591, 2592 and 2593 to be processed. When Way priority code means J Way, multiplexers 2581, 2582, and 2583 all select J input, and so output instructions 3, 4, 5, and 6. The selection of J Way and N Way are the same in the current clock cycle, the difference is only significant in the next cycle.

Way priority code 2598 also decides which segment of instructions to be executed next cycle. Way priority code 2598, which is generated from the branch decisions, controls multiplexer 2584, 2585 and 2586 to decide the program's course. Tracker 2504 calculates the initial instruction address of the instruction segment to be executed next clock cycle based on the output of multiplexers 2584, which selects the address increment amount of a certain Way; the output of multiplexers 2585, which selects the initial address of the same Way in the current cycle; and the output of multiplexers 2586 which selects the Next block address of the same Way in the current cycle. Specifically, the method uses adder 2528 to add BNY address 2536 of the initial address of this certain Way in the current cycle selected by multiplexer 2585 (from registers 2525, 2526, or from registers 2521, 2522, 2523, 2524) to the address increment amount selected by multiplexer 2527 which is controlled by the same Way output selected by multiplexer 2584 (from dependency checker 2560, 2561, 2562 or 2563); the sum will be the second address BNY of the initial instruction in the next cycle. The carry-out output 2538 of the adder 2528 controls multiplexer 2529; if carry out is '0', select the first address BNX 2535 of the initial address of this Way in the current cycle; if carry out is '1', select the output 2539 of multiplexer 2586, which is the first address BNX of the Next block address of this Way in the current cycle selected by multiplexer 2586 (from registers 2530, 2531, 2532 or 2533), and the output of multiplexer 1529 is the first address BNX of the next cycle. The BNX and BNY join together to become the read pointer 2510 which points to track table 2501 and reads out the entry 2511 being pointed to, and the next 3 entries 2512, 2513, and 2514 in the same manner as described before. Read pointer 2510 is also sent to End address memory 2502 and column address generator 2503 to obtain the corresponding Next block addresses and column addresses. Therefore, when clock signal comes, BNX and BNY on read pointer 2510 are respectively sent to registers 2525 and 2526 as the Current address; track table outputs 2511~2514 are each respectively latched into registers 2521~2524 as branch target addresses; End address memory 2502's outputs are latched into register 2530~2533 as the Next block address, and latched into register 2540~2545 after the corresponding shifting. Processor starts a new cycle of operation, as said before.

When Way priority code 2598 is N way, multiplexer 2584 selects the instruction dependency check unit 2560's output as increment control signal 2597. When Way priority code 2598 is O Way, P Way and Q Way, multiplexer 2584 correspondingly selects the output of instruction dependency checker unit 2561, 2562, or 2563 as increment control signal 2597. When Way priority code 2591 is J Way, multiplexer 2584 always selects '0' as increment control signal 2597, the control signal selects increment value '0' at multiplexer 2527.

Here are a few actual examples: presume branch decision is N Way instructions 3, 4, 5, and 6 that do not branch, and the dependency check unit 2560 judges no dependence between instructions 3, 4, 5, 6. Then, branch priority encoder 2596 outputs Way priority code as N Way. Then multiplexers 2581, 2582, and 2583 select N Way's front-end pipeline outputs to send to rear-end pipelines 2591, 2592, 2593 to execute. Therefore, instructions 3, 4, 5, and 6 execute in rear-end pipeline, and the execution result is written back into the shared RF 2586. Multiplexer 2584 selects the output '4' of dependency checker 2560 as increment amount and sends to adder 2528 through 2597 which sums it with register 2526's content '3' selected by multiplexer 2585. The sum is '7', carry out is '0'. Therefore, multiplexer 2529 selects register 2525's content '68' through multiplexer 2585. Therefore, read pointer is '68.7', next cycle executes instructions 7, 8, 9, 10 (8, 9, and 10 are in the Next IRB block) in N Way. Other Ways O, P, and Q start execution from the branch target recorded from track table entries of instructions 7, 8, and 9. If an instruction is non-branch, the IRB of the corresponding Way will not issue instruction, and the Way will also not be selected for the final branch decision.

Presume branch decision has concluded that instructions 3, 4, and 5 do not take branch, but instruction 6 does take branch, and dependency check unit 2560 concludes there is no correlation between the four instructions. Here, branch priority encoder 2590 outputs Way priority code as J Way. Here multiplexers 2581, 2582, and 2583 select N Way's front-end pipeline output and send to rear-end pipeline 2591, 2592, and 2593 to execute. Therefore, instructions 3, 4, 5, 6 execute in rear-end pipeline. Multiplexer 2584 selects J Way's increment control '0' and sends to adder 2528 through 2597. The adder sums the said increment control with the content '2' in register 2524 selected by multiplexer 2585, the sum is '2' and the carry out is '0'. Therefore, multiplexer 2529 selects the first address '68' of register 2524 which is selected by multiplexer 2585. Therefore, read pointer is '68.2', next cycle instructions 2, 3, 4, 5 are issued in N Way. Other Ways O, P, and Q start execution from the branch target recorded in the track table entries of instructions 2, 3, and 4.

Presume branch decision in slot A instruction 3 does not take branch, but slot B instruction 4 does take branch, and dependency check unit 2562 concludes there is no dependence between the four instructions. Then, branch priority encoder 2596 outputs Way priority code as P Way. So multiplexer 2581 selects N Way B slot's front-end pipeline output and sends it to rear-end pipeline 2591 to execute. Multiplexers 2582, 2583 select the front-end pipeline output of P Way C slot, D slot, to be executed by rear-end pipelines 2592, 2593. Therefore, instructions 3, 4, 7, 8 are executed in rear-end pipeline. Multiplexer 2584 selects the increment control '2' of output of dependency check unit 2562 and sends to adder 2528 through 2597. Adder 2528 sums the increment control with the content '7' of register 2522 selected by multiplexer 2585. The sum is '1', and carry is '1'. Therefore, multiplexer 2529 selects the content of register 2532's first address '23' which is selected by multiplexer 2586. Therefore, read pointer is '23.1', instructions 9, 10, 11, 12 (4 contiguous instructions starting with the one with address '1' in the Next instruction block) are issued in N Way in next cycle. Other Ways O, P, and Q start execution from the branch target recorded in the track table entries of instructions 9, 10, and 11.

Presume branch decision is slot A instruction 3 does take branch and dependency check unit 2561 concludes O Way B slot instruction 0 has dependency on and N Way A slot instruction 3. Then, branch priority encoder 2596 outputs Way priority code as O Way. So multiplexers 2581, 2582, 2583 select the front-end pipeline outputs of O Way B slot, C slot, D slot, to be executed by rear-end pipeline 2591, 2592, and 2593. Therefore, instructions 3, 0, 1, and 2 are executed in rear-end pipeline; but then the 0, 1, 2 instruction in B, C, D slots are aborted due to dependency, only instruction 3 in A slot is completed and retired, and its result is written back to the shared RF 2595. Multiplexer 2584 selects the increment control '0' outputted by dependency check unit 2561 and send to adder 2528 through 2597. Adder 2528 sums the increment control with the second address content '0' of register 2521, which is selected by multiplexer 2585. The sum is '0', and carry is '0'. Therefore, multiplexer 2529 selects the content of register 2521's first address '68' selected by multiplexer 2585. Therefore, read pointer is '68.0', instructions 0, 1, 2, 3 are issued in N Way in next cycle. Other Ways O, P, and Q start execution from the branch target recorded in the track table entries of instructions 0, 1, and 2.

This embodiment uses IRBs controlled by zigzag buses, which are capable of issuing plural number of instructions in order. This embodiment fully utilizes the branch target information and the Next block address information of the instructions, both stored in the track table, which are about to be executed, to control multiple numbers of the said IRB, to pre-process instructions in parallel on multiple execution paths due to branch instructions. This embodiment makes branch decisions on each of the branch instructions being processed, and then produces a final branch decision result taking into account the sequential order of the branch instructions. The branch decision result selects the intermediate pre-processing results of one set of the multiple execution paths to be further processed, and the dependency check result on instructions in the selected set decides whether a portion of or all of the instructions of the selected set are used to complete execution, while the others are aborted. It also adds the initial second address of the selected path to the address increment amount of the same path. For the next cycle, the sum of the addition will be the second address, and the initial first address will be the first address of the next cycle, if the sum does not overflow over the IRB block boundary. For the next cycle, the sum within the IRB block boundary will be the second address and the Next block address of the selected path will be first address, if the sum overflows over the IRB block boundary.

This disclosure discloses a method of instruction multi-issue. The method is to issue n sequential instructions in parallel starting with the instruction at address a, and use the dependency checkers to detect the dependence between the said plural number of instructions, and feedback an address increment amount i based on the dependency and the position of the dependent instruction; and issue n instructions starting from instruction address a=a+i. Here, the sequence of issuing instructions is defined as 0, 1, 2, . . . , n−1; then i=p, p is the position of the first dependent instruction in the instruction sequence; n is defined as the dependent instruction position if there are no dependencies found among the issued instructions. Here, the instruction later in the sequence of the two instructions that have dependency is defined as the dependent instruction.

This disclosure employs special data read buffers (DRBs). Data engine pre-fetches and fills data that correspond to instructions into DRB in advance. When an instruction is issued, the corresponding data will automatically be extracted from IRB for execution.

The pipeline's processor does not start from the usual instruction fetch pipe stage, but rather starts from the instruction decode pipe stage; it also does not contain memory (data) access stage. Instructions are pushed to processor core by instruction engine containing track table, tracker, and IRB. Data is pre-fetched by data engines and filled into DRBs, the data is pushed to the core following the issuing of the corresponding instructions.

The specific implementation of this method is to use diagonal or so called zigzag word lines to control a memory, which has a plural number of read ports for a single instruction (or data in general) and there are a plural number of bit lines connecting those read ports, which are independent from each other, so a segment of sequential instructions (or sequential data) may be sent on the plural number of bit lines to the connected plural number of processing units for parallel processing.

This disclosure also discloses a method of unrolling an instruction loop to a plural number of lanes and executing it in parallel.

This disclosure also discloses a method of instruction scheduling of a multiple lane processor, allocating lane resources based on the thread priority and ready/valid status of instruction and data of those threads.

This invention also discloses a method of synchronizing instruction execution between the lanes of a multiple lane processor.

Figure 22:
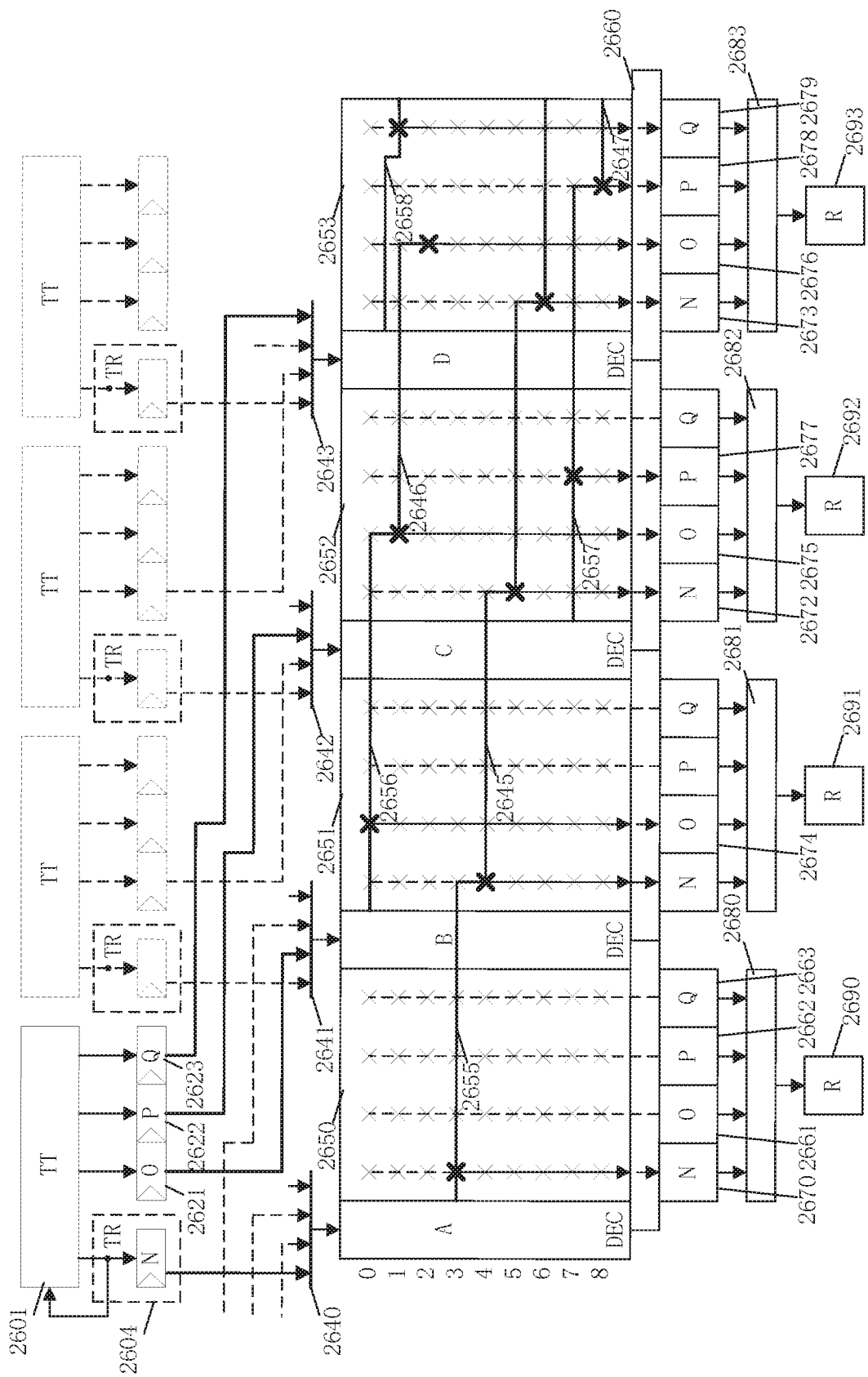
FIG. 22 illustrates an exemplary general purpose IRB structure of the said lane processor consistent with the embodiments.

Please refer to FIG. 22, which is an exemplary general purpose IRB structure of the said lane processor consistent with the embodiments. In this embodiment, every lane is of the exact same structure, the general purpose structure, every lane contains 4 Ways and corresponds to an instruction slot. There are in total 4 slots: A, B, C, and D, to implement the ILP multi-issue without branch penalty shown in FIG. 21.

Specifically, using FIG. 22's first lane (slot A) as example, every lane's track table 2601, tracker 2604, registers 2621, 2622 and 2623, IRB 2650 respectively correspond to FIG. 21's track table 2501, tracker 2504, register 2521, 2522 and 2523, IRB 2550. Because the lane's IRB 2650 contains 4-way, therefore there are 4 corresponding front-end pipelines, front-end pipeline 2670 corresponds to FIG. 21's execution unit 2570, while execution unit 2661, 2662 and 2663 correspond to the other 3 Ways. Correspondingly, after multiplexer 2680 selects the results of front-end pipelines of these 4 Ways, it sends it to rear-end pipeline 2690 to continue execution.

In this embodiment, as said in FIG. 21 embodiment, slot A only needs N Way, therefore, IRB 2650's O, P, Q Ways and the last three front-end pipelines 2661, 2662, 2663 are configured as disabled, and the multiplexer 2680 is configured to always select the output of front-end pipeline 2670, the structure of the lane after configuration is the same as slot A in FIG. 21. Slot B only needs N, O Ways, therefore IRB 2651's P, Q Ways and the last two front-end pipelines are configured as disabled, and the multiplexer 2681 is configured to select the outputs of front-end pipeline 2671 and 2674, the structure of the lane after configuration is the same as that of slot B in FIG. 21. Slot C only needs N, O, P Ways, therefore IRB 2652's Q Ways and the last front-end pipelines are configured as disabled, and the multiplexer 2681 is configured to select the outputs of front-end pipelines 2672, 2675, and 2674, the structure of the lane after configuration is the same as slot C in FIG. 21. Slot D needs all 4 Ways, therefore the structure of the lane after configuration is the same as slot D in FIG. 21. For clarity, priority encoder and its corresponding multiplexer, and details of correlation detector module 2660 are not shown in FIG. 22. The structure and functions of the priority encoder and its corresponding multiplexer are the same as those in FIG. 21. Dependency checker module 2660 contains the functions of dependency checker modules 2560, 2561, 2562, and 2563 in FIG. 21 and may perform the same dependency check on the instructions issued in the corresponding slot and Way as the connections in FIG. 21 have shown, and thus will not be repeated here.

When the lane processor is configured as ILP multi-issue without branch penalty mode as shown in the embodiment in FIG. 21, of the 4 slots only slot A's track table 2601, tracker 2604, and register 2621, 2622, 2623 are used. The other 3 slots' track table, tracker, and corresponding registers do not participate in the operation. In this embodiment, this mode may be accomplished through the configuration of the multiplexers of these 4 slots 2640, 2641, 2642 and 2643.

Specifically, the 2640 is configured to select the read pointer outputted by tracker 2604 as output, this output is the equivalent of bus 2520 in FIG. 21, which is sent to the controller in IRB 2650 of slot A to drive local word line 2655 to issue instruction from N Way slot A. Local word line 2655 further drives global zigzag word line 2645 to issue instructions from N Way slots B, C, D at the same time, instructions of these 4 N Ways are respectively sent to front-end pipeline 2670, 2671, 2672 and 2673 to execute.

Multiplexer 2641 is configured to select the read pointer value of register 2621's output as output to the controller of IRB 2651 of slot B to drive the local word lines 2656 to issue instructions from O Way slot B. Local word line 2656 further drives global zigzag word line 2646 to issue instructions from O Way slots C, D at the same time, the instructions of these 3 O Ways are respectively sent to front-end pipeline 2674, 2675, 2676 to execute.

Multiplexer 2642 is configured to select the read pointer value of register 2622's output as output to the controller of IRB 2652 of slot C to drive local word line 2657 to issue instructions from P Way slot C. Local word line 2657 further drives global zigzag word line 2647 to issue instructions from P Way slot D at the same time, the instructions in these two P Ways are respectively sent to front-end pipeline 2677 and 2678 to execute.

Multiplexer 2643 is configured to select the read pointer value of register 2623's output as output to the controller of IRB 2653 of slot D to drive local word line 2658 to issue instructions from Q Way slot D, and send to front-end pipeline 2679 to execute.

Subsequent operations are the same as those embodied in FIG. 21, and thus not repeated here. Thus, the general-purpose lane structure of this embodiment may achieve the functions described in the embodiment in FIG. 21 through configuration.

This disclosure discloses a method which configures the correlation relationships amongst the instructions and data consumed by plural sets of computation resources to achieve a variety of modes of parallel instruction execution. This disclosure also discloses a lane processor, which is capable of issuing a plural number of instructions in parallel, through configuring a plural number of word lines that control a plurality of instruction memories whose read ports are connected by mutually independent bit lines. These word lines include local word line, which controls within a lane, and global straight word line and global oblique word line, which both control passing between lanes. The configuration of word lines and the content of each of the instruction memory, and the data exchange amongst lanes enable this lane processor to support multiple mode operations. Each of the lanes may operate independently or operate in unison. Neighboring lanes may operate under different modes and not interfere with each other. Lanes may also be configured into an in-series relationship by software, to process data in relay fashion.

This disclosure further discloses a method that performs ILP multi instruction issue using multi-lane processor. The method is to provide multiple front-end pipelines in each lane to process instructions of multiple branches, provide data exchange between lanes, and make the register file content in each lane the same, and have each lane execute the same program in sync. Divide n sequential instructions starting from an initial address, and the possible branch target instructions from the branch instructions within the n instructions, into different Ways based on the branch relationship, and into n instruction slots based on the instruction sequence order. Each of the n lanes is responsible for the instructions in its own issue slot. Instructions in each slot are issued at the same time. The said plural number of instructions simultaneously issued is each independently executed. The dependency amongst instructions is checked, the execution of instructions with dependency and the follow up instructions in the same Way are all aborted; and a Way address increment amount is feed backed for each Way based on if there is dependence amongst the instructions and the location of the dependent instruction. Make branch decision independently execute each branch instruction regardless of other branch decisions. Determine the Way of execution in current cycle and next cycle based on each of the independent branch decisions and branch priority based on the branch instruction sequence order. Based on the Way determined, select n instructions from the said simultaneously issued instructions for normal execution and retirement, and terminate the rest of the instructions. Based on the determined Way of next cycle, sum the current cycle address of the Way with the address increment amount of the Way. The result is the block offset address BNY of the initial address of next cycle. Take the current cycle address of the determined Way as the initial block address BNX for next cycle if the above sum does not overflow the block address boundary. Take the current cycle Next block address of the determined Way as the initial block address BNX for next cycle if the above sum does overflow the block address boundary. Then n sequential instructions start from this initial address, and the possible branch target instructions from the branch instructions within the n instructions are issued at the same time. This process is performed repeatedly.

Figure 23:
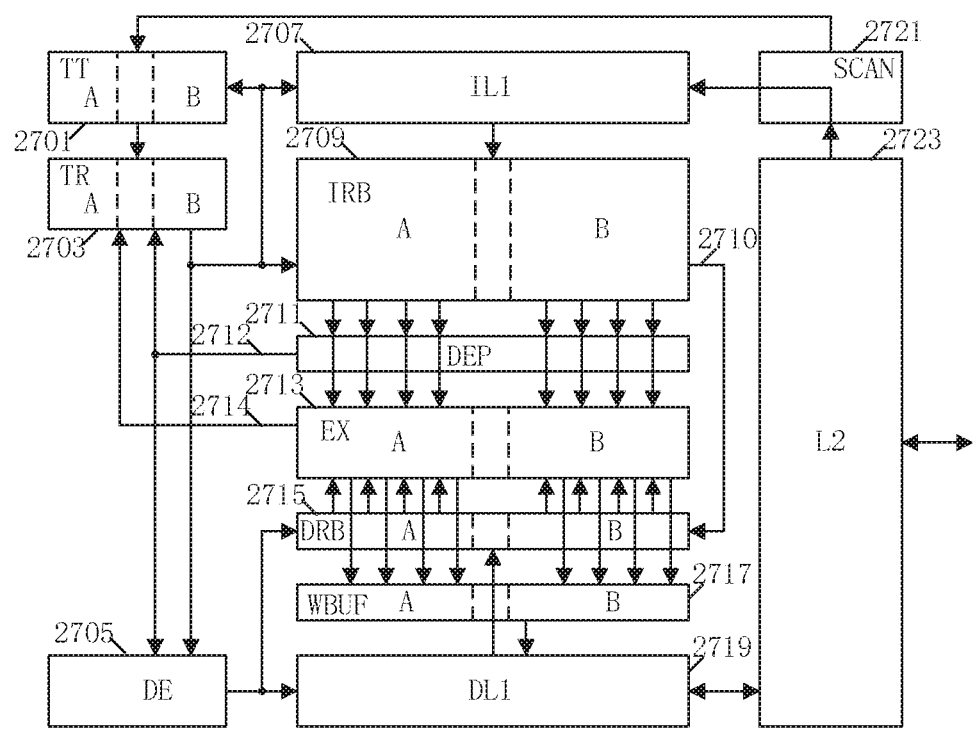
FIG. 23 is an exemplary complete structure of the lane processor system consistent with the embodiments.

Please refer to FIG. 23, which is an exemplary complete structure of the lane processor system consistent with the embodiments. A lane processor system with two lanes, each lane has 4 Ways, is used as example for illustration. The embodiment's method and system may also be deduced to lane processors containing more lanes or more Ways, but those details are not explored here. In this embodiment, processor system is composed of track table module 2701, tracker module 2703, data engine module 2705, first level instruction cache 2707, IRB 2709, dependency checker module 2711, execution unit 2713, data read buffer 2715, write buffer 2717, first level data cache 2719, scanner 2721, and second level cache 2723. Second level cache 2723 stores both instructions and data. As said in a previous embodiment, when tracker 2703 finds that branch target instruction has not yet been stored in first level instruction cache 2707, it fetches the corresponding instruction block from second level cache 2723 and fills it to first level instruction cache 2707, and at the same time builds a corresponding track in track table 2701 after scanner examines the instructions that are filled. When data engine 2705 finds the data corresponding to the data address of a data access instruction has not yet been stored in first level data cache 2719, it fetches the corresponding data block from second level cache 2723 and fills it to first level data cache 2719, at the same time write back to the second level cache 2723 the data block replaced out of first level data cache 2719.

This embodiment's lane processor system contains two lanes (corresponding to instruction slots A and B), each lane contains 4 Ways (8 Ways in total), every Way has a set consisting of execution unit, IRBs, and DRBs. Dependency checker module 2711 may be configured, to detect the dependency between instructions issued within a lane, or certain Ways in a plurality of lanes, or all Ways in a plurality of lanes. Tracker module 2703 and track table module 2701 contain two trackers and two track tables that respectively correspond to slots A and B. When configured as instruction level parallel issue, only the tracker and track table that correspond to slot A tracker module 2703 and track table module 2701 operate, slot A's tracker indexes and fetches branch target instruction from first level instruction cache 2707 and fills it to IRB 2709 before processor executes to branch instruction, if the branch target instruction is not already in IRB. The tracker and track table that correspond to slot B do not operate.

In addition, as described in the embodiments of FIGS. 21 and 22, tracker module 2703 calculates the new current BNX, BNY by adding the initial BNX, BNY with the increment amount outputted by the dependency check unit 2711, both in a Way determined based on the branch result 2714 outputted by execution unit 2713.

Data engine module 2705 also contains two data engines that respectively correspond to slots A and B. In this example, the data engine is similar to the one in FIG. 18. It calculates the possible data addresses for the next execution of the same data access instructions based on stride information. Data corresponds to the said data address is filled from first level data cache 2719 to IRB 2715 if it is not already there. Specifically, when IRB 2709 issues data access instruction to execution unit 2713, at the same time addresses DRB 2715 through bus 2710 (for example in FIG. 18B's embodiment the address is sent through bus 2215 to decoder 222, and then indexing to read out the data corresponding to the data access instruction).

In addition, in the embodiment's processor system, write buffer 2717 temporarily stores the data that execution unit 2713 intends to write back to first level data cache 2719, and writes the temporary data back to first level data cache 2719 if it is not filling data into DRB 2715 (first level data cache 2719's port is not busy at the time). This reduces the read/write collisions in first level data cache 2719, and ensures that the data that may be used in execution unit 2713 will be filled into DRB 2715 as soon as possible.

As said in the previous embodiments, under the guidance of tracker module 2703, the processor system of this embodiment may control IRBs to provide the correct instruction to be executed in execution unit along the program flow without interruption, and based on the information stored in IRB find corresponding data in DRB, no matter if the branch instructions take branch or not. Because each Way used in the processor system has its own IRB and DRB to provide instructions and corresponding data, therefore instructions and corresponding data may be provided to different Ways at the same time, which improves processor system efficiency.

The technical plan of this disclosure may be extended to cache system with more hierarchical levels.

It is understood by one skilled in the art that many variations of the embodiments described herein are contemplated. While the invention has been described in terms of an exemplary embodiment, it is contemplated that it may be practiced as outlined above with modifications within the spirit and scope of the appended claims.

INDUSTRIAL PRACTICALITY

The apparatuses and methods of this disclosure may be applied to various applications related to lane processors, which may enhance efficiency of lane processor.

The invention claimed is:
1. A high performance processing method for a processor system comprising a plurality of general-purpose-units, wherein: each general-purpose-unit further comprising at least an instruction memory and an execution unit; and the method comprises:

configuring each of the instruction memory in a plurality of general-purpose-units providing the same or different instruction to execution unit in the same general-purpose-unit independent or in cohesion from each other, such that the plurality general-purpose-units functioning under various operation modes;

configuring each of the instruction memory in the plurality of the general-purpose-units each providing an instruction within a contiguous instruction segment in cohesion for execution;

checking the dependency between each of the instructions provided; storing each execution result of the non-dependent instructions to registers of each of the plurality of general-purpose-units, enabling the plurality of general-purpose-units functioning under ILP mode;

the instruction memories each providing an instruction within the next segment of contiguous instructions for execution; and starting from the first dependent instruction within the current segment or starting from the first instruction following the current segment of instructions.

2. The processing method according to claim 1, further comprising transferring data amongst a plurality of general-purpose-units over configurable intra-general-purpose-unit buses.

3. The processing method according to claim 1, further comprising:

configuring each of the instruction memory in a plurality of the general-purpose-units providing instructions independent from each other to execution units, enabling the plurality of general-purpose-units functioning under SISD mode.

4. The processing method according to claim 1, further comprising:

configuring each of the instruction memory in a plurality of the general-purpose-units providing the same instruction in cohesion to execution units, enabling the plurality of general-purpose-units functioning under SIMD mode.

5. The processing method according to claim 1, further comprising:

configuring each of the instruction memory in a plurality of the general-purpose-units providing instructions of a common program in cohesion;

wherein each execution unit producing a branch decision;

and the branch decision of a general-purpose-unit determining the segment of instructions of the common program that the instruction memory of the same unit providing to the execution unit, enabling the plurality of general-purpose-units functioning under Supper SIMD mode.

6. The processing method according to claim 1, further comprising:

configuring each of the instruction memory in a plurality of the general-purpose-units providing instructions of a plurality of programs in cohesion;

configuring each of the plurality of general-purpose-units to receive the same data;

so the plurality of general-purpose-units functioning under MISD mode.

7. The processing method according to claim 1, further comprising:

configuring each of the instruction memory in a plurality of the general-purpose-units providing instructions of a plurality of programs independent from each other;

configuring each of the plurality of general-purpose-units to receive different data, enabling the plurality of general-purpose-units functioning under MIMD mode.

8. The processing method according to claim 1, further comprising:

determining the maximum degree of parallel instruction execution by configuring the dependency checking between the provided instructions.

9. The processing method according to claim 1, further comprising:

configuring each of a plurality of general-purpose-units that output of a general-purpose-unit connecting to input of another general-purpose-units, enabling the plurality of general-purpose-units functioning under soft-wired mode to processing data in relay.

10. The processing method according to claim 2, further comprising:

configuring the intra-general-purpose-unit buses connecting execution result of an execution unit in a general-purpose-unit to registers in another general-purpose-units;

programing in a "read after write" format that at least one of the source register address of the receiving general-purpose-unit is the same as the destination register address of the transmitting general-purpose-unit.

11. The processing method according to claim 10, further comprising:

enabling the bypassing (forwarding) within the plurality of general-purpose-units while disabling register-writing in each of the plurality of general-purpose-units reducing power consumption.

12. The processing method according to claim 1, further comprising:

allocating a single general-purpose-unit in SISD mode or a plurality of general-purpose-units in ILP mode to execute instructions that are not parallel executable;

and allocating a plurality of general-purpose-units to execute instructions in parallel when executing instructions are parallel executable improving execution efficiency.

13. The processing method according to claim 12, further comprising:

converting a plurality of loop iterations of instruction execution within an instruction loop to parallel execution of the instructions within the instruction loop on a plurality of general-purpose-units to unrolling the instruction loop.

14. The processing method according to claim 13, further comprising:

designating instructions between a backward branching instruction and its corresponding branch target instruction as instructions within an instruction loop;

allocating a plurality of general-purpose-units to execute the instructions within the instruction loop;

wherein the allocating is accomplished by storing the instructions within the instruction loop into each instruction memory of the allocated plurality of general-purpose-units and providing the instructions within the instruction loop to the execution units of the plurality of general-purpose-units.

15. A high performance processing method for a processor system comprising a plurality of general-purpose-units, wherein each general-purpose-unit further comprising at least an instruction memory and an execution unit, and the method comprises:
- configuring each of the instruction memory in a plurality of general-purpose-units providing the same or different instruction to execution unit in the same general-purpose-unit independent or in cohesion from each other, such that the plurality general-purpose-units functioning under various operation modes;
- allocating a single general-purpose-unit in SISD mode or a plurality of general-purpose-units in ILP mode to execute instructions that are not parallel executable;
- allocating a plurality of general-purpose-units to execute instructions in parallel when executing instructions are parallel executable improving execution efficiency;
- converting a plurality of loop iterations of instruction execution within an instruction loop to parallel execution of the instructions within the instruction loop on a plurality of general-purpose-units to unrolling the instruction loop;
- designating instructions between a backward branching instruction and its corresponding branch target instruction as instructions within an instruction loop;
- allocating a plurality of general-purpose-units to execute the instructions within the instruction loop, wherein the allocating is accomplished by storing the instructions within the instruction loop into each instruction memory of the allocated plurality of general-purpose-units and providing the instructions within the instruction loop to the execution units of the plurality of general-purpose-units;
- designating the registers referenced by instructions within an instruction loop as relevant registers;
- designating the relevant registers in which the contents does not change between loop iterations as common registers;
- designating the relevant registers in which the content changes between loop iterations as base registers;
- designating the content difference between two iterations as a stride;
- storing the content of common registers to corresponding common register of each allocated plurality general-purpose-units;
- storing the content of base registers to corresponding base registers with one stride increment between each of the allocated plurality general-purpose-units.

16. The processing method according to claim 15, further comprising:
- defining the product of the stride and the number of allocated general-purpose-units as an interval;
- each of the plurality general-purpose-units taking branch when its own branch condition is satisfied;
- adding the interval to each base register when an allocated general-purpose-unit takes a backward branch.

17. The processing method according to claim 16, further comprising:
- employing a LOOP instruction to communicate the parameters in relate to an instruction loop from the program to the allocated plurality of general-purpose-units.

18. The processing method according to claim 1, further comprising:
- configuring each of the instruction memory to function under the instruction address generated by its corresponding general-purpose-unit when a single or a plurality of general-purpose-units working independent from each other;
- configuring each of the instruction memory to function under a shared instruction address when a plurality of general-purpose-units working in cohesion.

* * * * *